(12) United States Patent
Yeh et al.

(10) Patent No.: US 12,287,463 B2
(45) Date of Patent: Apr. 29, 2025

(54) PHOTOGRAPHING LENS SYSTEM, IMAGE CAPTURING UNIT AND ELECTRONIC DEVICE

(71) Applicant: LARGAN PRECISION CO., LTD., Taichung (TW)

(72) Inventors: Kuan-Ting Yeh, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 513 days.

(21) Appl. No.: 17/747,909

(22) Filed: May 18, 2022

(65) Prior Publication Data
US 2023/0258912 A1 Aug. 17, 2023

(30) Foreign Application Priority Data
Feb. 16, 2022 (TW) .................................. 111105634

(51) Int. Cl.
*G02B 13/00* (2006.01)
*G02B 9/04* (2006.01)

(52) U.S. Cl.
CPC ........... *G02B 13/0065* (2013.01); *G02B 9/04* (2013.01); *G02B 13/003* (2013.01)

(58) Field of Classification Search
CPC ............ G02B 13/0065; G02B 13/0045; G02B 13/18; G02B 13/009
See application file for complete search history.

(56) References Cited

U.S. PATENT DOCUMENTS

| 2,578,574 | A | 12/1951 | Miles |
| 2,878,724 | A | 3/1959 | Rudolf |
| 4,770,513 | A | 9/1988 | Nippon |
| 4,815,831 | A | 3/1989 | Betensky |
| 4,950,062 | A | 8/1990 | Kimura et al. |

(Continued)

FOREIGN PATENT DOCUMENTS

| CN | 103777317 A | 5/2014 |
| CN | 107193102 A | 9/2017 |

(Continued)

OTHER PUBLICATIONS

European Search Report dated Nov. 28, 2022 as received in Application No. 22174468.3.

(Continued)

*Primary Examiner* — Angela M. Medich
(74) *Attorney, Agent, or Firm* — Maschoff Brennan

(57) ABSTRACT

A photographing lens system includes, in order from an object side to an image side along an optical path, a front lens group and a rear lens group. The front lens group includes four lens elements. The rear lens group includes four lens elements. A second lens element counted from the image side in the front lens group has negative refractive power. An image-side surface of a first lens element counted from the image side in the front lens group is convex in a paraxial region thereof. A second lens element counted from the object side in the rear lens group has negative refractive power. An object-side surface of a first lens element counted from the image side in the rear lens group is concave in a paraxial region thereof. At least one lens element in the rear lens group has at least one lens surface being aspheric.

10 Claims, 26 Drawing Sheets

(56) References Cited

U.S. PATENT DOCUMENTS

| | | |
|---|---|---|
| 5,793,532 A | 8/1998 | Kawamura |
| 8,873,159 B2 | 10/2014 | Yoneyama |
| 2003/0048543 A1 | 3/2003 | Ohno |
| 2008/0106801 A1 | 5/2008 | Kang et al. |
| 2010/0165485 A1 | 7/2010 | Do |
| 2010/0321794 A1 | 12/2010 | Hirao et al. |
| 2011/0001865 A1 | 1/2011 | Hirao et al. |
| 2011/0141576 A1* | 6/2011 | Seo .................. G02B 13/0045 359/683 |
| 2012/0033300 A1 | 2/2012 | Nakahara |
| 2012/0120505 A1 | 5/2012 | Nakai et al. |
| 2013/0100542 A1 | 4/2013 | Tsai et al. |
| 2013/0107375 A1 | 5/2013 | Huang et al. |
| 2014/0085735 A1 | 3/2014 | Shih |
| 2016/0223782 A1 | 8/2016 | Makino et al. |
| 2017/0059823 A1 | 3/2017 | Tang et al. |
| 2017/0059824 A1 | 3/2017 | Tang et al. |
| 2017/0353645 A1 | 12/2017 | Shabtay et al. |
| 2018/0045921 A1 | 2/2018 | Kumazawa et al. |
| 2018/0052234 A1 | 2/2018 | Upton et al. |
| 2021/0157105 A1 | 5/2021 | Chen |
| 2021/0325643 A1 | 10/2021 | Bachar et al. |
| 2022/0113519 A1 | 4/2022 | Xu |
| 2022/0121019 A1 | 4/2022 | Li et al. |
| 2022/0214526 A1 | 7/2022 | Seo et al. |

FOREIGN PATENT DOCUMENTS

| | | |
|---|---|---|
| CN | 107783266 A | 3/2018 |
| CN | 108319015 A | 7/2018 |
| CN | 108427185 A | 8/2018 |
| CN | 208110149 U | 11/2018 |
| CN | 109683282 A | 4/2019 |
| CN | 110703546 A | 1/2020 |
| CN | 111443469 A | 7/2020 |
| CN | 111538145 A | 8/2020 |
| CN | 111983778 A | 11/2020 |
| CN | 112505904 A | 3/2021 |
| CN | 112817131 A | 5/2021 |
| CN | 112859278 A | 5/2021 |
| CN | 113031234 A | 6/2021 |
| CN | 113296246 A | 8/2021 |
| CN | 113467048 A | 10/2021 |
| CN | 114035306 A | 2/2022 |
| CN | 114236760 A | 3/2022 |
| CN | 216210186 U | 4/2022 |
| CN | 114488508 A | 5/2022 |
| CN | 216848316 U | 6/2022 |
| EP | 2 400 334 A2 | 12/2011 |
| JP | S59216114 A | 12/1984 |
| JP | H02-280108 A | 11/1990 |
| JP | H06-194583 A | 7/1994 |
| JP | H0843728 A | 2/1996 |
| JP | 2021189188 A | 12/2021 |
| NO | 2023/075355 A1 | 5/2023 |
| TW | I317819 B | 12/2009 |
| TW | 202127132 A | 7/2021 |
| WO | 2020054684 A1 | 3/2020 |
| WO | 2020259369 A1 | 12/2020 |
| WO | 2021063203 A1 | 4/2021 |
| WO | 2021218316 A1 | 11/2021 |
| WO | 2021249024 A1 | 12/2021 |
| WO | 2022/252134 A1 | 12/2022 |
| WO | 2022/252164 A1 | 12/2022 |
| WO | 2023/000142 A1 | 1/2023 |
| WO | 2023/087146 A1 | 5/2023 |

OTHER PUBLICATIONS

Taiwan Office Action issued in corresponding application No. 111105634, dated Jul. 28, 2023.

* cited by examiner

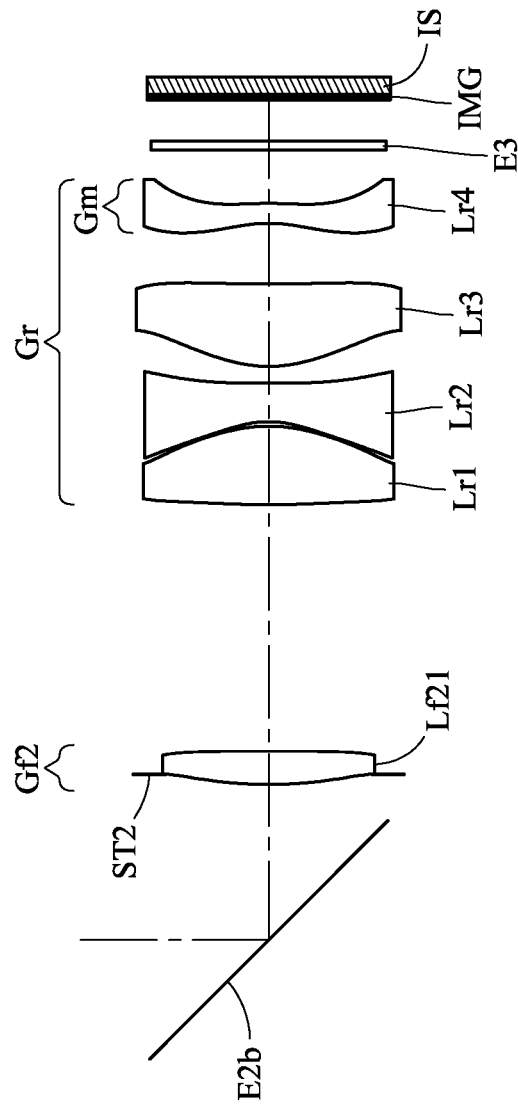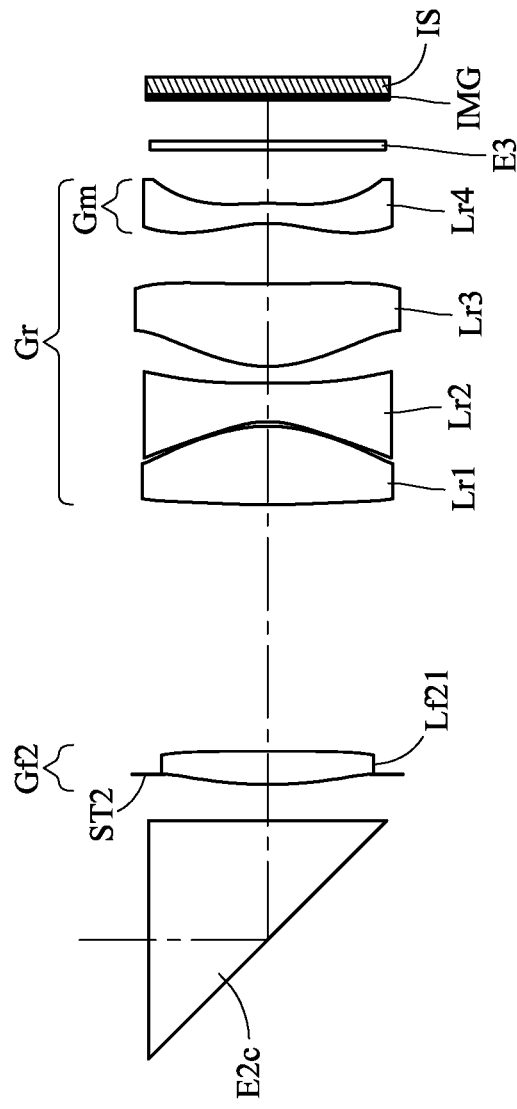

PHOTOGRAPHING LENS SYSTEM, IMAGE CAPTURING UNIT AND ELECTRONIC DEVICE

RELATED APPLICATIONS

This application claims priority to Taiwan Application 111105634, filed on Feb. 16, 2022, which is incorporated by reference herein in its entirety.

BACKGROUND

Technical Field

The present disclosure relates to a photographing lens system, an image capturing unit and an electronic device, more particularly to a photographing lens system and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, a photographing lens system includes, in order from an object side to an image side along an optical path, a front lens group and a rear lens group. The front lens group includes four lens elements, and the rear lens group includes four lens elements. Each of the four lens elements of the front lens group and the four lens elements of the rear lens group has an object-side surface facing toward the object side and an image-side surface facing toward the image side.

A second lens element counted from the image side in the front lens group has negative refractive power. The image-side surface of a first lens element counted from the image side in the front lens group is convex in a paraxial region thereof. A second lens element counted from the object side in the rear lens group has negative refractive power. The object-side surface of a first lens element counted from the image side in the rear lens group is concave in a paraxial region thereof. At least one of the object-side surface and the image-side surface of at least one lens element in the rear lens group is aspheric.

When an Abbe number of the first lens element counted from the image side in the rear lens group is $Vrr1$, an Abbe number of a second lens element counted from the image side in the rear lens group is $Vrr2$, an axial distance between the image-side surface of the first lens element counted from the image side in the front lens group and the object-side surface of a first lens element counted from the object side in the rear lens group is $TGfGr$, and a central thickness of the first lens element counted from the image side in the front lens group is $Tfr1$, the following conditions are satisfied:

$1.2 < Vrr1/Vrr2 < 7.5$; and $2.4 < TGfGr/Tfr1$.

According to one aspect of the present disclosure, a photographing lens system includes, in order from an object side to an image side along an optical path, a front lens group and a rear lens group. The front lens group includes one lens element, and the rear lens group includes four lens elements. Each of the one lens element of the front lens group and the four lens elements of the rear lens group has an object-side surface facing toward the object side and an image-side surface facing toward the image side.

The object-side surface of a first lens element counted from the object side in the front lens group is convex in a paraxial region thereof. A second lens element counted from the object side in the rear lens group has negative refractive power. The object-side surface of the second lens element counted from the object side in the rear lens group is concave in a paraxial region thereof. The object-side surface of a second lens element counted from the image side in the rear lens group is convex in a paraxial region thereof. A first lens element counted from the image side in the rear lens group has negative refractive power. At least one of the object-side surface and the image-side surface of at least one lens element in the rear lens group is aspheric.

When an Abbe number of the first lens element counted from the image side in the rear lens group is $Vrr1$, an Abbe number of the second lens element counted from the image side in the rear lens group is $Vrr2$, an axial distance between the image-side surface of a first lens element counted from the image side in the front lens group and the object-side surface of a first lens element counted from the object side in the rear lens group is $TGfGr$, and a central thickness of the first lens element counted from the image side in the front lens group is $Tfr1$, the following conditions are satisfied:

$1.2 < Vrr1/Vrr2 < 7.5$; and $1.6 < TGfGr/Tfr1$.

According to one aspect of the present disclosure, a photographing lens system includes a first front lens group, a second front lens group, a rear lens group and an optical path switching mechanism. The optical path switching mechanism is configured for the photographing lens system to be switched between a first optical path state and a second optical path state.

When the photographing lens system is in the first optical path state, the photographing lens system includes, in order from an object side to an image side along a first optical path, the first front lens group and the rear lens group. When the photographing lens system is in the second optical path state, the photographing lens system includes, in order from the object side to the image side along a second optical path, the second front lens group and the rear lens group.

The first front lens group includes at least three lens elements, the second front lens group includes at least one lens element, and the rear lens group includes at least two lens elements. Each of the at least three lens elements of the first front lens group, the at least one lens element of the second front lens group and the at least two lens elements of the rear lens group has an object-side surface facing toward the object side and an image-side surface facing toward the image side. At least one of the object-side surface and the image-side surface of at least one lens element in the rear lens group is aspheric.

When a focal length of the photographing lens system in the first optical path state is FS1, a focal length of the photographing lens system in the second optical path state is FS2, and a minimum value among Abbe numbers of all lens elements in the rear lens group is minVGr, the following conditions are satisfied:

$1.2 < FS1/FS2$; and $8.0 < minVGr < 26.5$.

According to another aspect of the present disclosure, an image capturing unit includes one of the aforementioned photographing lens systems and an image sensor, wherein the image sensor is disposed on an image surface of the photographing lens system.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows:

FIG. 7 is a schematic view of another example of the second optical path being folded by a reflector in the image capturing unit according to the 1st embodiment;

FIG. 8 is a schematic view of another example of the second optical path being folded by a reflector in the image capturing unit according to the 1st embodiment;

DETAILED DESCRIPTION

A photographing lens system includes, in order from an object side to an image side along an optical path, a front lens group and a rear lens group. The front lens group includes at least one lens element, and the rear lens group includes at least two lens elements. Therefore, such configuration is favorable for improving image quality. Moreover, each of the lens elements of the front lens group and the rear lens group has an object-side surface facing toward the object side and an image-side surface facing toward the image side.

The photographing lens system can include at least one reflector, and the reflector can be, for example, a prism or a flat mirror having a reflection surface. Therefore, the reflector is configured to fold the optical path, so that the mechanical arrangement can be more flexible. Moreover, the reflector can be disposed in the front lens group. Therefore, it is favorable for adjusting the arrangement of lens elements so as to improve image quality. Moreover, the reflector can be disposed between the front lens group and the rear lens group. Therefore, it is favorable for adjusting the arrangement of lens elements so as to obtain a balance between the size distribution and image quality. Moreover, the reflector can be applied to, for example, systems having switchable optical paths so as to reduce the mechanical size.

In some configurations, the front lens group includes one lens element. Therefore, it is favorable for balancing the field of view, size and image quality. In some configurations, the front lens group can include at least two lens elements. Therefore, it is favorable for improving image quality and forming a long-focus configuration. Moreover, the front lens group can also include at least three lens elements. Moreover, the front lens group can also include at least four lens elements. In some configurations, the front lens group can include four lens elements. Therefore, it is favorable for balancing the field of view, size and image quality.

Figure 24:
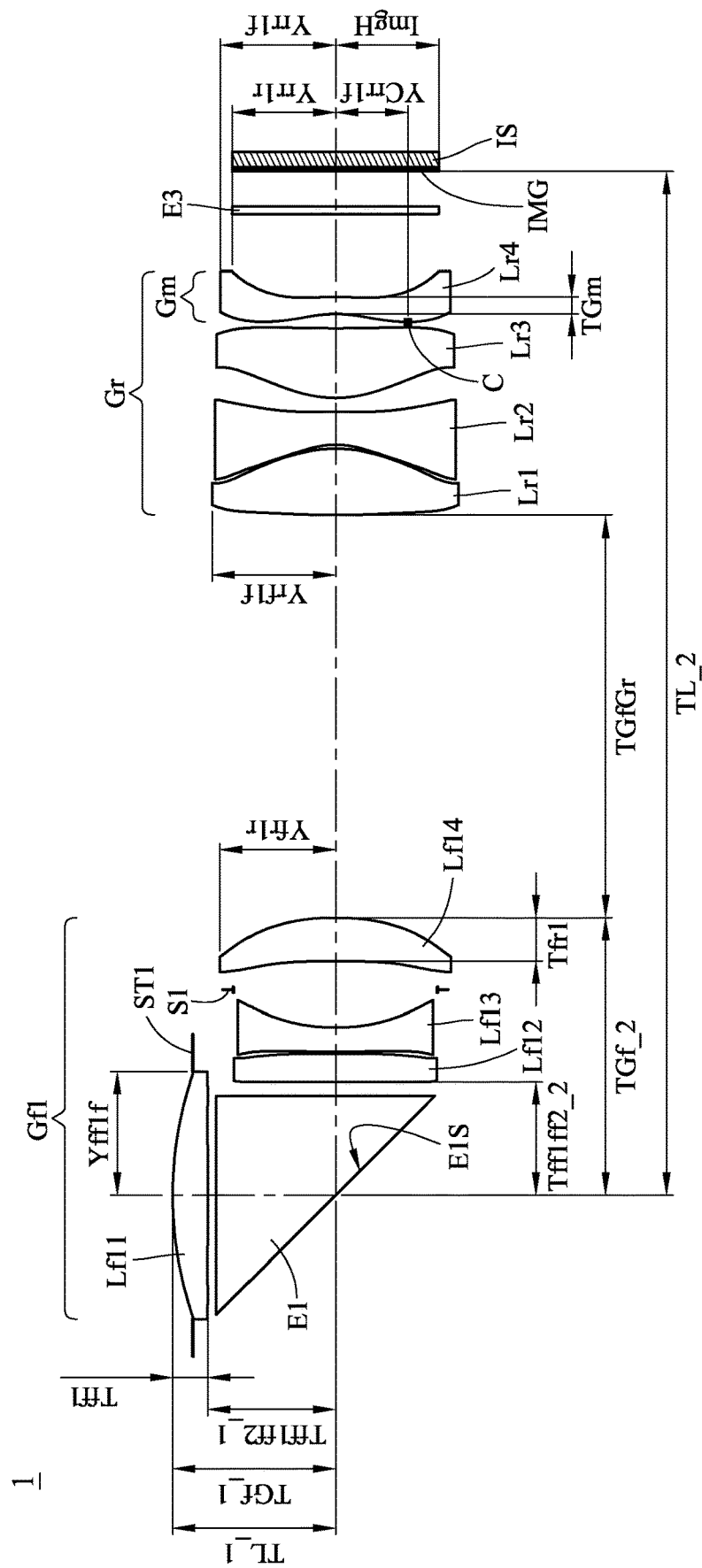
FIG. 24 shows a schematic view of Yff1f, Yfr1r, Yrf1f, Yrr1r, Yrr1f, YCrr1f, ImgH, Tff1, Tff1ff2_1, Tff1ff2_2, Tfr1, TGm, TGf_1, TGf_2, TGfGr, TL_1 and TL_2 when the photographing lens system is in the first optical path state, and a critical point of the object-side surface of the rear group fourth lens element according to the 1st embodiment.
Figure 25:
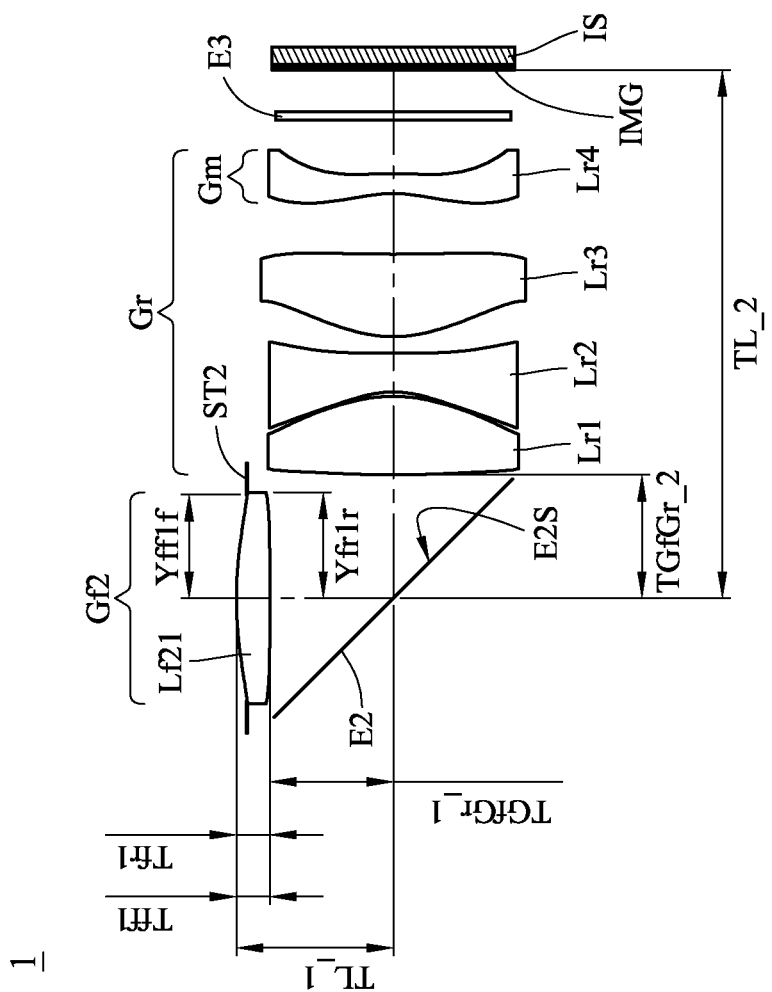
FIG. 25 shows a schematic view of Yff1f, Yfr1r, Tff1, Tfr1, TGfGr_1, TGfGr_2, TL_1 and TL_2 when the photographing lens system is in the second optical path state according to the 1st embodiment.

Please refer to FIG. 24 and FIG. 25, which show schematic views of the photographing lens system respectively in the first optical path state and the second optical path state according to the 1st embodiment of the present disclosure. As shown in FIG. 24, when the photographing lens system is in the first optical path state in a configuration where the front lens group includes four lens elements, a first lens element counted from the object side in the front lens group is a first front group first lens element Lf11, a second lens element counted from the object side in the front lens group is a first front group second lens element Lf12, a second lens element counted from the image side in the front lens group is a first front group third lens element Lf13, and a first lens element counted from the image side in the front lens group is a first front group fourth lens element Lf14. As shown in FIG. 25, when photographing lens system is in the second optical path state in a configuration where the front lens group includes one lens element, a first lens element counted from the object side in the front lens group is a second front group first lens element Lf21, and a first lens element counted from the image side in the front lens group is the second front group first lens element Lf21.

The first lens element counted from the object side in the front lens group can have positive refractive power. Therefore, it is favorable for reducing the size of the front lens group. The object-side surface of the first lens element counted from the object side in the front lens group can be convex in a paraxial region thereof. Therefore, it is favorable for adjusting the traveling direction of light into the photographing lens system so as to reduce the outer diameter of the front lens group.

The second lens element counted from the image side in the front lens group can have negative refractive power. Therefore, it is favorable for balancing the refractive power of the front lens group so as to correct aberrations. The image-side surface of the second lens element counted from the image side in the front lens group can be concave in a paraxial region thereof. Therefore, it is favorable for adjusting the traveling direction of light so as to reduce the outer diameter of the front lens group.

The first lens element counted from the image side in the front lens group can have positive refractive power. Therefore, it is favorable for collaborating with the rear lens group so as to reduce the outer diameter of the photographing lens system. The object-side surface of the first lens element counted from the image side in the front lens group can be concave in a paraxial region thereof. Therefore, it is favorable for collaborating with the other lens elements so as to correct aberrations. The image-side surface of the first lens element counted from the image side in the front lens group can be convex in a paraxial region thereof. Therefore, it is favorable for adjusting the traveling direction of light so as to adjust the distance between the front and rear lens groups in a proper range.

In some configurations, the rear lens group can include at least three lens elements. Therefore, it is favorable for improving image quality and forming a long-focus configuration. Moreover, the rear lens group can also include at least four lens elements. In some configurations, the rear lens group can include four lens elements. Therefore, it is favorable for balancing the field of view, size and image quality.

At least one of the object-side surface and the image-side surface of at least one lens element in the rear lens group is aspheric. Therefore, it is favorable for increasing the shape variation of the lens element so as to correct aberrations and reduce the size of the lens element.

Please refer to FIG. 24 and FIG. 25. In a configuration where the rear lens group includes four lens elements, a first lens element counted from the object side in the rear lens group is a rear group first lens element Lr1, a second lens element counted from the object side in the rear lens group is a rear group second lens element Lr2, a second lens element counted from the image side in the rear lens group is a rear group third lens element Lr3, and a first lens element counted from the image side in the rear lens group is a rear group fourth lens element Lr4.

The first lens element counted from the object side in the rear lens group can have positive refractive power. Therefore, it is favorable for reducing the size of the rear lens group. The object-side surface of the first lens element counted from the object side in the rear lens group can be convex in a paraxial region thereof. Therefore, it is favorable for adjusting the traveling direction of light into the rear lens group so as to reduce the outer diameter of the rear lens group. The image-side surface of the first lens element counted from the object side in the rear lens group can be convex in a paraxial region thereof. Therefore, it is favorable for adjusting the surface shape and refractive power of the first lens element counted from the object side in the rear lens group so as to reduce the length of the rear lens group.

The second lens element counted from the object side in the rear lens group can have negative refractive power. Therefore, it is favorable for collaborating with the first lens element counted from the object side in the rear lens group so as to balance the refractive power distribution and thus correct aberrations, such as spherical aberration. The object-side surface of the second lens element counted from the object side in the rear lens group can be concave in a paraxial region thereof. Therefore, it is favorable for collaborating with the first lens element counted from the object side in the rear lens group so as to correct aberrations.

The second lens element counted from the image side in the rear lens group can have positive refractive power. Therefore, it is favorable for collaborating with the first lens element counted from the image side in the rear lens group so as to correct aberrations. The object-side surface of the second lens element counted from the image side in the rear lens group can be convex in a paraxial region thereof. Therefore, it is favorable for adjusting the surface shape and refractive power of the second lens element counted from the image side in the rear lens group so as to reduce the outer diameter of the rear lens group.

The first lens element counted from the image side in the rear lens group can have negative refractive power. Therefore, it is favorable for adjusting the back focal length in a proper range. The object-side surface of the first lens element counted from the image side in the rear lens group can be concave in a paraxial region thereof. Therefore, it is favorable for adjusting the surface shape and refractive power of the first lens element counted from the image side in the rear lens group so as to correct aberrations. The object-side surface of the first lens element counted from the image side in the rear lens group can have at least one critical point in an off-axis region thereof. Therefore, it is favorable for correcting off-axis aberrations, such as field curvature. Moreover, when a vertical distance between a non-axial critical point on the object-side surface of the first lens element counted from the image side in the rear lens group and an optical axis is YCrr1f, and a maximum effective radius of the object-side surface of the first lens element counted from the image side in the rear lens group is Yrr1f, the object-side surface of the first lens element counted from the image side in the rear lens group can have at least one critical point in the off-axis region thereof satisfying the following condition: $0.50 < YCrr1f/Yrr1f < 0.90$. Therefore, it is favorable for correcting aberrations. Please refer to FIG. 24, which shows a schematic view of YCrr1f, Yrr1f and the critical point C in the off-axis region of the object-side surface of the rear group fourth lens element Lr4 according to the 1st embodiment. The critical point C in the off-axis region of the object-side surface of the rear group fourth lens element Lr4 in FIG. 24 is only exemplary. In this and other embodiments of the present disclosure, the object-side surface and the image-side surface of each lens element can have one or more non-axial critical points.

Figure 1:
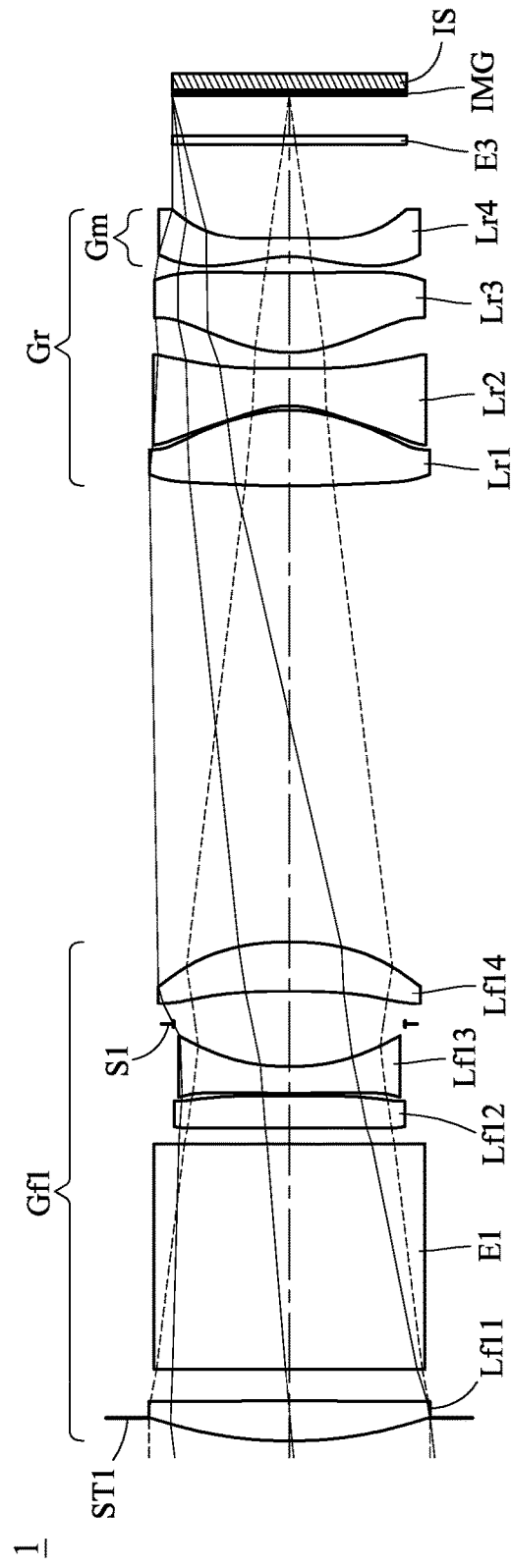
FIG. 1 is a schematic view of an image capturing unit when a photographing lens system is in a first optical path state according to the 1st embodiment of the present disclosure.
Figure 5:
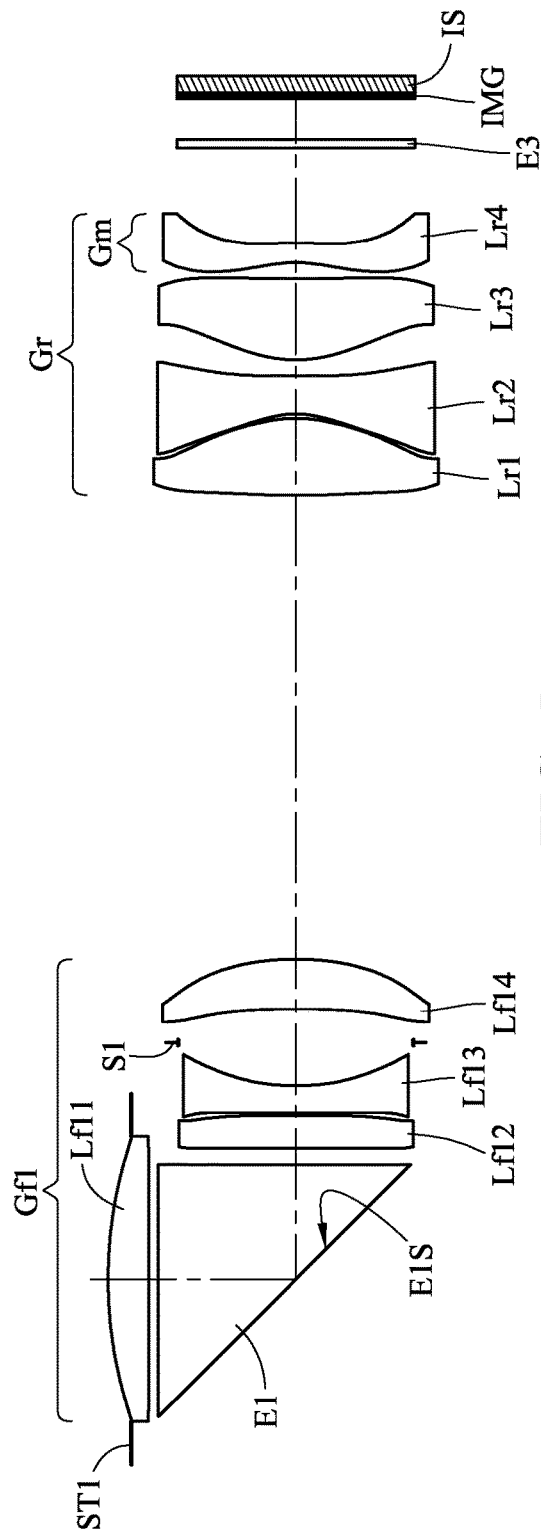
FIG. 5 is a schematic view of a first optical path being folded by a reflector in the image capturing unit according to the 1st embodiment.

According to the present disclosure, the photographing lens system can include two front lens groups, which are a first front lens group and a second front lens group. In some configurations, the first front lens group includes four lens elements, the second front lens group includes one lens element, and the rear lens group includes four lens elements. Furthermore, the photographing lens system can further include an optical path switching mechanism configured for the photographing lens system to be switched between a first optical path state and a second optical path state. When the photographing lens system is in the first optical path state, the photographing lens system includes, in order from the object side to the image side along a first optical path, the first front lens group and the rear lens group. When the photographing lens system is in the second optical path state, the photographing lens system includes, in order from the object side to the image side along a second optical path, the second front lens group and the rear lens group. Therefore, by sharing a rear lens group in both optical path states, the space occupied by the two optical paths can be reduced. According to the present disclosure, a focal length of the photographing lens system in the first optical path state can be larger than a focal length of the photographing lens system in the second optical path state. Please refer to FIG. 1, FIG. 2, FIG. 5 and FIG. 6 to FIG. 8. FIG. 1 and FIG. 5 show schematic views of the image capturing unit when the photographing lens system is in the first optical path state according to the 1st embodiment of the present disclosure, and FIG. 2 and FIG. 6 to FIG. 8 show schematic views of various examples of the image capturing unit when the photographing lens system is in the second optical path state according to the 1st embodiment of the present disclosure.

The photographing lens system can include at least two reflectors, and the at least two reflectors can include a first reflector and a second reflector. The first reflector can be disposed in the first front lens group. When the photographing lens system is in the second optical path state, the second reflector can be located between the second front lens group and the rear lens group in the second optical path. Therefore, it is favorable for adjusting the arrangement of lens elements so as to improve image quality and obtain a balance between the size distribution and image quality.

Figure 26:
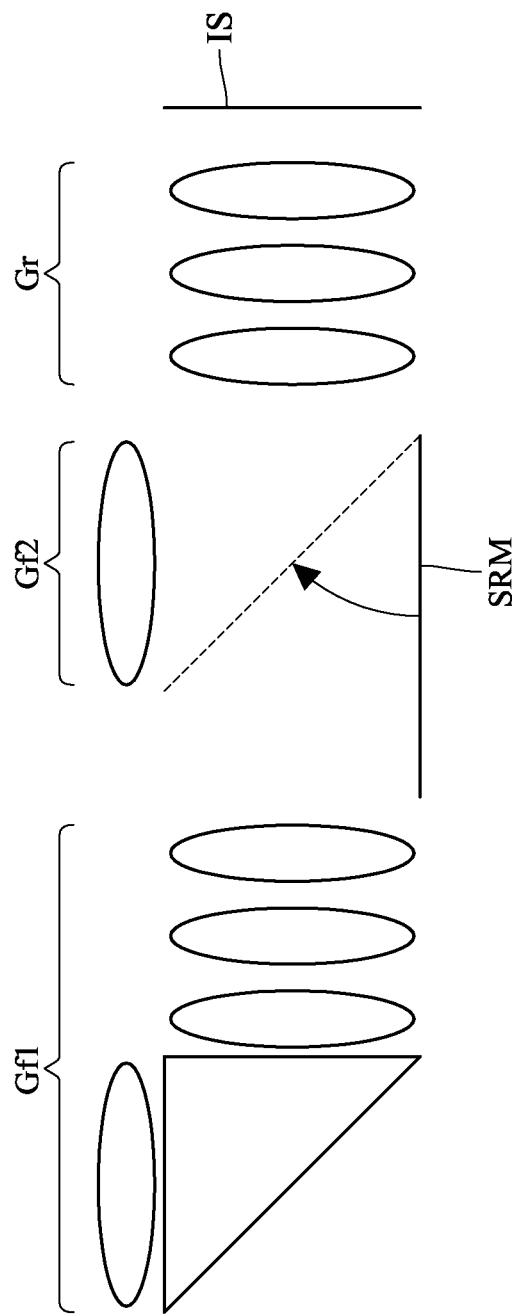
FIG. 26 is a schematic side view of a configuration of an optical path switching mechanism in a photographing lens system according to one embodiment of the present disclosure.

The optical path switching mechanism can include at least one reflector, and the at least one reflector is movable or rotatable relative to the first front lens group, the second front lens group or the rear lens group. Therefore, it is favorable for simplifying the design of the optical path switching mechanism and reducing the space occupied by the photographing lens system. For example, please refer to FIG. 26 and FIG. 27. FIG. 26 is a schematic side view of a configuration of an optical path switching mechanism in a photographing lens system according to one embodiment of the present disclosure, and FIG. 27 is a schematic top view of another configuration of an optical path switching mechanism in a photographing lens system according to one embodiment of the present disclosure.

In the configuration as shown in FIG. 26, the optical path switching mechanism includes a reflector SRM, and the reflector SRM is, for example, a flat mirror. In addition, the reflector SRM is rotatable relative to the first front lens group Gf1, the second front lens group Gf2, the rear lens group Gr and the image sensor IS. The optical path switching mechanism is configured for the photographing lens system to be switched between the first optical path state and the second optical path state by rotating the reflector SRM. In specific, the reflector SRM of the optical path switching mechanism can be rotated to a position (as shown by the dotted line) located between the second front lens group Gf2 and the rear lens group Gr in the second optical path so as to switch the photographing lens system from the first optical path state to the second optical path state, or the reflector SRM can be rotated away from the position between the second front lens group Gf2 and the rear lens group Gr so as to switch the photographing lens system from the second optical path state to the first optical path state.

Figure 27:
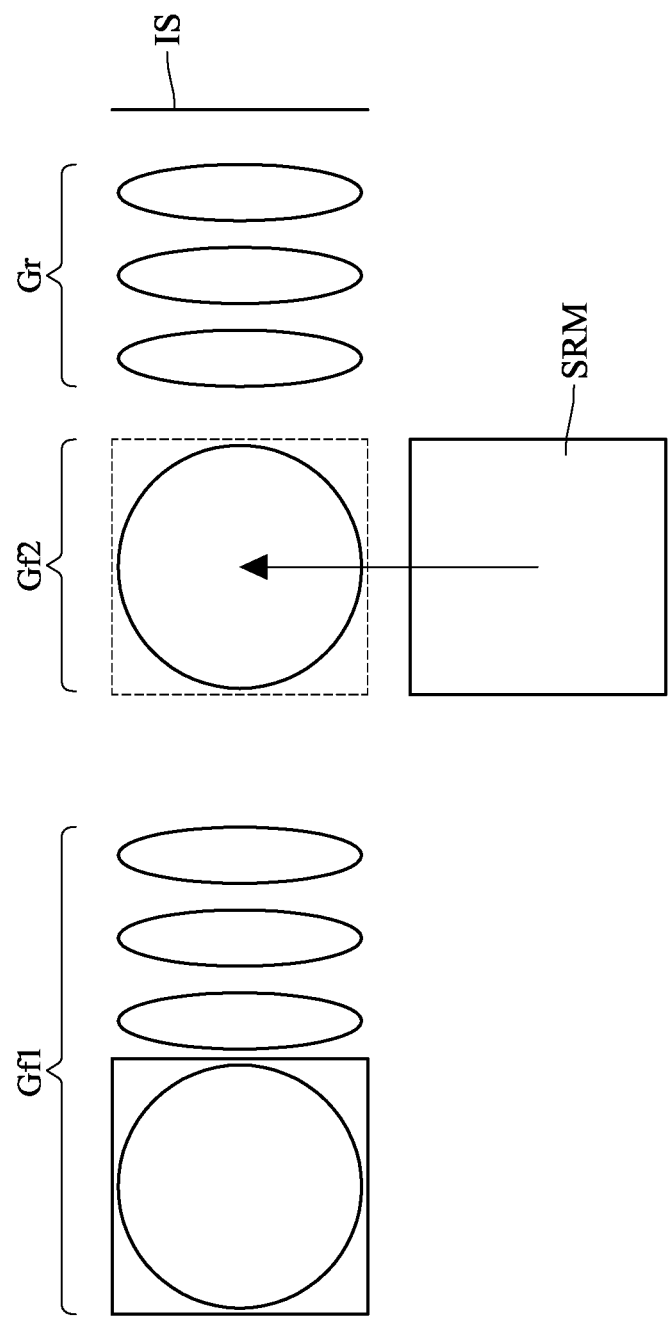
FIG. 27 is a schematic top view of another configuration of an optical path switching mechanism in a photographing lens system according to one embodiment of the present disclosure.

In the configuration as shown in FIG. 27, the optical path switching mechanism includes a reflector SRM, and the reflector SRM is movable relative to the first front lens group Gf1, the second front lens group Gf2, the rear lens group Gr and the image sensor IS. The optical path switching mechanism is configured for the photographing lens system to be switched between the first optical path state and the second optical path state by moving the reflector SRM. In specific, the reflector SRM of the optical path switching mechanism can be moved to a position (as shown by the dotted line) located between the second front lens group Gf2 and the rear lens group Gr in the second optical path so as to switch the photographing lens system from the first optical path state to the second optical path state, or the reflector SRM can be moved away from the position between the second front lens group Gf2 and the rear lens group Gr so as to switch the photographing lens system from the second optical path state to the first optical path state.

Figure 28:
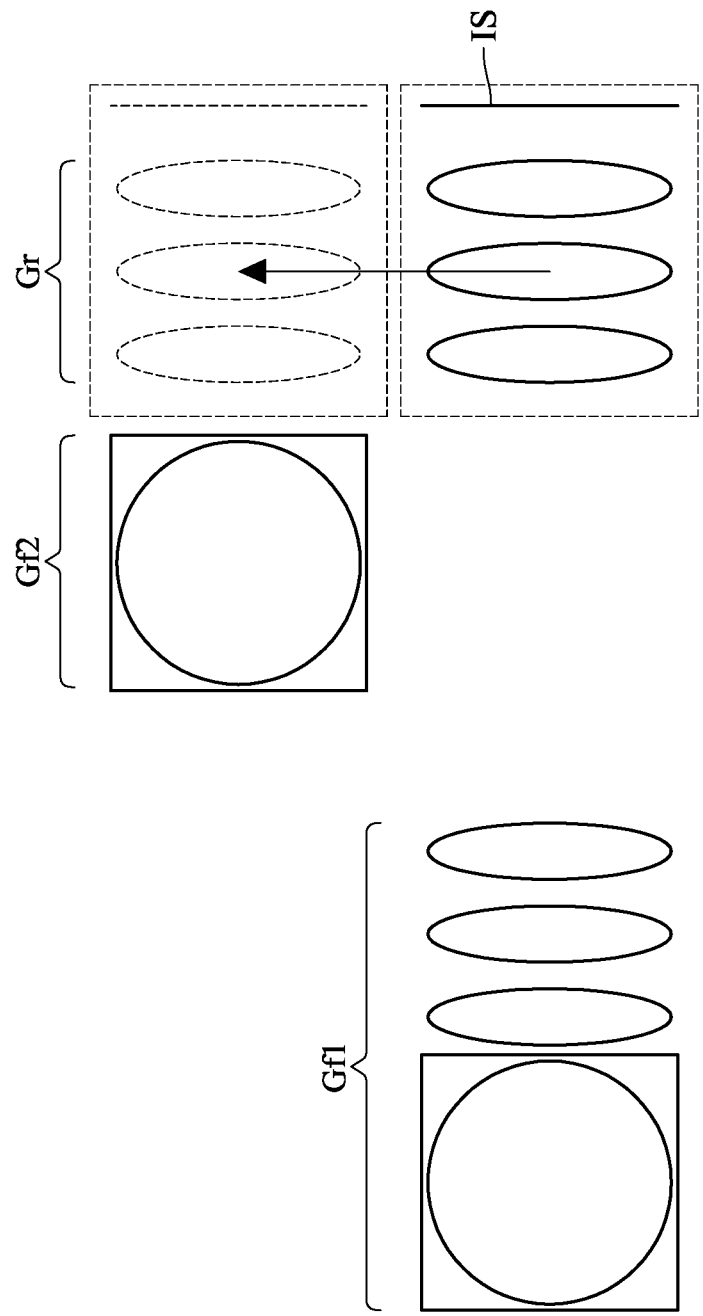
FIG. 28 is a schematic top view of another configuration of an optical path switching mechanism in a photographing lens system according to one embodiment of the present disclosure.
Figure 29:
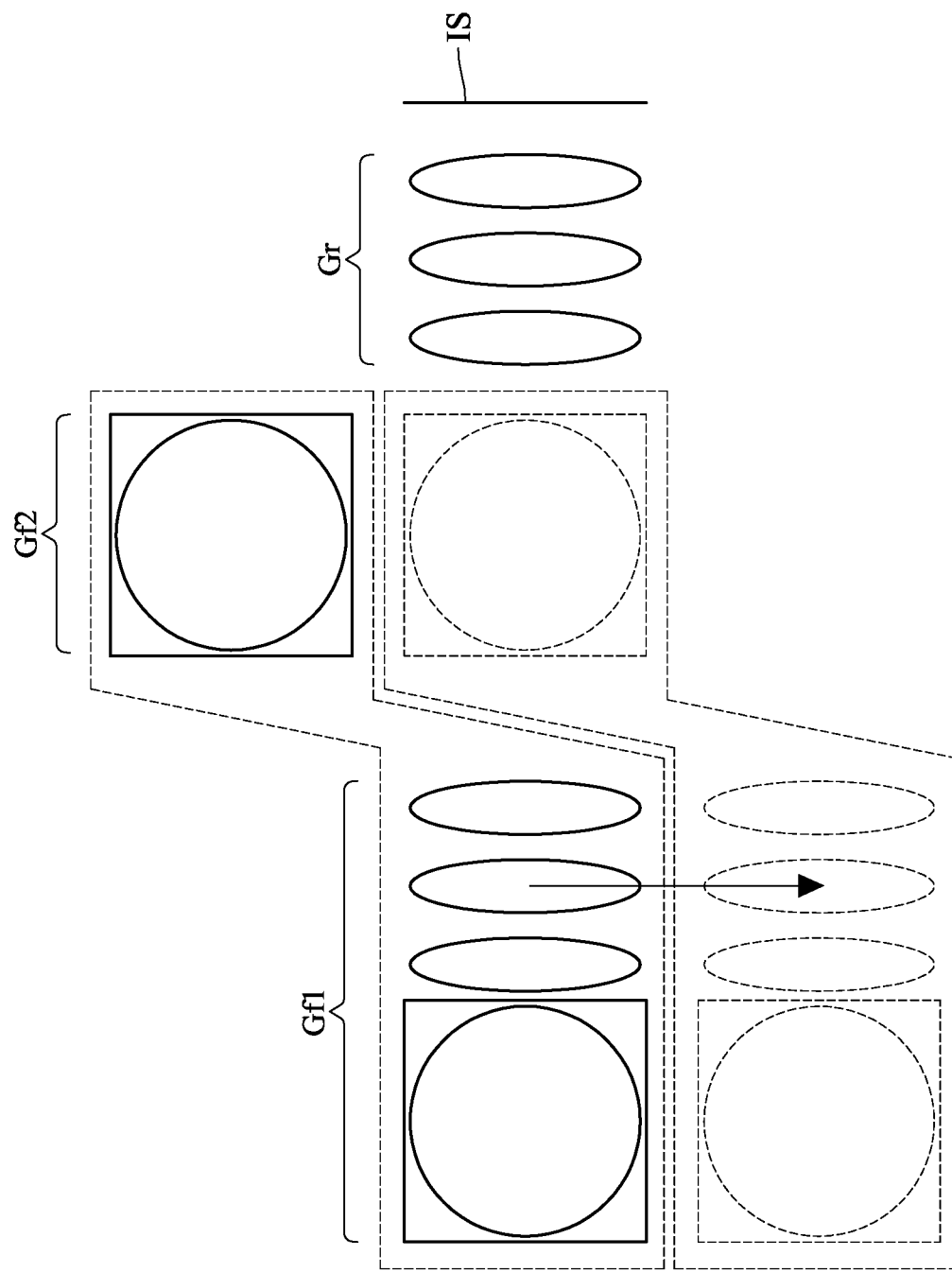
FIG. 29 is a schematic top view of another configuration of an optical path switching mechanism in a photographing lens system according to one embodiment of the present disclosure.

FIG. 26 and FIG. 27 show that the optical path switching mechanism switches optical paths by moving or rotating the reflector, but the present disclosure is not limited thereto. Please refer to FIG. 28 and FIG. 29. FIG. 28 is a schematic top view of another configuration of an optical path switching mechanism in a photographing lens system according to one embodiment of the present disclosure, and FIG. 29 is a schematic top view of another configuration of an optical path switching mechanism in a photographing lens system according to one embodiment of the present disclosure. In the configuration as shown in FIG. 28, the optical path switching mechanism includes the rear lens group Gr and the image sensor IS, and the rear lens group Gr and the image sensor IS are movable relative to the first front lens group Gf1 and the second front lens group Gf2. The optical path switching mechanism is configured for the photographing lens system to be switched between the first optical path state and the second optical path state by moving the rear lens group Gr and the image sensor IS. For example, the rear lens group Gr and the image sensor IS of the optical path switching mechanism can be moved from a position (as shown by the solid line) where the rear lens group Gr and the image sensor IS correspond to the first front lens group Gf1 in the first optical path to a position (as shown by the dotted line) where the rear lens group Gr and the image sensor IS correspond to the second front lens group Gf2 in the second optical path so as to switch the photographing lens system from the first optical path state to the second optical path state.

In the configuration as shown in FIG. 29, the optical path switching mechanism includes the first front lens group Gf1 and the second front lens group Gf2, and the first front lens group Gf1 and the second front lens group Gf2 are movable relative to the rear lens group Gr and the image sensor IS. The optical path switching mechanism is configured for the photographing lens system to be switched between the first optical path state and the second optical path state by moving the first front lens group Gf1 and the second front lens group Gf2. For example, the first front lens group Gf1 and the second front lens group Gf2 of the optical path switching mechanism can be moved from a position (as shown by the solid line) where the first front lens group Gf1 corresponds to the rear lens group Gr to a position (as shown by the dotted line) where the second front lens group Gf2 corresponds to the rear lens group Gr so as to switch the photographing lens system from the first optical path state to the second optical path state. According to the present disclosure, the optical path switching mechanism switches optical paths by moving or rotating some components (e.g., lens elements or reflector). However, the type, number and arrangement of components included in the optical path switching mechanism can be altered according to actual requirements, and the present disclosure is not limited thereto.

The rear lens group can include a movable lens subgroup, and the movable lens subgroup includes at least one lens element. Therefore, it is favorable for focusing so as to improve image quality. Moreover, the movable lens subgroup can include the first lens element counted from the image side in the rear lens group. Therefore, it is favorable for simplifying the mechanical design. Moreover, when the photographing lens system is being switched from one of the first optical path state and the second optical path state to the other, the movable lens subgroup can be moved along the optical axis. Therefore, it is favorable for reducing the required number of lens elements for achieving the same zoom ratio so as to reduce the size of the photographing lens system. Moreover, when the photographing lens system is being switched from the first optical path state to the second optical path state, the movable lens subgroup can be moved towards the image side along the optical axis.

The movable lens subgroup can have negative refractive power. Therefore, it is favorable for reducing the total length of the rear lens group. Moreover, when a focal length of the movable lens subgroup is FGm, and a central thickness of the movable lens subgroup is TGm, the following condition can be satisfied: $-50.0 < FGm/TGm < -10.0$. Therefore, it is favorable for adjusting the arrangement of the movable lens subgroup so as to reduce the size of the movable lens subgroup. Moreover, the following condition can also be satisfied: $-40.0 < FGm/TGm < -13.0$. Moreover, the following condition can also be satisfied: $-30.0 < FGm/TGm < -16.0$. Please refer to FIG. 24, which shows a schematic view of TGm according to the 1st embodiment of the present disclosure. Said focal length of the movable lens subgroup is a composite focal length of all lens elements in the movable lens subgroup. Said central thickness of the movable lens subgroup is an axial distance between the object-side surface of the first lens element counted from the object side in the movable lens subgroup and the image-side surface of the first lens element counted from the image side in the movable lens subgroup. In a configuration where the movable lens subgroup includes only one lens element, said focal length of the movable lens subgroup is the focal length of the one lens element, and said central thickness of the movable lens subgroup is the central thickness of the one lens element.

When an Abbe number of the first lens element counted from the image side in the rear lens group is Vrr1, and an Abbe number of the second lens element counted from the image side in the rear lens group is Vrr2, the following condition can be satisfied: $1.2 < Vrr1/Vrr2 < 7.5$. Therefore, it is favorable for adjusting the material distribution of the lens elements in the rear lens group so as to correct aberrations and form a long-focus configuration. Moreover, the following condition can also be satisfied: $1.6 < Vrr1/Vrr2 < 6.5$. Moreover, the following condition can also be satisfied: $2.0 < Vrr1/Vrr2 < 5.5$.

When an axial distance between the image-side surface of the first lens element counted from the image side in the front lens group and the object-side surface of the first lens element counted from the object side in the rear lens group is TGfGr, and a central thickness of the first lens element counted from the image side in the front lens group is Tfr1, the following condition can be satisfied: $1.6 < TGfGr/Tfr1$. Therefore, it is favorable for the front and rear lens groups to collaborate each other so as to achieve a telephoto configuration. Furthermore, for applications in systems having switchable optical paths, it is favorable for the design of the optical path switching mechanism so as to reduce the size of the photographing lens system. Moreover, the following condition can also be satisfied: 2.4<TGfGr/Tfr1. Moreover, the following condition can also be satisfied: 3.2<TGfGr/Tfr1. Moreover, the following condition can also be satisfied: 4.0<TGfGr/Tfr1. Moreover, the following condition can also be satisfied: TGfGr/Tfr1<50. Therefore, it is favorable for adjusting the arrangement of the lens groups so as to reduce the space occupied by the lens groups. Moreover, the following condition can also be satisfied: TGfGr/Tfr1<35. Moreover, the following condition can also be satisfied: TGfGr/Tfr1<25. Moreover, the following condition can also be satisfied: TGfGr/Tfr1<15. Moreover, the following condition can also be satisfied: 2.4<TGfGr/Tfr1<50. Moreover, the following condition can also be satisfied: 3.2<TGfGr/Tfr1<35. Please refer to FIG. 24 and FIG. 25. FIG. 24 shows a schematic view of TGfGr and Tfr1 according to the 1st embodiment, and FIG. 25 shows a schematic view of TGfGr_1, TGfGr_2 and Tfr1 according to the 1st embodiment. As shown in FIG. 25, in the 1st embodiment of the present disclosure, when the photographing lens system is in the second optical path state, an axial distance between the image-side surface of the first lens element counted from the image side in the second front lens group Gf2 (i.e., the image-side surface of the second front group first lens element Lf21) and the reflection surface E2S of the reflection mirror E2 (i.e., the reflector) is TGfGr_1, and an axial distance between the reflection surface E2S of the reflection mirror E2 and the object-side surface of the first lens element counted from the object side in the rear lens group Gr (i.e., the object-side surface of the rear group first lens element Lr1) is TGfGr_2. Moreover, when the photographing lens system is in the second optical path state, TGfGr is a sum of TGfGr_1 and TGfGr_2 (i.e., TGfGr=TGfGr_1+TGfGr_2).

When an axial distance between the object-side surface of the first lens element counted from the object side in the front lens group and the image-side surface of the first lens element counted from the image side in the front lens group is TGf, and an axial distance between the image-side surface of the first lens element counted from the object side in the front lens group and the object-side surface of the second lens element counted from the object side in the front lens group is Tff1ff2, the following condition can be satisfied: 1.2<TGf/Tff1ff2<3.0. Therefore, it is favorable for adjusting the distribution of lens elements in the front lens group so as to improve image quality, and it is favorable for the arrangement of the reflector. Moreover, the following condition can also be satisfied: 1.5<TGf/Tff1 ff2<2.4. Please refer to FIG. 24, which shows a schematic view of TGf_1, TGf_2, Tff1ff2_1 and Tff1ff2_2 according to the 1st embodiment. As shown in FIG. 24, in the 1st embodiment, when the photographing lens system is in the first optical path state, an axial distance between the object-side surface of the first lens element counted from the object side in the first front lens group Gf1 (i.e., the object-side surface of the first front group first lens element Lf11) and the reflection surface E1S of the prism E1 (i.e., the reflector) is TGf_1, an axial distance between the reflection surface E1S of the prism E1 and the image-side surface of the first lens element counted from the image side in the first front lens group Gf1 (i.e., the image-side surface of the first front group fourth lens element Lf14) is TGf_2, an axial distance between the image-side surface of the first lens element counted from the object side in the first front lens group Gf1 (i.e., the image-side surface of the first front group first lens element Lf11) and the reflection surface E1S of the prism E1 is Tff1ff2_1, and an axial distance between the reflection surface E1S of the prism E1 and the object-side surface of the second lens element counted from the object side in the first front lens group Gf1 (i.e., the object-side surface of the first front group second lens element Lf12) is Tff1ff2_2. Moreover, when the photographing lens system is in the first optical path state, TGf is a sum of TGf_1 and TGf_2 (i.e., TGf=TGf_1+TGf_2), and Tff1ff2 is a sum of Tff1ff2_1 and Tff1ff2_2 (i.e., Tff1ff2=Tff1ff2_1+Tff1ff2_2).

When an axial distance between the object-side surface of the first lens element counted from the object side in the front lens group and an image surface is TL, and a focal length of the photographing lens system is F, the following condition can be satisfied: 0.80<TL/F<2.0. Therefore, it is favorable for obtaining a balance between the total track length and the field of view. Moreover, the following condition can also be satisfied: 1.1<TL/F<1.7. Please refer to FIG. 24 and FIG. 25, which show schematic views of TL_1 and TL_2 according to the 1st embodiment. As shown in FIG. 24, in the 1st embodiment, when the photographing lens system is in the first optical path state, an axial distance between the object-side surface of the first lens element counted from the object side in the first front lens group Gf1 (i.e., the object-side surface of the first front group first lens element Lf11) and the reflection surface E1S of the prism E1 is TL_1, and an axial distance between the reflection surface E1S of the prism E1 and the image surface IMG is TL_2. When the photographing lens system is in the first optical path state, TL is a sum of TL_1 and TL_2 (i.e., TL=TL_1+TL_2). As shown in FIG. 25, in the 1st embodiment, when the photographing lens system is in the second optical path state, an axial distance between the object-side surface of the first lens element counted from the object side in the second front lens group Gf2 (i.e., the object-side surface of the second front group first lens element Lf21) and the reflection surface E2S of the reflection mirror E2 is TL_1, and an axial distance between the reflection surface E2S of the reflection mirror E2 and the image surface IMG is TL_2. When the photographing lens system is in the second optical path state, TL is a sum of TL_1 and TL_2 (i.e., TL=TL_1+TL_2).

When a focal length of the first lens element counted from the object side in the rear lens group is Frf1, a focal length of the second lens element counted from the object side in the rear lens group is Frf2, a focal length of the second lens element counted from the image side in the rear lens group is Frr2, and a focal length of the first lens element counted from the image side in the rear lens group is Frr1, the following condition can be satisfied: −2.0<(Frf2+Frr1)/(Frf1+Frr2)<−0.50. Therefore, it is favorable for adjusting the refractive power distribution of the rear lens group so as to correct aberrations and reduce the length of the rear lens group. Moreover, the following condition can also be satisfied: −1.6<(Frf2+Frr1)/(Frf1+Frr2)<−0.75. Moreover, the following condition can also be satisfied: −1.4<(Frf2+Frr1)/(Frf1+Frr2)<−0.95.

When an f-number of the photographing lens system is Fno, the following condition can be satisfied: 2.0<Fno<5.0. Therefore, it is favorable for obtaining a balance between the illuminance and the depth of view.

When half of a maximum field of view of the photographing lens system is HFOV, the following condition can be satisfied: 3.0 degrees<HFOV<18.0 degrees. Therefore, it is favorable for obtaining a telephoto configuration in the photographing lens system. Moreover, the following condition can also be satisfied: 5.0 degrees<HFOV<15.0 degrees.

When a maximum effective radius of the object-side surface of the first lens element counted from the object side in the front lens group is Yff1f, and a maximum effective radius of the image-side surface of the first lens element counted from the image side in the front lens group is Yfr1r, the following condition can be satisfied: 0.80<Yff1f/Yfr1r<1.2. Therefore, it is favorable for adjusting the traveling direction of light so as to reduce the outer diameter of the front lens group. Please refer to FIG. 24 and FIG. 25, which show schematic views of Yff1f and Yfr1r according to the 1st embodiment.

When the maximum effective radius of the object-side surface of the first lens element counted from the object side in the front lens group is Yff1f, a maximum effective radius of the image-side surface of the first lens element counted from the image side in the rear lens group is Yrr1r, the following condition can be satisfied: 0.70<Yff1f/Yrr1r<1.4. Therefore, it is favorable for adjusting the traveling direction of light so as to balance the field of view, the size of the image surface and the size distribution of the photographing lens system. Please refer to FIG. 24, which shows a schematic view of Yff1f and Yrr1r according to the 1st embodiment.

When a maximum effective radius of the object-side surface of the first lens element counted from the object side in the rear lens group is Yrf1f, and the maximum effective radius of the image-side surface of the first lens element counted from the image side in the rear lens group is Yrr1r, the following condition can be satisfied: 0.70<Yrf1f/Yrr1r<1.4. Therefore, it is favorable for adjusting the traveling direction of light so as to reduce the outer diameter of the rear lens group. Please refer to FIG. 24, which shows a schematic view of Yrf1f and Yrr1r according to the 1st embodiment.

When a focal length of the first lens element counted from the object side in the front lens group is Fff1, and a central thickness of the first lens element counted from the object side in the front lens group is Tff1, the following condition can be satisfied: 0<Fff1/Tff1<35.0. Therefore, it is favorable for adjusting the surface shape and refractive power of the first lens element counted from the object side in the front lens group so as to reduce the size of the front lens group. Moreover, the following condition can also be satisfied: 10.0<Fff1/Tff1<25.0. Please refer to FIG. 24 and FIG. 25, which show schematic views of Tff1 according to the 1st embodiment.

When a focal length of the first lens element counted from the image side in the front lens group is Ffr1, and a focal length of the second lens element counted from the image side in the front lens group is Ffr2, the following condition can be satisfied: −2.0<Ffr1/Ffr2<−1.0. Therefore, it is favorable for the refractive power of the lens elements of the front lens group to collaborate with one another so as to correct aberrations. Moreover, the following condition can also be satisfied: −1.7<Ffr1/Ffr2<−1.3.

When an Abbe number of the first lens element counted from the object side in the rear lens group is Vrf1, an Abbe number of the second lens element counted from the object side in the rear lens group is Vrf2, the Abbe number of the second lens element counted from the image side in the rear lens group is Vrr2, and the Abbe number of the first lens element counted from the image side in the rear lens group is Vrr1, the following condition can be satisfied: 1.8<(Vrf1+Vrr1)/(Vrf2+Vrr2)<6.0. Therefore, it is favorable for adjusting the material arrangement of the rear lens group so as to correct aberrations, such as chromatic aberration. Moreover, the following condition can also be satisfied: 2.1<(Vrf1+Vrr1)/(Vrf2+Vrr2)<4.5.

When a focal length of the front lens group is FGf, and a focal length of the rear lens group is FGr, the following condition can be satisfied: 0<FGf/|FGr|<0.90. Therefore, it is favorable for the front lens group and the rear lens group to collaborate with each other so as to adjust the size distribution and correct aberrations. Moreover, the following condition can also be satisfied: 0<FGf/|FGr|<0.70. Moreover, the following condition can also be satisfied: 0<FGf/|FGr|<0.50. A focal length of a lens group is a composite focal length of all lens elements in the lens group.

When an entrance pupil diameter of the photographing lens system is EPD, and the maximum effective radius of the object-side surface of the first lens element counted from the object side in the front lens group is Yff1f, the following condition can be satisfied: 1.8<EPD/Yff1f<2.2. Therefore, it is favorable for obtaining a balance between enlarging the aperture stop and reducing the outer diameter of the lens element.

When the maximum effective radius of the object-side surface of the first lens element counted from the object side in the front lens group is Yff1f, and a maximum image height of the photographing lens system (which can be half of a diagonal length of an effective photosensitive area of the image sensor) is ImgH, the following condition can be satisfied: 0.70<Yff1f/ImgH<1.4. Therefore, it is favorable for obtaining a balance between reducing the outer diameter of the lens element and enlarging the image surface, and it is favorable for adjusting the field of view. Please refer to FIG. 24, which show a schematic view of Yff1f and ImgH according to the 1st embodiment.

When a maximum value among maximum effective radii of all lens surfaces of lens elements in the photographing lens system is Ymax, and a minimum value among maximum effective radii of all lens surfaces of lens elements in the photographing lens system is Ymin, the following condition can be satisfied: 1.0<Ymax/Ymin<1.5. Therefore, it is favorable for reducing the outer diameter of the photographing lens system and adjusting the field of view.

When a minimum value among Abbe numbers of all lens elements in the rear lens group is minVGr, the following condition can be satisfied: 8.0<minVGr<26.5. Therefore, it is favorable for adjusting the material distribution of the lens elements in the rear lens group so as to correct chromatic aberration. Moreover, the following condition can also be satisfied: 10.0<minVGr<23.0. Moreover, the following condition can also be satisfied: 12.0<minVGr<20.0.

When a focal length of the photographing lens system in the first optical path state is FS1, and a focal length of the photographing lens system in the second optical path state is FS2, the following condition can be satisfied: 1.2<FS1/FS2. Therefore, it is favorable for adjusting the focal lengths of the photographing lens system in the first optical path state and the second optical path state so as to increase the zoom ratio. Moreover, the following condition can also be satisfied: 1.4<FS1/FS2<5.5. Therefore, it is favorable for preventing too much space being occupied by the photographing lens system due to an overly large zoom ratio. Moreover, the following condition can also be satisfied: 1.6<FS1/FS2<4.3. Moreover, the following condition can also be satisfied: 1.8<FS1/FS2<3.1.

When a focal length of the first front lens group is FGf1, and a focal length of the second front lens group is FGf2, the following condition can be satisfied: 1.2<FGf1/FGf2<2.0. Therefore, it is favorable for adjusting the focal length of the first front lens group and that of the second front lens group so as to balance the zoom ratio and the occupied space.

According to the present disclosure, the aforementioned features and conditions can be utilized in numerous combinations so as to achieve corresponding effects.

According to the present disclosure, the lens elements of the photographing lens system can be made of either glass or plastic material. When the lens elements are made of glass material, the refractive power distribution of the photographing lens system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the photographing lens system can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, a critical point is a non-axial point of the lens surface where its tangent is perpendicular to the optical axis.

According to the present disclosure, the image surface of the photographing lens system, based on the corresponding image sensor, can be flat or curved, especially a curved surface being concave facing towards the object side of the photographing lens system.

According to the present disclosure, an image correction unit, such as a field flattener, can be optionally disposed between the lens element closest to the image side of the photographing lens system along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 30:
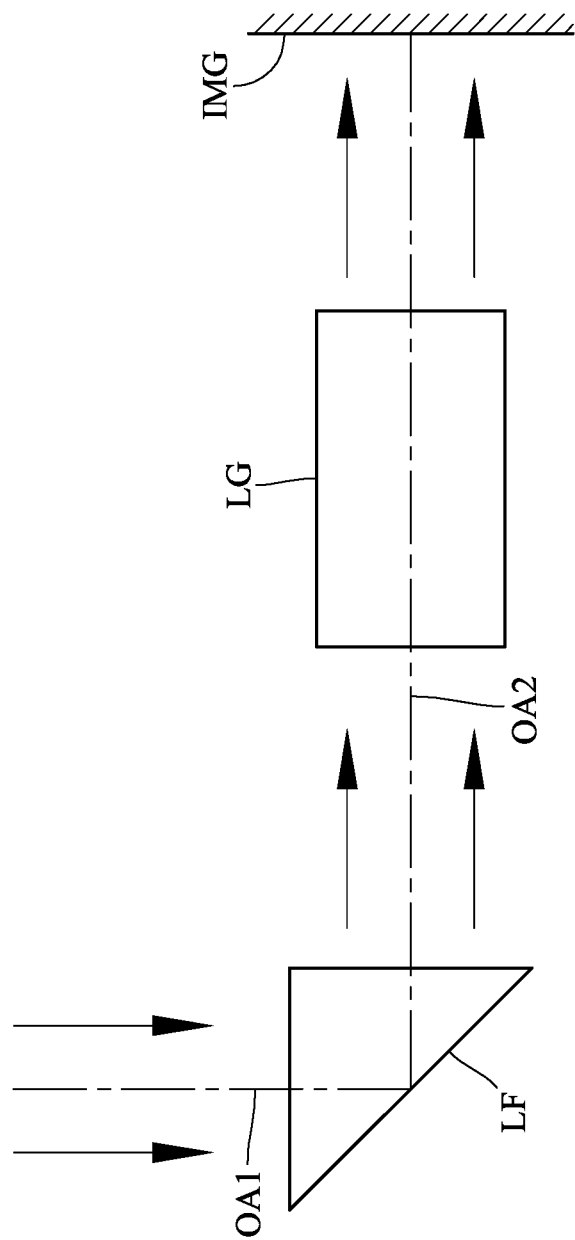
FIG. 30 shows a schematic view of a configuration of one light-folding element in a photographing lens system according to one embodiment of the present disclosure.
Figure 31:
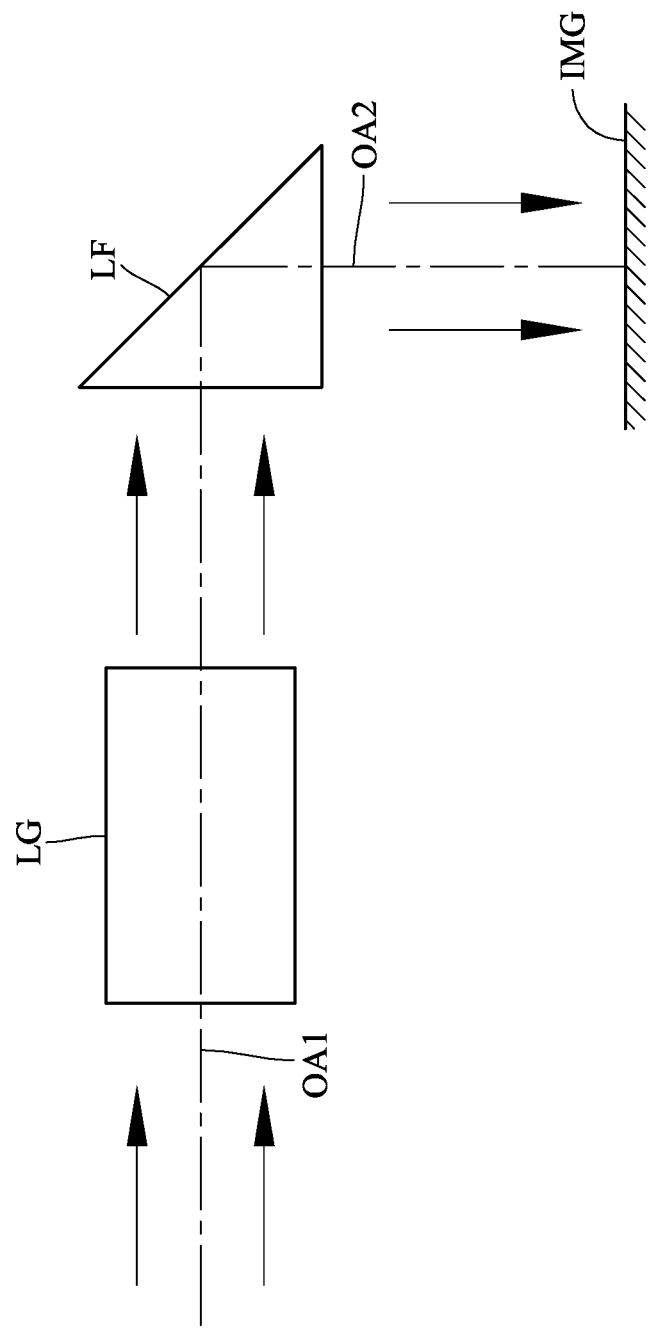
FIG. 31 shows a schematic view of another configuration of one light-folding element in a photographing lens system according to one embodiment of the present disclosure.
Figure 32:
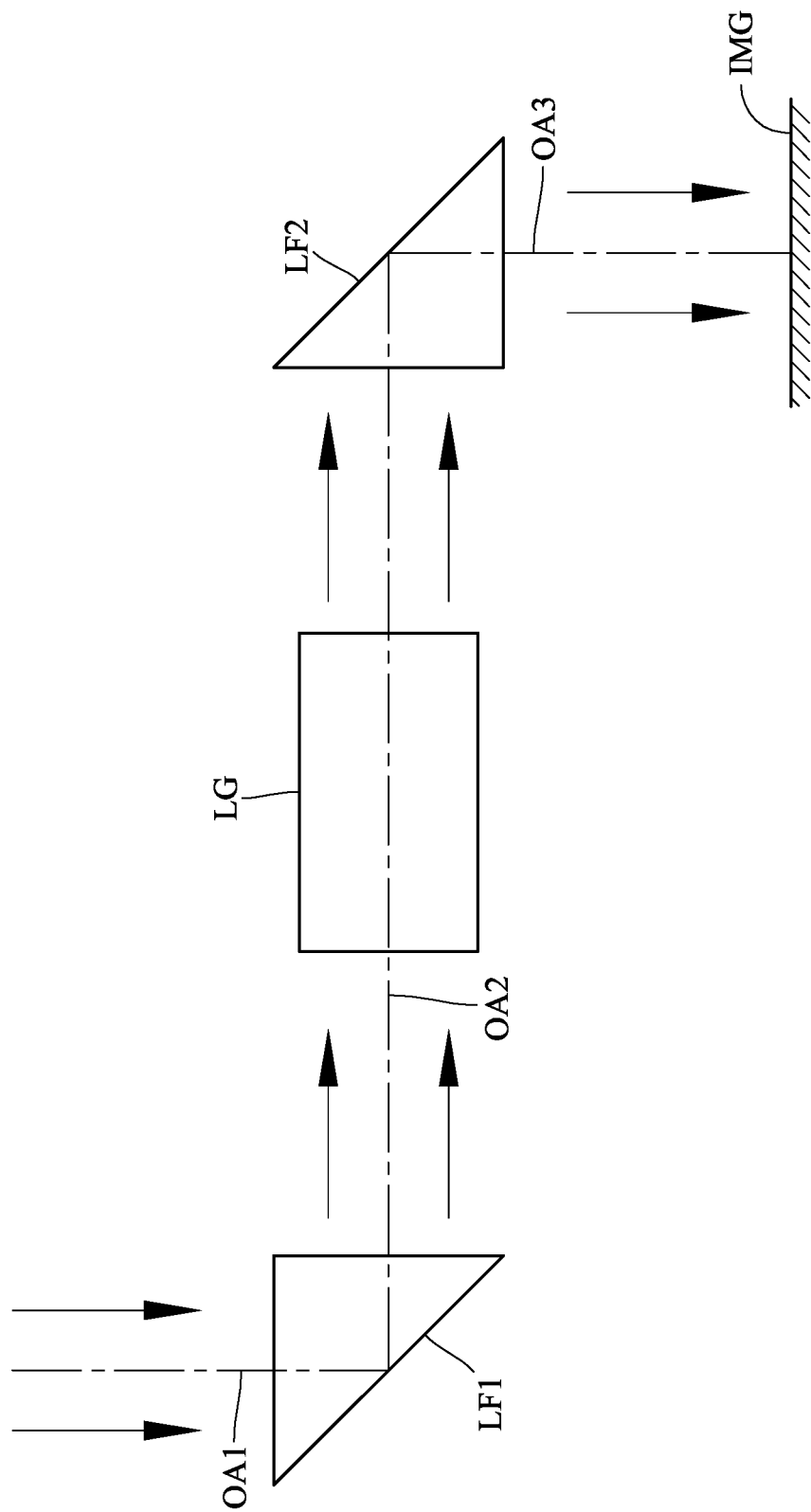
FIG. 32 shows a schematic view of a configuration of two light-folding elements in a photographing lens system according to one embodiment of the present disclosure.

According to the present disclosure, at least one light-folding element, such as a prism or a mirror, can be optionally disposed between an imaged object and the image surface on the imaging optical path, such that the photographing lens system can be more flexible in space arrangement, and therefore the dimensions of an electronic device is not restricted by the total track length of the photographing lens system. Specifically, please refer to FIG. 30 and FIG. 31. FIG. 30 shows a schematic view of a configuration of a light-folding element in a photographing lens system according to one embodiment of the present disclosure, and FIG. 31 shows a schematic view of another configuration of a light-folding element in a photographing lens system according to one embodiment of the present disclosure. In FIG. 30 and FIG. 31, the photographing lens system can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the photographing lens system as shown in FIG. 30 or disposed between a lens group LG of the photographing lens system and the image surface IMG as shown in FIG. 31. Furthermore, please refer to FIG. 32, which shows a schematic view of a configuration of two light-folding elements in a photographing lens system according to one embodiment of the present disclosure. In FIG. 32, the photographing lens system can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the photographing lens system, the second light-folding element LF2 is disposed between the lens group LG of the photographing lens system and the image surface IMG, and the travelling direction of light on the first optical axis OA1 can be the same direction as the travelling direction of light on the third optical axis OA3 as shown in FIG. 32. The photographing lens system can be optionally provided with three or more light-folding elements, and the present disclosure is not limited to the type, amount and position of the light-folding elements of the embodiments disclosed in the aforementioned figures.

According to the present disclosure, the photographing lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photographing lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing lens system and thereby provides a wider field of view for the same.

According to the present disclosure, the photographing lens system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed. According to the present disclosure, the object side and image side are defined in accordance with the direction of the optical axis, and the axial parameters are calculated along the optical axis. Furthermore, if the optical axis is folded by a light-folding element (e.g., a flat mirror and a prism), the axial parameters are also calculated along the folded optical axis. In addition, the i-th lens element counted from the object side in one lens group refers to the i-th lens element counted from the object side to the image side along the optical axis among all lens elements in the lens group, and the i-th lens element counted from the image side in one lens group refers to the i-th lens element counted from the image side to the object side along the optical axis among all lens elements in the lens group. For example, when the photographing lens system is in the second optical path state, the axial distance between the image-side surface of the first lens element counted from the image side in the front lens group and the object-side surface of the first lens element counted from the object side in the rear lens group (TGfGr) is the sum of TGfGr_1 and TGfGr_2 as shown in FIG. 25 (i.e., TGfGr=TGfGr_1+TGfGr_2), which is calculated along the folded optical axis. Similar parameters include TGf (i.e., the axial distance between the object-side surface of the first lens element counted from the object side in the front lens group and the image-side surface of the first lens element counted from the image side in the front lens group), Tff1ff2 (i.e., the axial distance between the image-side surface of the first lens element counted from the object side in the front lens group and the object-side surface of the second lens element counted from the object side in the front lens group), and TL (i.e., the axial distance between the object-side surface of the first lens element counted from the object side in the front lens group and the image surface).

According to the above description of the present disclosure, the following specific embodiments are provided for further explanation.

1st Embodiment

Figure 2:
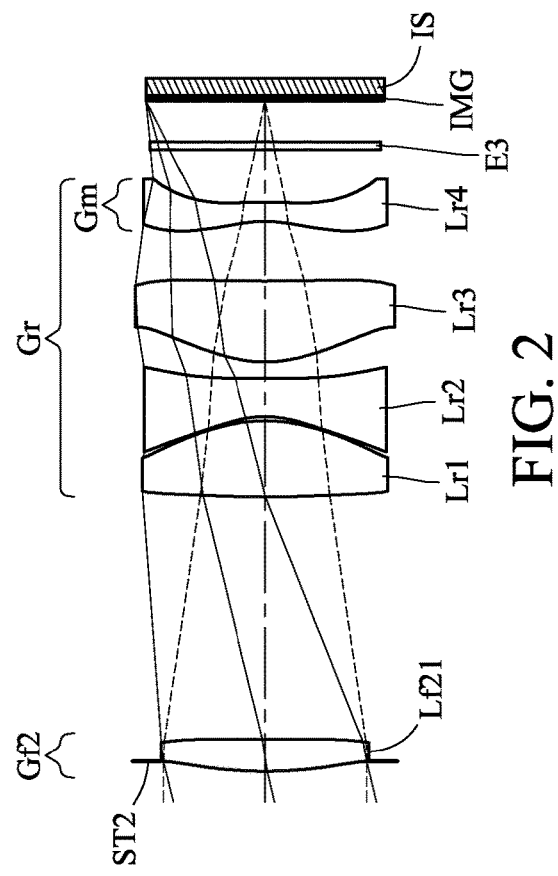
FIG. 2 is a schematic view of the image capturing unit when the photographing lens system is in a second optical path state according to the 1st embodiment.
Figure 3:
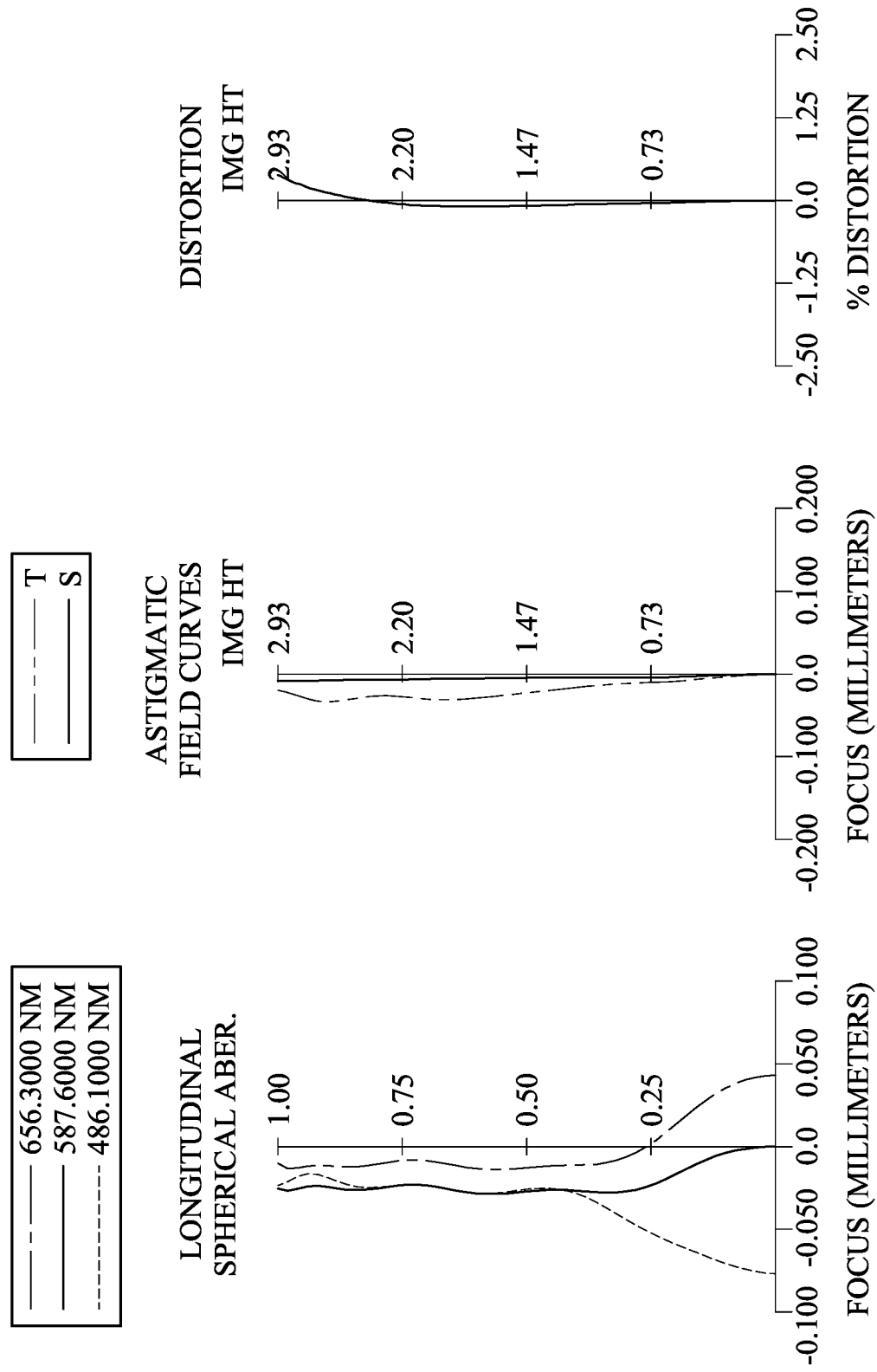
FIG. 3 shows spherical aberration curves, astigmatic field curves and a distortion curve of the image capturing unit when the photographing lens system is in the first optical path state according to the 1st embodiment.
Figure 4:
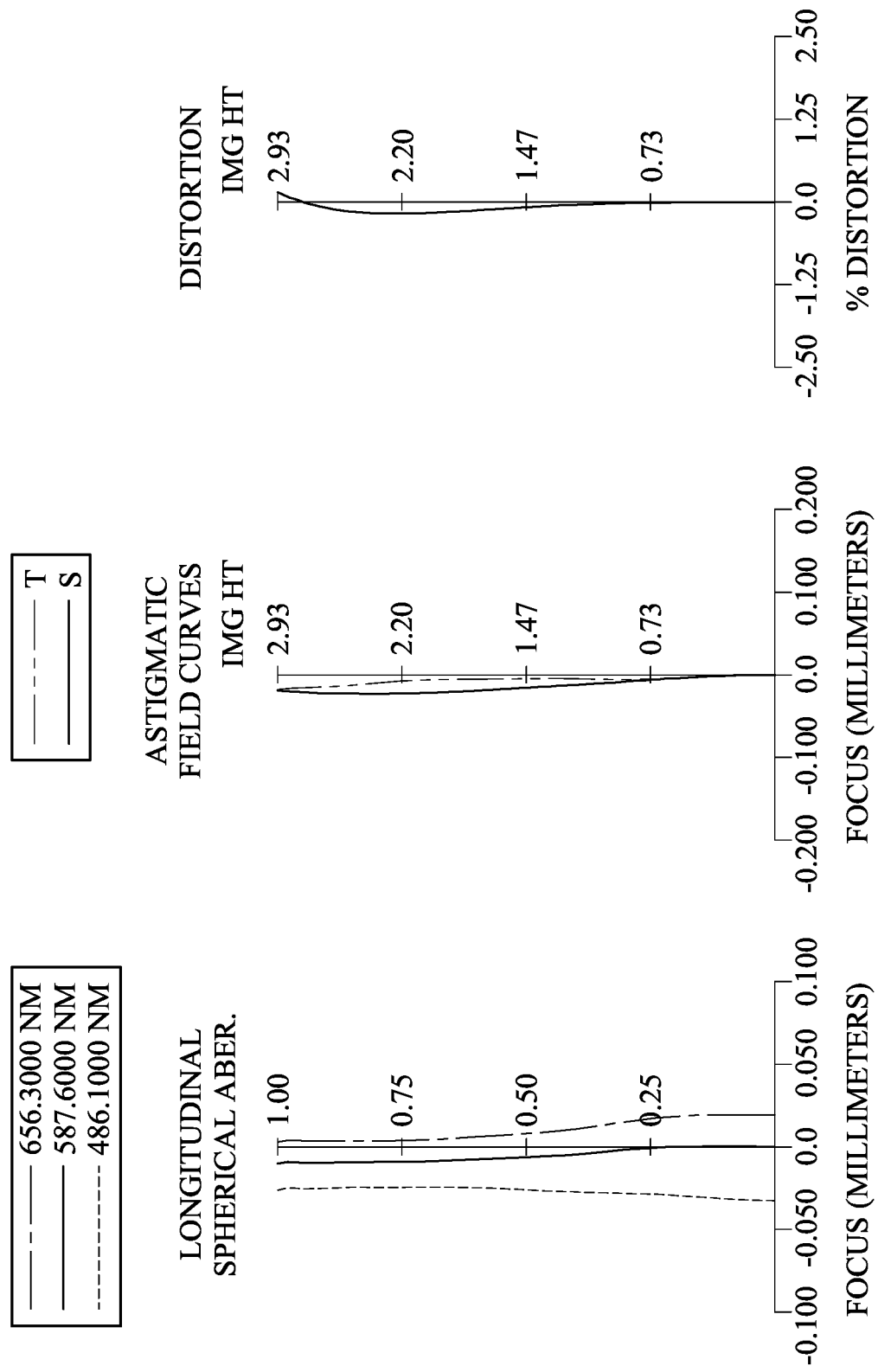
FIG. 4 shows spherical aberration curves, astigmatic field curves and a distortion curve of the image capturing unit when the photographing lens system is in the second optical path state according to the 1st embodiment.

FIG. 1 is a schematic view of an image capturing unit when a photographing lens system is in a first optical path state according to the 1st embodiment of the present disclosure. FIG. 2 is a schematic view of the image capturing unit when the photographing lens system is in a second optical path state according to the 1st embodiment. FIG. 3 shows, in order from left to right, spherical aberration curves, astigmatic field curves and a distortion curve of the image capturing unit when the photographing lens system is in the first optical path state according to the 1st embodiment. FIG. 4 shows, in order from left to right, spherical aberration curves, astigmatic field curves and a distortion curve of the image capturing unit when the photographing lens system is in the second optical path state according to the 1st embodiment. In FIG. 1 and FIG. 2, the image capturing unit 1 includes the photographing lens system (its reference numeral is omitted) of the present disclosure and an image sensor IS. The photographing lens system includes a first front lens group Gf1, a second front lens group Gf2, a rear lens group Gr and an optical path switching mechanism. The optical path switching mechanism is configured for the photographing lens system to be switched between a first optical path state and a second optical path state. As shown in FIG. 1, when the photographing lens system is in the first optical path state, the photographing lens system includes, in order from an object side to an image side along a first optical path, the first front lens group Gf1 and the rear lens group Gr. As shown in FIG. 2, when the photographing lens system is in the second optical path state, the photographing lens system includes, in order from the object side to the image side along a second optical path, the second front lens group Gf2 and the rear lens group Gr. The first front lens group Gf1 includes four lens elements which are, in order from the object side to the image side along the first optical path, a first front group first lens element Lf11, a first front group second lens element Lf12, a first front group third lens element Lf13 and a first front group fourth lens element Lf14, and there is no additional lens element disposed between each of the adjacent four lens elements. The second front lens group Gf2 includes one lens element which is a second front group first lens element Lf21. The rear lens group Gr includes four lens elements which are, in order from the object side to the image side along the optical path, a rear group first lens element Lr1, a rear group second lens element Lr2, a rear group third lens element Lr3 and a rear group fourth lens element Lr4, and there is no additional lens element disposed between each of the adjacent four lens elements. Moreover, the rear lens group Gr includes a movable lens subgroup Gm, and the movable lens subgroup Gm can be moved along an optical axis when the photographing lens system is switched between the first optical path state and the second optical path state. In this embodiment, the movable lens subgroup Gm includes one lens element, which is the rear group fourth lens element Lr4, and the movable lens subgroup Gm has negative refractive power. As seen in FIG. 1 and FIG. 2, when the photographing lens system is switched from the first optical path state to the second optical path state, the movable lens subgroup Gm is moved towards the image side along the optical axis.

The photographing lens system further includes an aperture stop ST1, a prism E1, a stop S1, an aperture stop ST2, a filter E3 and an image surface IMG. As shown in FIG. 1, when the photographing lens system is in the first optical path state, the photographing lens system includes, in order from the object side to the image side along the first optical path, the aperture stop ST1, the first front group first lens element Lf11, the prism E1, the first front group second lens element Lf12, the first front group third lens element Lf13, the stop S1, the first front group fourth lens element Lf14, the rear group first lens element Lr1, the rear group second lens element Lr2, the rear group third lens element Lr3, the rear group fourth lens element Lr4, the filter E3 and the image surface IMG. As shown in FIG. 2, when the photographing lens system is in the second optical path state, the photographing lens system includes, in order from the object side to the image side along the second optical path, the aperture stop ST2, the second front group first lens element Lf21, the rear group first lens element Lr1, the rear group second lens element Lr2, the rear group third lens element Lr3, the rear group fourth lens element Lr4, the filter E3 and the image surface IMG.

Figure 6:
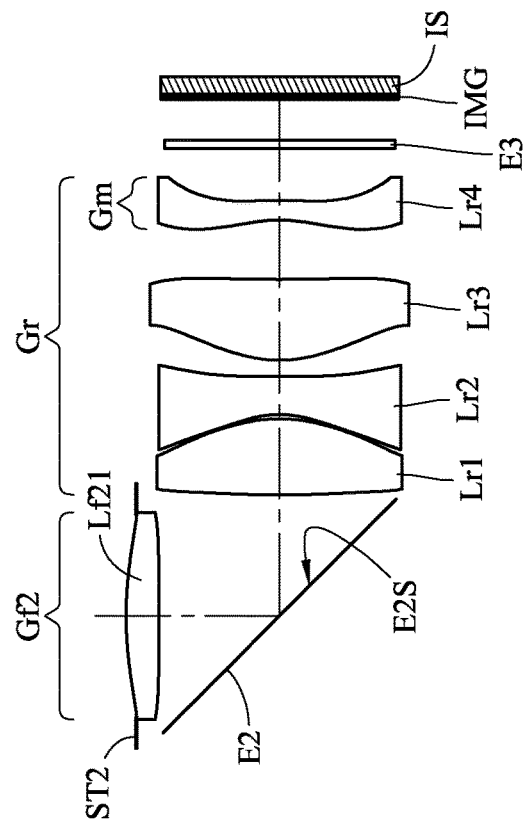
FIG. 6 is a schematic view of one example of a second optical path being folded by a reflector in the image capturing unit according to the 1st embodiment.

For better showing the optical paths of the image capturing unit, the optical paths respectively shown in FIG. 1 and FIG. 2 are not folded. However, it can be understood that each of the optical paths of the image capturing unit 1 can be folded by a reflector (e.g., the prism E1, a reflection mirror E2, a reflection mirror E2b, or a prism E2c). As shown in FIG. 5 to FIG. 8, the prism E1 is configured to reflect incident light rays so that the first optical path is folded at the prism E1, and the reflection mirror E2 is configured to reflect incident light rays so that the second optical path is folded at the reflection mirror E2. FIG. 5 is a schematic view of a first optical path being folded by a reflector in the image capturing unit according to the 1st embodiment. As shown in FIG. 5, the prism E1 is made of glass material and has a reflection surface E1S, the prism E1 is disposed in the first front lens group Gf1, and the first optical path is folded by the reflection surface E1S of the prism E1. FIG. 6 is a schematic view of one example of a second optical path being folded by a reflector in the image capturing unit according to the 1st embodiment. As shown in FIG. 6, the reflection mirror E2 is a flat mirror having a reflection surface E2S, the reflection mirror E2 is disposed between the second front lens group Gf2 and the rear lens group Gr, and the second optical path is folded by the reflection surface E2S of the reflection mirror E2. FIG. 7 is a schematic view of another example of the second optical path being folded by a reflector in the image capturing unit according to the 1st embodiment. As shown in FIG. 7, the reflection mirror E2b is a flat mirror having a reflection surface, the reflection mirror E2 is disposed on the object side of the second front lens group Gf2, and the second optical path is folded by the reflection surface of the reflection mirror E2b. FIG. 8 is a schematic view of another example of the second optical path being folded by a reflector in the image capturing unit according to the 1st embodiment. As shown in FIG. 8, the prism E2c has a reflection surface, the prism E2c is disposed on the object side of the second front lens group Gf2, and the second optical path is folded by the reflection surface of the prism E2c. The type, number and arrangement of components configured to fold the optical path can be altered according to actual requirements, and the present disclosure is not limited thereto.

In this embodiment, the arrangement of the optical path switching mechanism can be similar to the configurations as shown in FIG. 26 to FIG. 29. The optical path switching mechanism can include at least one reflector (e.g., the reflection mirror E2, the reflection mirror E2b or the prism E2c) which is movable or rotatable relative to the first front lens group Gf1, the second front lens group Gf2 or the rear lens group Gr. For instance, in the configuration of FIG. 6, the optical path switching mechanism includes the reflection mirror E2, which is a flat mirror having the reflection surface E2S, and the reflection mirror E2 is movable or rotatable relative to the first front lens group Gf1, the second front lens group Gf2, the rear lens group Gr or the image sensor IS, so that the optical path switching mechanism enables the photographing lens system to be switched between the first optical path state and the second optical path state by moving or rotating the reflection mirror E2. As shown in FIG. 6, when the photographing lens system is in the second optical path state, the reflection mirror E2 of the optical path switching mechanism is located between the second front lens group Gf2 and the rear lens group Gr in the second optical path, and the second optical path is folded by the reflection mirror E2. In specific, the optical path switching mechanism enables the photographing lens system to be switched from the first optical path state to the second optical path state by moving or rotating the reflection mirror E2 to a position between the second front lens group Gf2 and the rear lens group Gr in the second optical path, or enables the photographing lens system to be switched from the second optical path state to the first optical path state by moving or rotating the reflection mirror E2 away from the position between the second front lens group Gf2 and the rear lens group.

For instance, in the configuration of FIG. 7, the optical path switching mechanism includes the reflection mirror E2b and the second front lens group Gf2. The reflection mirror E2b is located on the object side of the second front lens group Gf2 in the second optical path, and the reflection mirror E2b is a flat mirror having a reflection surface. The reflection mirror E2b and the second front lens group Gf2 of the optical path switching mechanism are movable or rotatable relative to the first front lens group Gf1, the rear lens group Gr and the image sensor IS, so that the optical path switching mechanism enables the photographing lens system to be switched between the first optical path state and the second optical path state by moving or rotating the reflection mirror E2b and the second front lens group Gf2. In specific, the optical path switching mechanism enables the photographing lens system to be switched from the first optical path state to the second optical path state by moving or rotating the reflection mirror E2b and the second front lens group Gf2 to a position between the first front lens group Gf1 and the rear lens group Gr, or enables the photographing lens system to be switched from the second optical path state to the first optical path state by moving or rotating the reflection mirror E2b and the second front lens group Gf2 away from the position between the first front lens group Gf1 and the rear lens group Gr. The optical path switching mechanism in FIG. 8 is similar to the optical path switching mechanism in FIG. 7, and they are different from each other in that the reflector (i.e., the prism E2c) of the optical path switching mechanism in FIG. 8 is different from the reflector (i.e., the reflection mirror E2b) of the optical path switching mechanism in FIG. 7. In detail, in the configuration of FIG. 8, the optical path switching mechanism includes the prism E2c and the second front lens group Gf2. The prism E2c is located on the object side of the second front lens group Gf2 in the second optical path, and the prism E2c is a prism having a reflection surface. The prism E2c and the second front lens group Gf2 of the optical path switching mechanism are movable or rotatable relative to the first front lens group Gf1, the rear lens group Gr and the image sensor IS, so that the optical path switching mechanism enables the photographing lens system to be switched between the first optical path state and the second optical path state by moving or rotating the prism E2c and the second front lens group Gf2. The type, number and arrangement of components included in the optical path switching mechanism can be altered according to actual requirements, and the present disclosure is not limited thereto.

The first front group first lens element Lf11 with positive refractive power has an object-side surface being convex in a paraxial region thereof and an image-side surface being convex in a paraxial region thereof. The first front group first lens element Lf11 is made of plastic material and has the object-side surface and the image-side surface being both aspheric.

The first front group second lens element Lf12 with negative refractive power has an object-side surface being convex in a paraxial region thereof and an image-side surface being concave in a paraxial region thereof. The first front group second lens element Lf12 is made of plastic material and has the object-side surface and the image-side surface being both aspheric.

The first front group third lens element Lf13 with negative refractive power has an object-side surface being convex in a paraxial region thereof and an image-side surface being concave in a paraxial region thereof. The first front group third lens element Lf13 is made of plastic material and has the object-side surface and the image-side surface being both aspheric.

The first front group fourth lens element Lf14 with positive refractive power has an object-side surface being concave in a paraxial region thereof and an image-side surface being convex in a paraxial region thereof. The first front group fourth lens element Lf14 is made of plastic material and has the object-side surface and the image-side surface being both aspheric.

The second front group first lens element Lf21 with positive refractive power has an object-side surface being convex in a paraxial region thereof and an image-side surface being planar in a paraxial region thereof. The second front group first lens element Lf21 is made of plastic material and has the object-side surface and the image-side surface being both aspheric.

The rear group first lens element Lr1 with positive refractive power has an object-side surface being convex in a paraxial region thereof and an image-side surface being convex in a paraxial region thereof. The rear group first lens element Lr1 is made of plastic material and has the object-side surface and the image-side surface being both aspheric.

The rear group second lens element Lr2 with negative refractive power has an object-side surface being concave in a paraxial region thereof and an image-side surface being convex in a paraxial region thereof. The rear group second lens element Lr2 is made of plastic material and has the object-side surface and the image-side surface being both aspheric.

The rear group third lens element Lr3 with positive refractive power has an object-side surface being convex in a paraxial region thereof and an image-side surface being concave in a paraxial region thereof. The rear group third lens element Lr3 is made of plastic material and has the object-side surface and the image-side surface being both aspheric.

The rear group fourth lens element Lr4 with negative refractive power has an object-side surface being concave in a paraxial region thereof and an image-side surface being convex in a paraxial region thereof. The rear group fourth lens element Lr4 is made of plastic material and has the object-side surface and the image-side surface being both aspheric. The object-side surface of the rear group fourth lens element Lr4 has one critical point in an off-axis region thereof.

The filter E3 is made of glass material and located between the rear group fourth lens element Lr4 and the image surface IMG, and will not affect the focal length of the photographing lens system. The image sensor IS is disposed on or near the image surface IMG of the photographing lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where,

X is the displacement in parallel with the optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, and 22.

In the photographing lens system of the image capturing unit 1 according to the 1st embodiment, a focal length of the photographing lens system is F, a focal length of the front lens group (i.e., the first front lens group Gf1 or the second front lens group Gf2) is FGf, a focal length of the rear lens group Gr is FGr, an f-number of the photographing lens system is Fno, and half of a maximum field of view of the photographing lens system is HFOV. When the photographing lens system is in different optical path states, the aforementioned parameters may have different values. When the photographing lens system is in the first optical path state, the aforementioned parameters have the following values: F=24.69 millimeters (mm), FGf=28.97 mm, FGr=102.09 mm, Fno=3.51, and HFOV=6.8 degrees (deg.). When the photographing lens system is in the second optical path state, the aforementioned parameters have the following values: F=12.23 mm, FGf=17.11 mm, FGr=45.58 mm, Fno=2.45, and HFOV=13.5 degrees.

In the following descriptions, the term "front lens group" refers to the first front lens group Gf1 when the photographing lens system is in the first optical path state, and refers to the second front lens group Gf2 when the photographing lens system is in the second optical path state. In addition, the term "optical path" refers to the first optical path when the photographing lens system is in the first optical path state, and refers to the second optical path when the photographing lens system is in the second optical path state.

An axial distance between the object-side surface of the first lens element counted from the object side in the front lens group and the image-side surface of the first lens element counted from the image side in the front lens group is TGf. When the photographing lens system is in the first optical path state, and the axial distance between the object-side surface of the first front group first lens element Lf11 and the image-side surface of the first front group fourth lens element Lf14 is TGf, the following condition is satisfied: TGf=12.526 mm. When the photographing lens system is in the second optical path state, and the axial distance between the object-side surface of the second front group first lens element Lf21 and the image-side surface of the second front group first lens element Lf21 is TGf, the following condition is satisfied: TGf=0.804 mm.

An axial distance between the object-side surface of the first lens element counted from the object side in the rear lens group Gr and the image-side surface of the first lens element counted from the image side in the rear lens group Gr is TGr. When the photographing lens system is in the first optical path state, and the axial distance between the object-side surface of the rear group first lens element Lr1 and the image-side surface of the rear group fourth lens element Lr4 is TGr, the following condition is satisfied: TGr=6.218 mm.

When the photographing lens system is in the second optical path state, and the axial distance between the object-side surface of the rear group first lens element Lr1 and the image-side surface of the rear group fourth lens element Lr4 is TGr, the following condition is satisfied: TGr=7.273 mm.

An axial distance between the image-side surface of the first lens element counted from the image side in the front lens group and the object-side surface of the first lens element counted from the object side in the rear lens group Gr is TGfGr. When the photographing lens system is in the first optical path state, and the axial distance between the image-side surface of the first front group fourth lens element Lf14 and the object-side surface of the rear group first lens element Lr1 is TGfGr, the following condition is satisfied: TGfGr=11.454 mm. When the photographing lens system is in the second optical path state, and the axial distance between the image-side surface of the second front group first lens element Lf21 and the object-side surface of the rear group first lens element Lr1 is TGfGr, the following condition is satisfied: TGfGr=5.959 mm.

An axial distance between the image-side surface of the first lens element counted from the object side in the front lens group and the object-side surface of the second lens element counted from the object side in the front lens group is Tff1ff2. When the photographing lens system is in the first optical path state, the axial distance between the object-side surface of the first front group first lens element Lf11 and the image-side surface of the first front group fourth lens element Lf14 is TGf, and the axial distance between the image-side surface of the first front group first lens element Lf11 and the object-side surface of the first front group second lens element Lf12 is Tff1ff2, the following condition is satisfied: TGf/Tff1ff2=1.83.

A central thickness of the first lens element counted from the image side in the front lens group is Tfr1. When the photographing lens system is in the first optical path state, the axial distance between the image-side surface of the first front group fourth lens element Lf14 and the object-side surface of the rear group first lens element Lr1 is TGfGr, and the central thickness of the first front group fourth lens element Lf14 is Tfr1, the following condition is satisfied: TGfGr/Tfr1=9.28. When the photographing lens system is in the second optical path state, the axial distance between the image-side surface of the second front group first lens element Lf21 and the object-side surface of the rear group first lens element Lr1 is TGfGr, and the central thickness of the second front group first lens element Lf21 is Tfr1, the following condition is satisfied: TGfGr/Tfr1=7.41.

An axial distance between the object-side surface of the first lens element counted from the object side in the front lens group and the image surface IMG is TL. When the photographing lens system is in the first optical path state, the axial distance between the object-side surface of the first front group first lens element Lf11 and the image surface IMG is TL, and the focal length of the photographing lens system is F, the following condition is satisfied: TL/F=1.37. When the photographing lens system is in the second optical path state, an axial distance between the object-side surface of the second front group first lens element Lf21 and the image surface IMG is TL, and the focal length of the photographing lens system is F, the following condition is satisfied: TL/F=1.35.

A focal length of the first lens element counted from the object side in the front lens group is Fff1, and a central thickness of the first lens element counted from the object side in the front lens group is Tff1. When the photographing lens system is in the first optical path state, the focal length of the first front group first lens element Lf11 is Fff1, and the central thickness of the first front group first lens element Lf11 is Tff1, the following condition is satisfied: Fff1/Tff1=18.92. When the photographing lens system is in the second optical path state, the focal length of the second front group first lens element Lf21 is Fff1, and the central thickness of the second front group first lens element Lf21 is Tff1, the following condition is satisfied: Fff1/Tff1=21.28.

A focal length of the first lens element counted from the image side in the front lens group is Ffr1, and a focal length of the second lens element counted from the image side in the front lens group is Ffr2. When the photographing lens system is in the first optical path state, the focal length of the first front group fourth lens element Lf14 is Ffr1, and the focal length of the first front group third lens element Lf13 is Ffr2, the following condition is satisfied: Ffr1/Ffr2=−1.42.

When the photographing lens system is in the first optical path state, a focal length of the first front lens group Gf1 is FGf, and the focal length of the rear lens group Gr is FGr, the following condition is satisfied: FGf/|FGr|=0.28. When the photographing lens system is in the second optical path state, the focal length of the second front lens group Gf2 is FGf, and the focal length of the rear lens group Gr is FGr, the following condition is satisfied: FGf/|FGr|=0.38.

An entrance pupil diameter of the photographing lens system is EPD, and a maximum effective radius of the object-side surface of the first lens element counted from the object side in the front lens group is Yff1f. When the photographing lens system is in the first optical path state, the entrance pupil diameter of the photographing lens system is EPD, and the maximum effective radius of the object-side surface of the first front group first lens element Lf11 is Yff1f, the following condition is satisfied: EPD/Yff1f=2.00. When the photographing lens system is in the second optical path state, the entrance pupil diameter of the photographing lens system is EPD, and the maximum effective radius of the object-side surface of the second front group first lens element Lf21 is Yff1f, the following condition is satisfied: EPD/Yff1f=2.00.

A maximum image height of the photographing lens system is ImgH. When the photographing lens system is in the first optical path state, the maximum effective radius of the object-side surface of the first front group first lens element Lf11 is Yff1f, and the maximum image height of the photographing lens system is ImgH, the following condition is satisfied: Yff1f/ImgH=1.20. When the photographing lens system is in the second optical path state, the maximum effective radius of the object-side surface of the second front group first lens element Lf21 is Yff1f, and the maximum image height of the photographing lens system is ImgH, the following condition is satisfied: Yff1f/ImgH=0.85.

A maximum effective radius of the image-side surface of the first lens element counted from the image side in the front lens group is Yfr1r. When the photographing lens system is in the first optical path state, the maximum effective radius of the object-side surface of the first front group first lens element Lf11 is Yff1f, and a maximum effective radius of the image-side surface of the first front group fourth lens element Lf14 is Yfr1r, the following condition is satisfied: Yff1f/Yfr1r=1.07. When the photographing lens system is in the second optical path state, the maximum effective radius of the object-side surface of the second front group first lens element Lf21 is Yff1f, and the maximum effective radius of the image-side surface of the second front group first lens element Lf21 is Yfr1r, the following condition is satisfied: Yff1f/Yfr1r=0.98.

A maximum effective radius of the image-side surface of the first lens element counted from the image side in the rear lens group Gr is Yrr1r. When the photographing lens system is in the first optical path state, the maximum effective radius of the object-side surface of the first front group first lens element Lf11 is Yff1f, and the maximum effective radius of the image-side surface of the rear group fourth lens element Lr4 is Yrr1r, the following condition is satisfied: Yff1f/Yrr1r=1.20. When the photographing lens system is in the second optical path state, the maximum effective radius of the object-side surface of the second front group first lens element Lf21 is Yff1f, and the maximum effective radius of the image-side surface of the rear group fourth lens element Lr4 is Yrr1r, the following condition is satisfied: Yff1f/Yrr1r=0.91.

A maximum effective radius of the object-side surface of the first lens element counted from the object side in the rear lens group Gr is Yrf1f. When the photographing lens system is in the first optical path state, the maximum effective radius of the object-side surface of the rear group first lens element Lr1 is Yrf1f, and the maximum effective radius of the image-side surface of the rear group fourth lens element Lr4 is Yrr1r, the following condition is satisfied: Yrf1f/Yrr1r=1.19. When the photographing lens system is in the second optical path state, the maximum effective radius of the object-side surface of the rear group first lens element Lr1 is Yrf1f, and the maximum effective radius of the image-side surface of the rear group fourth lens element Lr4 is Yrr1r, the following condition is satisfied: Yrf1f/Yrr1r=1.09.

A maximum value among maximum effective radii of all lens surfaces of lens elements in the photographing lens system is Ymax, and a minimum value among maximum effective radii of all lens surfaces of lens elements in the photographing lens system is Ymin. When the photographing lens system is in the first optical path state, the following condition is satisfied: Ymax/Ymin=1.28. When the photographing lens system is in the second optical path state, the following condition is satisfied: Ymax/Ymin=1.27.

A vertical distance between a non-axial critical point on the object-side surface of the first lens element counted from the image side in the rear lens group and the optical axis is YCrr1f, and a maximum effective radius of the object-side surface of the first lens element counted from the image side of the rear lens group Gr is Yrr1f. When the photographing lens system is in the first optical path state, the vertical distance between the non-axial critical point on the object-side surface of the rear group fourth lens element Lr4 and the optical axis is YCrr1f, and the maximum effective radius of the object-side surface of the rear group fourth lens element Lr4 is Yrr1f, the following condition is satisfied: YCrr1f/Yrr1f=0.63. When the photographing lens system is in the second optical path state, the vertical distance between the non-axial critical point on the object-side surface of the rear group fourth lens element Lr4 and the optical axis is YCrr1f, and the maximum effective radius of the object-side surface of the rear group fourth lens element Lr4 is Yrr1f, the following condition is satisfied: YCrr1f/Yrr1f=0.68.

An Abbe number of the first lens element counted from the object side in the rear lens group Gr is Vrf1, an Abbe number of the second lens element counted from the object side in the rear lens group Gr is Vrf2, an Abbe number of the second lens element counted from the image side in the rear lens group Gr is Vrr2, and an Abbe number of the first lens element counted from the image side in the rear lens group Gr is Vrr1. In this embodiment, when the Abbe number of the rear group first lens element Lr1 is Vrf1, the Abbe number of the rear group second lens element Lr2 is Vrf2, the Abbe number of the rear group third lens element Lr3 is Vrr2, and the Abbe number of the rear group fourth lens element Lr4 is Vrr1, the following condition is satisfied: (Vrf1+Vrr1)/(Vrf2+Vrr2)=2.88.

When a minimum value among Abbe numbers of all lens elements in the rear lens group Gr is minVGr, the following condition is satisfied: minVGr=19.5. In this embodiment, the Abbe number of the rear group second lens element Lr2 and the Abbe number of the rear group third lens element Lr3 are the same and smaller than the Abbe numbers of the other lens elements in the rear lens group Gr, and minVGr is equal to the Abbe number of the rear group second lens element Lr2 and the Abbe number of the rear group third lens element Lr3.

In this embodiment, when the Abbe number of the rear group third lens element Lr3 is Vrr2, and the Abbe number of the rear group fourth lens element Lr4 is Vrr1, the following condition is satisfied: Vrr1/Vrr2=2.88.

A focal length of the first lens element counted from the object side in the rear lens group Gr is Frf1, a focal length of the second lens element counted from the object side in the rear lens group Gr is Frf2, a focal length of the second lens element counted from the image side in the rear lens group Gr is Frr2, and a focal length of the first lens element counted from the image side in the rear lens group Gr is Frr1. In this embodiment, when the focal length of the rear group first lens element Lr1 is Frf1, the focal length of the rear group second lens element Lr2 is Frf2, the focal length of the rear group third lens element Lr3 is Frr2, and the focal length of the rear group fourth lens element Lr4 is Frr1, the following condition is satisfied: (Frf2+Frr1)/(Frf1+Frr2)=−1.16.

When a focal length of the movable lens subgroup Gm is FGm, and a central thickness of the movable lens subgroup Gm is TGm, the following condition is satisfied: FGm/TGm=−19.16.

When a focal length of the first front lens group Gf1 is FGf1, and a focal length of the second front lens group Gf2 is FGf2, the following condition is satisfied: FGf1/FGf2=1.69.

When a focal length of the photographing lens system in the first optical path state is FS1, and a focal length of the photographing lens system in the second optical path state is FS2, the following condition is satisfied: FS1/FS2=2.02.

The detailed optical data of the 1st embodiment are shown in Table 1 and Table 2, and the aspheric surface data are shown in Table 3 below.

TABLE 1

1st Embodiment (First optical path state)
F = 24.69 mm, Fno = 3.51, HFOV = 6.8 deg.

| Surface # | | Curvature Radius | Thickness | Material Index | Abbe # | Focal Length |
|---|---|---|---|---|---|---|
| O-S0 | Object | Plano | Infinity | | | |
| Gf1-S1 | Ape. Stop | Plano | −0.575 | | | |

TABLE 1-continued

1st Embodiment (First optical path state)
F = 24.69 mm, Fno = 3.51, HFOV = 6.8 deg.

| Surface # | | Curvature Radius | | Thickness | Material | Index | Abbe # | Focal Length |
|---|---|---|---|---|---|---|---|---|
| Gf1-S2 | Lf11 | 11.2464 | (ASP) | 1.000 | Plastic | 1.545 | 56.1 | 18.92 |
| Gf1-S3 | | −119.6490 | (ASP) | 0.800 | | | | |
| Gf1-S4 | Reflector | Plano | | 5.650 | Glass | 1.517 | 64.2 | — |
| Gf1-S5 | | Plano | | 0.400 | | | | |
| Gf1-S6 | Lf12 | 476.3652 | (ASP) | 0.806 | Plastic | 1.545 | 56.1 | −426.60 |
| Gf1-S7 | | 156.1366 | (ASP) | 0.063 | | | | |
| Gf1-S8 | Lf13 | 58.7181 | (ASP) | 0.685 | Plastic | 1.669 | 19.5 | −9.59 |
| Gf1-S9 | | 5.7566 | (ASP) | 1.066 | | | | |
| Gf1-S10 | Stop | Plano | | 0.822 | | | | |
| Gf1-S11 | Lf14 | −26.2556 | (ASP) | 1.234 | Plastic | 1.669 | 19.5 | 13.65 |
| Gf1-S12 | | −6.9026 | (ASP) | 11.454 | | | | |
| Gr-S1 | Lr1 | 23.5838 | (ASP) | 1.893 | Plastic | 1.545 | 56.1 | 6.02 |
| Gr-S2 | | −3.7046 | (ASP) | 0.109 | | | | |
| Gr-S3 | Lr2 | −2.2732 | (ASP) | 0.936 | Plastic | 1.669 | 19.5 | −3.58 |
| Gr-S4 | | −52.3175 | (ASP) | 0.397 | | | | |
| Gr-S5 | Lr3 | 3.2082 | (ASP) | 1.993 | Plastic | 1.669 | 19.5 | 5.05 |
| Gr-S6 | | 48.0166 | (ASP) | 0.408 | | | | |
| Gr-S7 | Lr4 | −3.1497 | (ASP) | 0.482 | Plastic | 1.545 | 56.1 | −9.24 |
| Gr-S8 | | −8.8713 | (ASP) | 2.351 | | | | |
| O-S1 | Filter | Plano | | 0.210 | Glass | 1.517 | 64.2 | — |
| O-S2 | | Plano | | 1.000 | | | | |
| O-S3 | Image | Plano | | — | | | | |

Note:
Reference wavelength is 587.6 nm (d-line).
An effective radius of the stop S1 (Surface Gf1-S10) is 2.900 mm.
The reflector is disposed in the first front lens group Gf1.
The reflector is the prism E1 having the reflection surface E1S.

TABLE 2

1st Embodiment (Second optical path state)
F = 12.23 mm, Fno = 2.45, HFOV = 13.5 deg.

| Surface # | | Curvature Radius | | Thickness | Material | Index | Abbe # | Focal Length |
|---|---|---|---|---|---|---|---|---|
| O-S0 | Object | Plano | | Infinity | | | | |
| Gf2-S1 | Ape. Stop | Plano | | −0.251 | | | | |
| Gf2-S2 | Lf21 | 9.3237 | (ASP) | 0.804 | Plastic | 1.545 | 56.1 | 17.11 |
| Gf2-S3 | | ∞ (Infinity) | (ASP) | 5.959 | | | | |
| Gr-S1 | Lr1 | 23.5838 | (ASP) | 1.893 | Plastic | 1.545 | 56.1 | 6.02 |
| Gr-S2 | | −3.7046 | (ASP) | 0.109 | | | | |
| Gr-S3 | Lr2 | −2.2732 | (ASP) | 0.936 | Plastic | 1.669 | 19.5 | −3.58 |
| Gr-S4 | | −52.3175 | (ASP) | 0.397 | | | | |
| Gr-S5 | Lr3 | 3.2082 | (ASP) | 1.993 | Plastic | 1.669 | 19.5 | 5.05 |
| Gr-S6 | | 48.0166 | (ASP) | 1.463 | | | | |
| Gr-S7 | Lr4 | −3.1497 | (ASP) | 0.482 | Plastic | 1.545 | 56.1 | −9.24 |
| Gr-S8 | | −8.8713 | (ASP) | 1.290 | | | | |
| O-S1 | Filter | Plano | | 0.210 | Glass | 1.517 | 64.2 | — |
| O-S2 | | Plano | | 1.000 | | | | |
| O-S3 | Image | Plano | | — | | | | |

Note:
Reference wavelength is 587.6 nm (d-line).
A reflector (e.g., E2, E2b or E2c) is further included.
The reflector can be disposed between the second front lens group Gf2 and the rear lens group Gr.
Alternatively, the reflector can be disposed on the object side of the second front lens group Gf2.
The reflector is a prism or a flat mirror having a reflection surface.

TABLE 3

| Aspheric Coefficients | | | | | |
|---|---|---|---|---|---|
| Surface # | Gf1-S2 | Gf1-S3 | Gf1-S6 | Gf1-S7 | Gf1-S8 |
| k = | 0.00000E+00 | 0.00000E+00 | 0.00000E+00 | 0.00000E+00 | 0.00000E+00 |
| A4 = | 6.4680047E−04 | 1.0180680E−03 | 5.5047134E−03 | −7.4133312E−03 | −1.3359528E−02 |
| A6 = | −9.7365250E−05 | −1.4950233E−04 | −4.8359859E−03 | 1.5538838E−03 | 1.2145285E−02 |
| A8 = | 1.8462687E−05 | 2.4466130E−05 | 1.9073611E−03 | 5.7467461E−04 | −5.1285244E−03 |
| A10 = | −3.3505912E−06 | −4.1351415E−06 | −5.0362108E−04 | −8.2135717E−04 | 1.0996924E−03 |
| A12 = | 4.3039309E−07 | 5.6429792E−07 | 9.8295696E−05 | 3.8094387E−04 | −9.4965029E−05 |
| A14 = | −3.5161590E−08 | −5.4142764E−08 | −1.3736180E−05 | −9.6980533E−05 | −8.3244185E−06 |

TABLE 3-continued

Aspheric Coefficients

| | | | | | |
|---|---|---|---|---|---|
| A16 = | 1.5746573E−09 | 3.1838627E−09 | 1.2533915E−06 | 1.4726072E−05 | 2.7600568E−06 |
| A18 = | −3.0359059E−11 | −1.0230747E−10 | −6.4537288E−08 | −1.3310773E−06 | −2.4363496E−07 |
| A20 = | — | 1.3241694E−12 | 1.3982183E−09 | 6.6563709E−08 | 7.6062991E−09 |
| A22 = | — | — | — | −1.4286543E−09 | — |

| Surface # | Gf1-S9 | Gf1-S11 | Gf1-S12 | Gf2-S2 | Gf2-S3 |
|---|---|---|---|---|---|
| k = | 0.00000E+00 | 0.00000E+00 | 0.00000E+00 | −9.78029E+00 | 0.00000E+00 |
| A4 = | −2.6626051E−03 | −2.3564731E−03 | −2.1890110E−03 | 3.2054193E−04 | −1.1319134E−03 |
| A6 = | 7.2991702E−03 | −1.2767442E−04 | −1.6382222E−04 | −8.5926226E−05 | −1.0140749E−04 |
| A8 = | −4.0378924E−03 | 1.1347731E−05 | 2.4078823E−05 | −4.0824484E−05 | 2.1614126E−05 |
| A10 = | 1.1867535E−03 | −1.6918917E−05 | −1.0583684E−05 | 1.1024930E−05 | −1.8254563E−05 |
| A12 = | −2.1877202E−04 | 5.7000526E−06 | 2.5467367E−06 | −1.9964039E−06 | 5.8889828E−06 |
| A14 = | 2.7072775E−05 | −5.8686317E−07 | −2.9804070E−07 | 1.7809731E−07 | −1.0579645E−06 |
| A16 = | −2.2535486E−06 | 1.6660384E−08 | 1.9283747E−08 | −7.2194177E−09 | 9.7596457E−08 |
| A18 = | 1.1426635E−07 | 6.9151077E−10 | −6.3379952E−10 | — | −3.6886441E−09 |
| A20 = | −2.6217922E−09 | −3.6603691E−11 | 7.4057313E−12 | — | — |

| Surface # | Gr-S1 | Gr-S2 | Gr-S3 | Gr-S4 | Gr-S5 |
|---|---|---|---|---|---|
| k = | 0.00000E+00 | −1.00000E+00 | −1.00000E+00 | 0.00000E+00 | −1.00000E+00 |
| A4 = | −1.5901163E−03 | −8.4888599E−04 | 4.3654698E−02 | 2.2169259E−02 | −9.8297897E−03 |
| A6 = | 1.7990562E−04 | 1.0563567E−02 | −7.4009595E−03 | −9.2286731E−03 | 2.8826082E−04 |
| A8 = | −6.0677656E−05 | −6.3060195E−03 | 2.3050754E−05 | 3.0197610E−03 | 2.6401551E−04 |
| A10 = | 7.4873282E−06 | 2.0033171E−03 | 3.5639368E−04 | −6.9515867E−04 | −1.0964783E−04 |
| A12 = | 3.6653036E−07 | −3.9888682E−04 | −9.4686218E−05 | 1.1113168E−04 | 2.5521504E−05 |
| A14 = | −1.2641585E−07 | 5.2119225E−05 | 1.2827633E−05 | −1.2087800E−05 | −4.2603675E−06 |
| A16 = | 9.4374786E−09 | −4.4707941E−06 | −1.0291568E−06 | 8.4127131E−07 | 5.1077301E−07 |
| A18 = | −2.5201359E−10 | 2.4281982E−07 | 4.9432506E−08 | −3.3287679E−08 | −4.0734430E−08 |
| A20 = | — | −7.5708301E−09 | −1.3172615E−09 | 5.6414698E−10 | 1.8742478E−09 |
| A22 = | — | 1.0302226E−10 | 1.4949445E−11 | — | −3.6751208E−11 |

| Surface # | Gr-S6 | Gr-S7 | Gr-S8 | | |
|---|---|---|---|---|---|
| k = | 0.00000E+00 | −1.00000E+00 | 0.00000E+00 | — | — |
| A4 = | 4.7692057E−04 | 5.0568393E−02 | 4.3664105E−02 | — | — |
| A6 = | −7.6484093E−05 | −1.3130476E−02 | −9.3107271E−03 | — | — |
| A8 = | −3.9117659E−04 | 3.1112716E−03 | 1.3354905E−03 | — | — |
| A10 = | 2.0948611E−04 | −5.6756630E−04 | 1.0117530E−04 | — | — |
| A12 = | −6.0434899E−05 | 7.5388516E−05 | −1.1521179E−04 | — | — |
| A14 = | 1.0779249E−05 | −6.9345132E−06 | 3.1950535E−05 | — | — |
| A16 = | −1.2135785E−06 | 4.1407723E−07 | −4.9522714E−06 | — | — |
| A18 = | 8.3815247E−08 | −1.4269205E−08 | 4.5454055E−07 | — | — |
| A20 = | −3.2432109E−09 | 2.1204601E−10 | −2.2955333E−08 | — | — |
| A22 = | 5.3961782E−11 | — | 4.8911332E−10 | — | — |

In Table 1, the photographing lens system is in the first optical path state, the curvature radius, the thickness and the focal length are shown in millimeters (mm), and surface numbers O-S0 to O-S3 represent the surfaces sequentially arranged from the object side to the image side along the first optical axis. In Table 2, the photographing lens system is in the second optical path state, the curvature radius, the thickness and the focal length are shown in millimeters, and surface numbers O-S0 to O-S3 represent the surfaces sequentially arranged from the object side to the image side along the second optical axis. In Table 3, k represents the conic coefficient of the equation of the aspheric surface profiles. A4-A22 represent the aspheric coefficients ranging from the 4th order to the 22nd order. The tables presented below for each embodiment are the corresponding schematic parameter and aberration curves, and the definitions of the tables are the same as Table 1, Table 2 and Table 3 of the 1st embodiment. Therefore, an explanation in this regard will not be provided again.

2nd Embodiment

Figure 9:
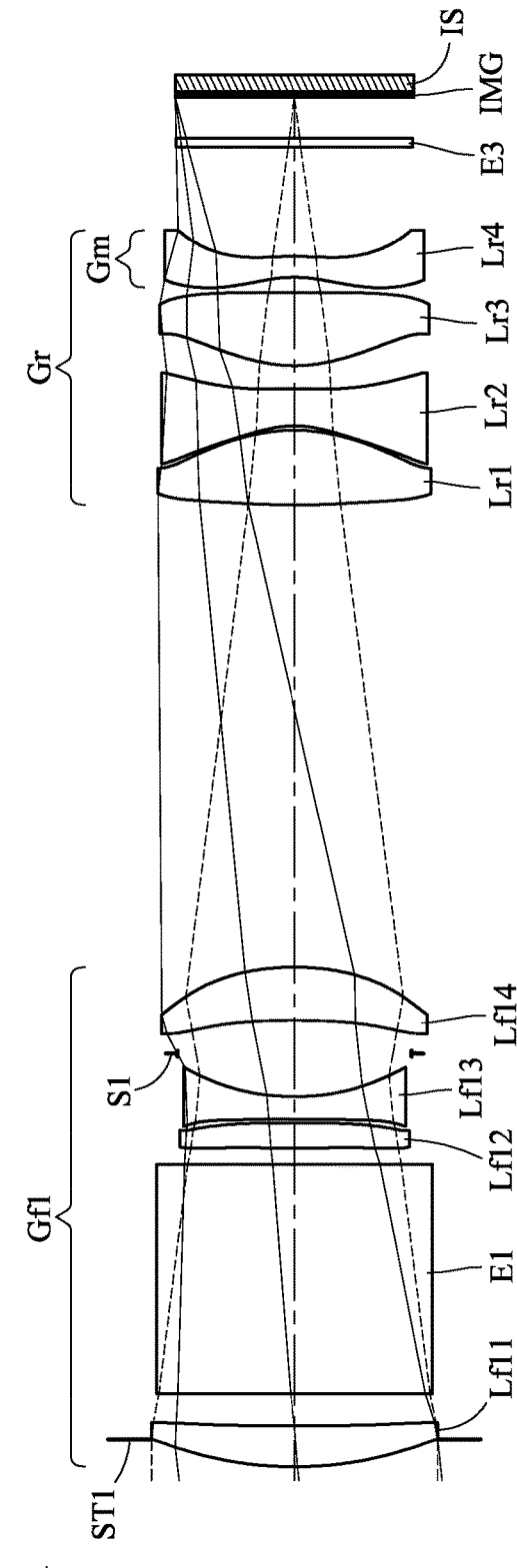
FIG. 9 is a schematic view of an image capturing unit when a photographing lens system is in a first optical path state according to the 2nd embodiment of the present disclosure.
Figure 10:
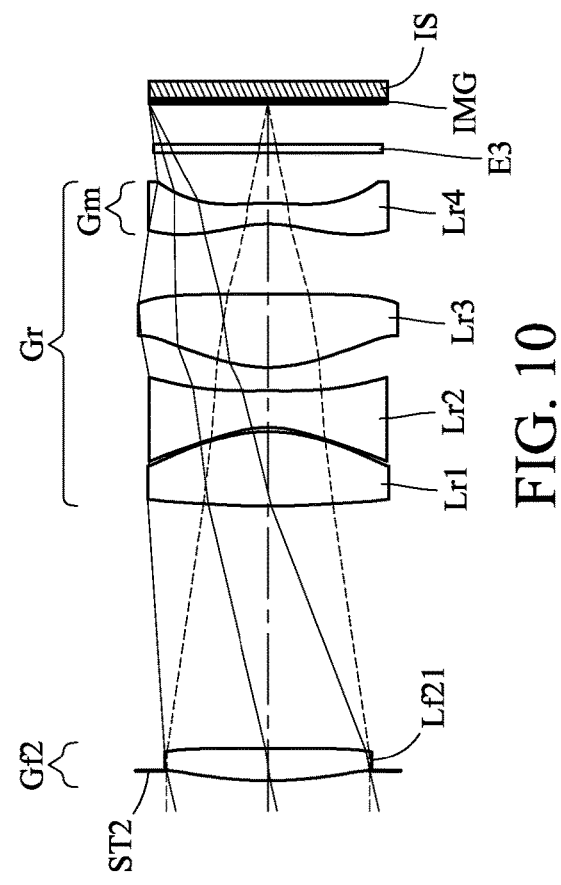
FIG. 10 is a schematic view of the image capturing unit when the photographing lens system is in a second optical path state according to the 2nd embodiment.
Figure 11:
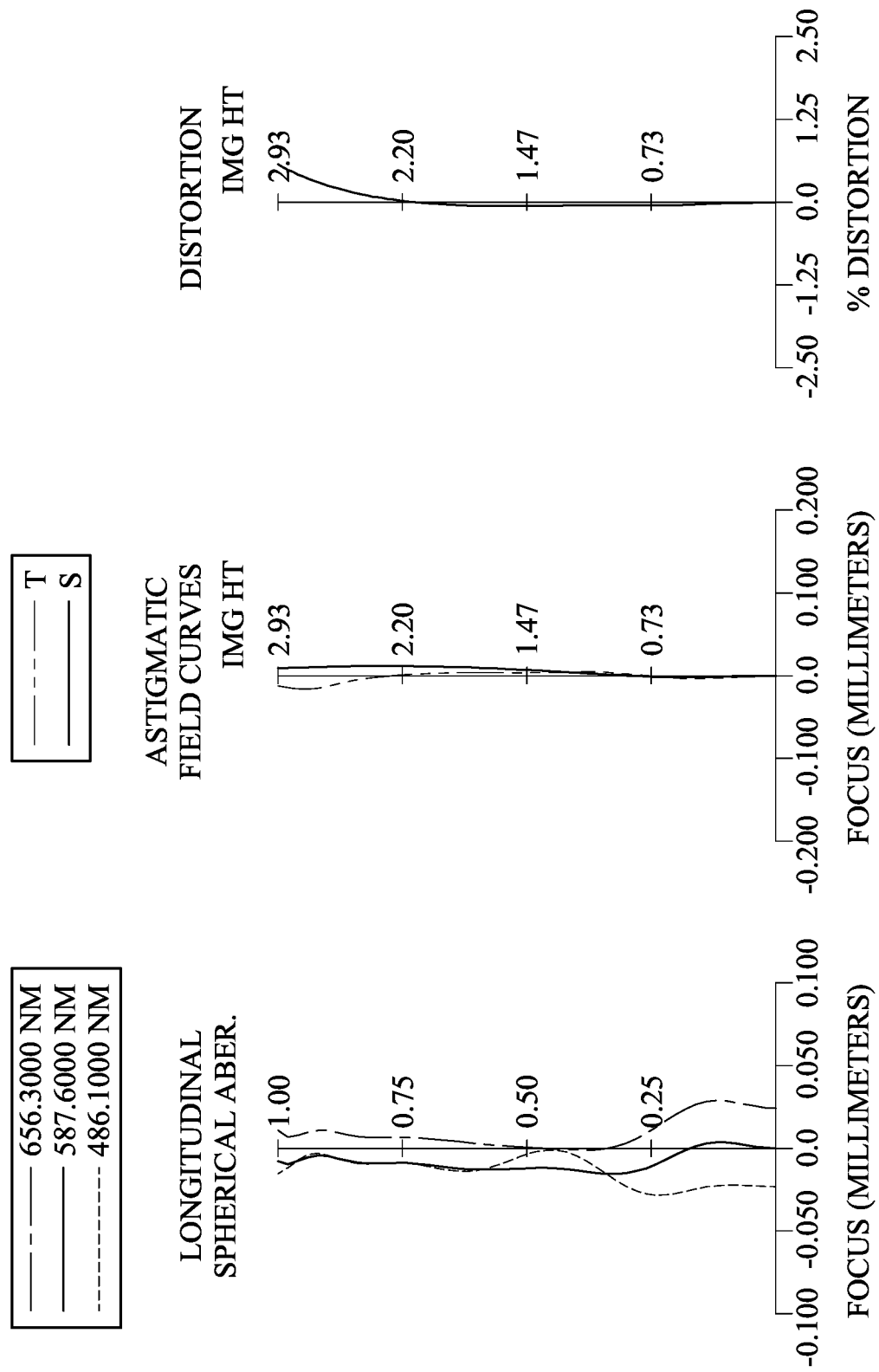
FIG. 11 shows spherical aberration curves, astigmatic field curves and a distortion curve of the image capturing unit when the photographing lens system is in the first optical path state according to the 2nd embodiment.
Figure 12:
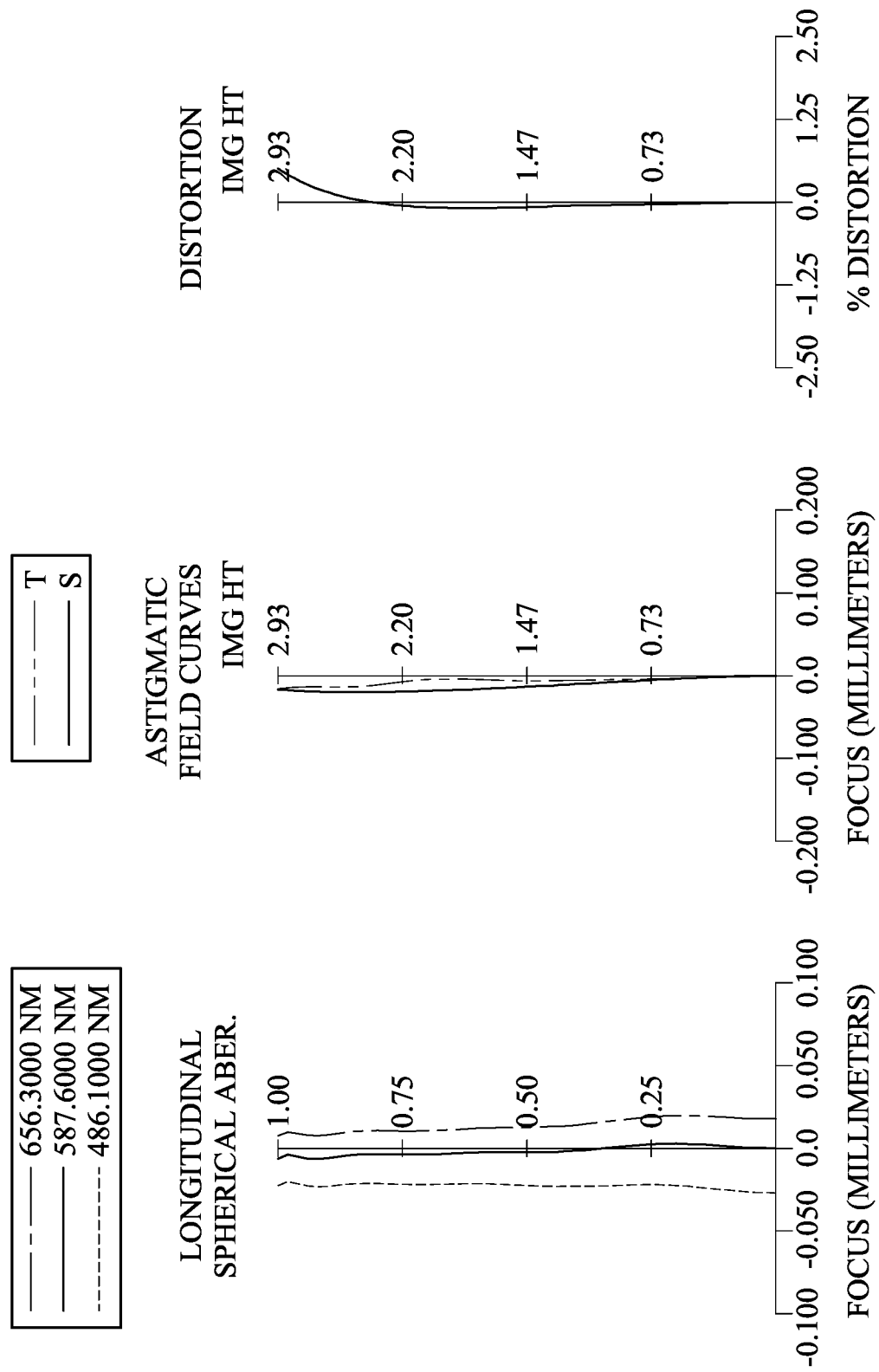
FIG. 12 shows spherical aberration curves, astigmatic field curves and a distortion curve of the image capturing unit when the photographing lens system is in the second optical path state according to the 2nd embodiment.

FIG. 9 is a schematic view of an image capturing unit when a photographing lens system is in a first optical path state according to the 2nd embodiment of the present disclosure. FIG. 10 is a schematic view of the image capturing unit when the photographing lens system is in a second optical path state according to the 2nd embodiment. FIG. 11 shows, in order from left to right, spherical aberration curves, astigmatic field curves and a distortion curve of the image capturing unit when the photographing lens system is in the first optical path state according to the 2nd embodiment. FIG. 12 shows, in order from left to right, spherical aberration curves, astigmatic field curves and a distortion curve of the image capturing unit when the photographing lens system is in the second optical path state according to the 2nd embodiment. In FIG. 9 and FIG. 10, the image capturing unit 2 includes the photographing lens system (its reference numeral is omitted) of the present disclosure and an image sensor IS. The photographing lens system includes a first front lens switching mechanism. The optical path switching mechanism is configured for the photographing lens system to be switched between a first optical path state and a second optical path state. As shown in FIG. 9, when the photographing lens system is in the first optical path state, the photographing lens system includes, in order from an object side to an image side along a first optical path, the first front lens group Gf1 and the rear lens group Gr. As shown in FIG. 10, when the photographing lens system is in the second optical path state, the photographing lens system includes, in order from the object side to the image side along a second optical path, the second front lens group Gf2 and the rear lens group Gr. The first front lens group Gf1 includes four lens elements which are, in order from the object side to the image side along the first optical path, a first front group first lens element Lf11, a first front group second lens element Lf12, a first front group third lens element Lf13 and a first front group fourth lens element Lf14, and there is no additional lens element disposed between each of the adjacent four lens elements. The second front lens group Gf2 includes one lens element which is a second front group first lens element Lf21. The rear lens group Gr includes four lens elements which are, in order from the object side to the image side along the optical path, a rear group first lens element Lr1, a rear group second lens element Lr2, a rear group third lens element Lr3 and a rear group fourth lens element Lr4, and there is no additional lens element disposed between each of the adjacent four lens elements. Moreover, the rear lens group Gr includes a movable lens subgroup Gm, and the movable lens subgroup Gm can be moved along an optical axis when the photographing lens system is switched between the first optical path state and the one lens element, which is the rear group fourth lens element Lr4, and the movable lens subgroup Gm has negative refractive power. As seen in FIG. 9 and FIG. 10, when the photographing lens system is switched from the first optical path state to the second optical path state, the movable lens subgroup Gm is moved towards the image side along the optical axis.

The photographing lens system further includes an aperture stop ST1, a prism E1, a stop S1, an aperture stop ST2, a filter E3 and an image surface IMG. As shown in FIG. 9, when the photographing lens system is in the first optical path state, the photographing lens system includes, in order from the object side to the image side along the first optical path, the aperture stop ST1, the first front group first lens element Lf11, the prism E1, the first front group second lens element Lf12, the first front group third lens element Lf13, the stop S1, the first front group fourth lens element Lf14, the rear group first lens element Lr1, the rear group second lens element Lr2, the rear group third lens element Lr3, the rear group fourth lens element Lr4, the filter E3 and the image surface IMG. As shown in FIG. 10, when the photographing lens system is in the second optical path state, the photographing lens system includes, in order from the object side to the image side along the second optical path, the aperture stop ST2, the second front group first lens element Lf21, the rear group first lens element Lr1, the rear group second lens element Lr2, the rear group third lens element Lr3, the rear group fourth lens element Lr4, the filter E3 and the image surface IMG.

The prism E1 is made of glass material and has a reflection surface, the prism E1 is disposed in the first front lens group Gf1, and the first optical path is folded by capturing unit, the optical paths respectively shown in FIG. 9 and FIG. 10 are not folded by a reflector (e.g., the prism E1). However, it can be understood that the arrangement of light-folding element(s) of the image capturing unit 2 can be similar to the configurations as shown in FIG. 5 to FIG. 8 of the 1st embodiment, and the arrangement of the optical path switching mechanism can be similar to the configurations as shown in FIG. 26 to FIG. 29, and the present disclosure is not limited thereto.

The first front group first lens element Lf11 with positive refractive power has an object-side surface being convex in a paraxial region thereof and an image-side surface being concave in a paraxial region thereof. The first front group first lens element Lf11 is made of plastic material and has the object-side surface and the image-side surface being both aspheric.

The first front group second lens element Lf12 with positive refractive power has an object-side surface being convex in a paraxial region thereof and an image-side surface being convex in a paraxial region thereof. The first front group second lens element Lf12 is made of plastic material and has the object-side surface and the image-side surface being both aspheric.

The first front group third lens element Lf13 with negative refractive power has an object-side surface being concave in a paraxial region thereof and an image-side surface being concave in a paraxial region thereof. The first front group third lens element Lf13 is made of plastic material and has the object-side surface and the image-side surface being both aspheric.

The first front group fourth lens element Lf14 with positive refractive power has surface being convex in a paraxial region thereof. The first front group fourth lens element Lf14 is made of plastic material and has the object-side surface and the image-side surface being both aspheric.

The second front group first lens element Lf21 with positive refractive power has an object-side surface being convex in a paraxial region thereof and an image-side surface being concave in a paraxial region thereof. The second front group first lens element Lf21 is made of plastic material and has the object-side surface and the image-side surface being both aspheric.

The rear group first lens element Lr1 with positive refractive power has an object-side surface being convex in a paraxial region thereof and an image-side surface being convex in a paraxial region thereof. The rear group first lens element Lr1 is made of plastic material and has the object-side surface and the image-side surface being both aspheric.

The rear group second lens element Lr2 with negative refractive power has an object-side surface being concave in a paraxial region thereof and an image-side surface being convex in a paraxial region thereof. The rear group second lens element Lr2 is made of plastic material and has the object-side surface and the image-side surface being both aspheric.

The rear group third lens element Lr3 with positive refractive power has an object-side surface being convex in a paraxial region thereof and an image-side surface being concave in a paraxial region thereof. The rear group third lens element Lr3 is made of plastic material and has the object-side surface and the image-side surface being both aspheric.

The rear group fourth lens element Lr4 with negative refractive power has an object-side surface being concave in a paraxial region thereof and an image-side surface being convex in a paraxial region thereof. The rear group fourth lens element Lr4 is made of plastic material and has the object-side surface and the image-side surface being both aspheric. The object-side surface of the rear group fourth lens element Lr4 has one critical point in an off-axis region thereof.

The filter E3 is made of glass material and located between the rear group fourth lens element Lr4 and the image surface IMG, and will not affect the focal length of the photographing lens system. The image sensor IS is disposed on or near the image surface IMG of the photographing lens system.

The detailed optical data of the 2nd embodiment are shown in Table 4 and Table 5, and the aspheric surface data are shown in Table 6 below.

TABLE 4

2nd Embodiment (First optical path state)
F = 25.49 mm, Fno = 3.62, HFOV = 6.5 deg.

| Surface # |  | Curvature Radius |  | Thickness | Material | Index | Abbe # | Focal Length |
|---|---|---|---|---|---|---|---|---|
| O-S0 | Object | Plano |  | Infinity |  |  |  |  |
| Gf1-S1 | Ape. Stop | Plano |  | −0.666 |  |  |  |  |
| Gf1-S2 | Lf11 | 9.6268 | (ASP) | 1.000 | Plastic | 1.545 | 56.1 | 19.37 |
| Gf1-S3 |  | 105.4145 | (ASP) | 0.800 |  |  |  |  |
| Gf1-S4 | Reflector | Plano |  | 5.650 | Glass | 1.517 | 64.2 | — |
| Gf1-S5 |  | Plano |  | 0.402 |  |  |  |  |
| Gf1-S6 | Lf12 | 186.7911 | (ASP) | 0.618 | Plastic | 1.534 | 56.0 | 92.94 |
| Gf1-S7 |  | −67.5549 | (ASP) | 0.089 |  |  |  |  |
| Gf1-S8 | Lf13 | −132.0905 | (ASP) | 0.572 | Plastic | 1.669 | 19.5 | −8.39 |
| Gf1-S9 |  | 5.8729 | (ASP) | 1.061 |  |  |  |  |
| Gf1-S10 | Stop | Plano |  | 0.816 |  |  |  |  |
| Gf1-S11 | Lf14 | −22.5658 | (ASP) | 1.310 | Plastic | 1.669 | 19.5 | 12.93 |
| Gf1-S12 |  | −6.3978 | (ASP) | 11.401 |  |  |  |  |
| Gr-S1 | Lr1 | 18.1406 | (ASP) | 1.843 | Plastic | 1.545 | 56.1 | 6.06 |
| Gr-S2 |  | −3.8951 | (ASP) | 0.111 |  |  |  |  |
| Gr-S3 | Lr2 | −2.3628 | (ASP) | 0.901 | Plastic | 1.669 | 19.5 | −3.69 |
| Gr-S4 |  | −62.6782 | (ASP) | 0.568 |  |  |  |  |
| Gr-S5 | Lr3 | 3.5581 | (ASP) | 1.800 | Plastic | 1.669 | 19.5 | 5.38 |
| Gr-S6 |  | 248.1571 | (ASP) | 0.383 |  |  |  |  |
| Gr-S7 | Lr4 | −3.0035 | (ASP) | 0.514 | Plastic | 1.545 | 56.1 | −9.00 |
| Gr-S8 |  | −8.2140 | (ASP) | 2.711 |  |  |  |  |
| O-S1 | Filter | Plano |  | 0.210 | Glass | 1.517 | 64.2 | — |
| O-S2 |  | Plano |  | 1.000 |  |  |  |  |
| O-S3 | Image | Plano |  | — |  |  |  |  |

Note:
Reference wavelength is 587.6 nm (d-line).
An effective radius of the stop S1 (Surface Gf1-S10) is 2.880 mm.
The reflector is disposed in the first front lens group Gf1.
The reflector is the prism E1 having a reflection surface.

TABLE 5

2nd Embodiment (Second optical path state)
F = 12.66 mm, Fno = 2.53, HFOV = 13.0 deg.

| Surface # |  | Curvature Radius |  | Thickness | Material | Index | Abbe # | Focal Length |
|---|---|---|---|---|---|---|---|---|
| O-S0 | Object | Plano |  | Infinity |  |  |  |  |
| Gf2-S1 | Ape. Stop | Plano |  | −0.255 |  |  |  |  |
| Gf2-S2 | Lf21 | 9.1314 | (ASP) | 0.806 | Plastic | 1.545 | 56.1 | 17.28 |
| Gf2-S3 |  | 290.4064 | (ASP) | 5.966 |  |  |  |  |
| Gr-S1 | Lr1 | 18.1406 | (ASP) | 1.843 | Plastic | 1.545 | 56.1 | 6.06 |
| Gr-S2 |  | −3.8951 | (ASP) | 0.111 |  |  |  |  |
| Gr-S3 | Lr2 | −2.3628 | (ASP) | 0.901 | Plastic | 1.669 | 19.5 | −3.69 |
| Gr-S4 |  | −62.6782 | (ASP) | 0.568 |  |  |  |  |
| Gr-S5 | Lr3 | 3.5581 | (ASP) | 1.800 | Plastic | 1.669 | 19.5 | 5.38 |
| Gr-S6 |  | 248.1571 | (ASP) | 1.728 |  |  |  |  |
| Gr-S7 | Lr4 | −3.0035 | (ASP) | 0.514 | Plastic | 1.545 | 56.1 | −9.00 |
| Gr-S8 |  | −8.2140 | (ASP) | 1.254 |  |  |  |  |
| O-S1 | Filter | Plano |  | 0.210 | Glass | 1.517 | 64.2 | — |
| O-S2 |  | Plano |  | 1.000 |  |  |  |  |
| O-S3 | Image | Plano |  | — |  |  |  |  |

Note:
Reference wavelength is 587.6 nm (d-line).
A reflector can be further included.
The reflector can be disposed between the second front lens group Gf2 and the rear lens group Gr.
Alternatively, the reflector can be disposed on the object side of the second front lens group Gf2.
The reflector is a prism or a flat mirror having a reflection surface.

TABLE 6

Aspheric Coefficients

| Surface # | Gf1-S2 | Gf1-S3 | Gf1-S6 | Gf1-S7 | Gf1-S8 |
|---|---|---|---|---|---|
| k = | 0.00000E+00 | 0.00000E+00 | 0.00000E+00 | 0.00000E+00 | 0.00000E+00 |
| A4 = | 5.7577245E−04 | 8.8390683E−04 | 9.0963554E−03 | 1.2890751E−02 | −3.6382009E−03 |
| A6 = | −1.1598894E−04 | −1.7000055E−04 | −1.1064381E−02 | −2.8145086E−02 | −3.8780466E−04 |
| A8 = | 3.2998580E−05 | 4.5902256E−05 | 5.9491293E−03 | 2.2863700E−02 | 4.5773996E−03 |
| A10 = | −6.2649838E−06 | −9.2759161E−06 | −1.9486863E−03 | −1.0742638E−02 | −3.4824762E−03 |
| A12 = | 7.1445414E−07 | 1.1888898E−06 | 4.0791562E−04 | 3.1658040E−03 | 1.2341877E−03 |
| A14 = | −5.0757359E−08 | −1.0063992E−07 | −5.3926467E−05 | −6.0334519E−04 | −2.4677782E−04 |
| A16 = | 2.0656510E−09 | 5.4476433E−09 | 4.2832614E−06 | 7.4310321E−05 | 2.8550348E−05 |
| A18 = | 3.8534193E−11 | −1.7271246E−10 | −1.8171491E−07 | −5.7185951E−06 | −1.7844742E−06 |
| A20 = | — | 2.3641491E−12 | 3.0403024E−09 | 2.5092550E−07 | 4.6672713E−08 |
| A22 = | — | — | — | −4.8170256E−09 | — |

| Surface # | Gf1-S9 | Gf1-S11 | Gf1-S12 | Gf2-S2 | Gf2-S3 |
|---|---|---|---|---|---|
| k = | 0.00000E+00 | 0.00000E+00 | 0.00000E+00 | −9.83808E+00 | 0.00000E+00 |
| A4 = | −7.1920936E−03 | −4.0692959E−03 | −2.9216731E−03 | 3.4656766E−04 | −1.2041197E−03 |
| A6 = | 1.4375020E−02 | 1.2416369E−03 | 4.1620490E−04 | −1.0619047E−04 | −1.9790052E−04 |
| A8 = | −9.1597431E−03 | −6.9577334E−04 | −2.3617934E−04 | −2.4611793E−05 | 1.1256596E−04 |
| A10 = | 3.2240890E−03 | 2.0638691E−04 | 6.2203190E−05 | 3.7468536E−06 | −6.2439158E−05 |
| A12 = | −7.0485561E−04 | −3.6876043E−05 | −9.9163873E−06 | −4.0275642E−07 | 1.8011487E−05 |
| A14 = | 9.8351130E−05 | 4.3922919E−06 | 1.0194005E−06 | 6.3320074E−09 | −2.9629002E−06 |
| A16 = | −8.5291925E−06 | −3.3414079E−07 | −6.4854410E−08 | 1.9902349E−11 | 2.5739411E−07 |
| A18 = | 4.1777745E−07 | 1.4383360E−08 | 2.3334979E−09 | — | −9.2401511E−09 |
| A20 = | −8.7959405E−09 | −2.6396466E−10 | −3.6368171E−11 | — | — |

| Surface # | Gr-S1 | Gr-S2 | Gr-S3 | Gr-S4 | Gr-S5 |
|---|---|---|---|---|---|
| k = | 0.00000E+00 | −1.00000E+00 | −1.00000E+00 | 0.00000E+00 | −1.00000E+00 |
| A4 = | −1.5283678E−03 | 8.4866598E−03 | 4.7580345E−02 | 1.9847428E−02 | −1.0108776E−02 |
| A6 = | −2.0621848E−04 | 3.0428480E−03 | −1.1183435E−02 | −6.1226939E−03 | 1.3898002E−03 |
| A8 = | 8.2116505E−05 | −3.4696401E−03 | 1.6442503E−03 | 1.8419984E−03 | −2.3349669E−04 |
| A10 = | −2.3852746E−05 | 1.3284359E−03 | −1.1800007E−04 | −4.4703605E−04 | 3.4904133E−05 |
| A12 = | 5.1259154E−06 | −2.8842832E−04 | 6.4176608E−06 | 7.9286070E−05 | −4.8484533E−06 |
| A14 = | −5.8868083E−07 | 3.9418885E−05 | −2.6836998E−06 | −9.7261587E−06 | 4.0679119E−07 |
| A16 = | 3.4476112E−08 | −3.4637324E−06 | 6.0160221E−07 | 7.6182208E−07 | 8.9306359E−09 |
| A18 = | −8.2444847E−10 | 1.9074608E−07 | −5.9971628E−08 | −3.3582560E−08 | −5.6726665E−09 |
| A20 = | — | −6.0043735E−09 | 2.8572697E−09 | 6.2705319E−10 | 4.6000546E−10 |
| A22 = | — | 8.2369101E−11 | −5.3610859E−11 | — | −1.1925567E−11 |

| Surface # | Gr-S6 | Gr-S7 | Gr-S8 | — | — |
|---|---|---|---|---|---|
| k = | 0.00000E+00 | −1.00000E+00 | 0.00000E+00 | — | — |
| A4 = | −1.0278539E−03 | 5.1710355E−02 | 4.4111717E−02 | — | — |
| A6 = | −3.3532644E−05 | −1.3269661E−02 | −8.4375450E−03 | — | — |
| A8 = | −1.8322647E−04 | 3.1505861E−03 | 7.2888361E−04 | — | — |
| A10 = | 1.1126595E−04 | −5.9893486E−04 | 3.6194681E−04 | — | — |
| A12 = | −3.5599381E−05 | 8.5358367E−05 | −1.9694059E−04 | — | — |
| A14 = | 6.8665934E−06 | −8.5629126E−06 | 4.9781206E−05 | — | — |
| A16 = | −8.1971944E−07 | 5.6147784E−07 | −7.5265302E−06 | — | — |
| A18 = | 5.9042448E−08 | −2.1295142E−08 | 6.8682367E−07 | — | — |
| A20 = | −2.3527707E−09 | 3.4915016E−10 | −3.4748523E−08 | — | — |
| A22 = | 3.9949044E−11 | — | 7.4487417E−10 | — | — |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 4, Table 5 and Table 6 as the following values and satisfy the following conditions:

2nd Embodiment

|  | 1st optical path state | 2nd optical path state |  | 1st optical path state | 2nd optical path state |
|---|---|---|---|---|---|
| F [mm] | 25.49 | 12.66 | EPD/Yff1f | 2.00 | 2.00 |
| FGf [mm] | 27.84 | 17.28 | Yff1f/ImgH | 1.20 | 0.85 |
| FGr [mm] | 863.24 | 60.21 | Yff1f/Yfr1r | 1.08 | 0.98 |
| Fno | 3.62 | 2.53 | Yff1f/Yrr1r | 1.23 | 0.92 |
| HFOV [deg.] | 6.5 | 13.0 | Yrf1f/Yrr1r | 1.17 | 1.09 |
| TGf [mm] | 12.318 | 0.806 | Ymax/Ymin | 1.29 | 1.28 |
| TGr [mm] | 6.120 | 7.465 | YCrr1f/Yrr1f | 0.67 | 0.73 |
| TGfGr [mm] | 11.401 | 5.966 | (Vrf1 + Vrr1)/(Vrf2 +Vrr2) | 2.88 | |
| TGf/Tff1ff2 | 1.80 | — | minVGr | 19.5 | |
| TGfGr/Tfr1 | 8.70 | 7.40 | Vrr1/Vrr2 | 2.88 | |
| TL/F | 1.32 | 1.32 | (Frf2 + Frr1)/(Frf1 + Frr2) | −1.11 | |
| Fff1/Tff1 | 19.37 | 21.44 | FGm/TGm | −17.51 | |
| Ffr1/Ffr2 | −1.54 | — | FGf1/FGf2 | 1.61 | |
| FGf/|FGr| | 0.03 | 0.29 | FS1/FS2 | 2.01 | |

3rd Embodiment

Figure 13:
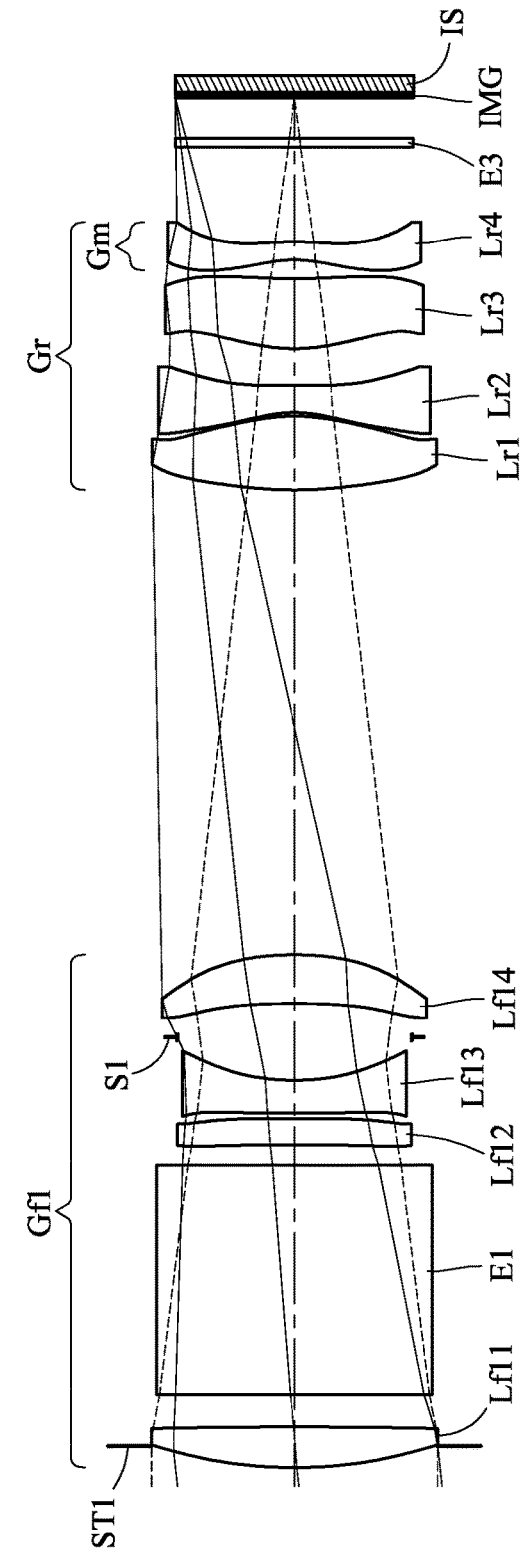
FIG. 13 is a schematic view of an image capturing unit when a photographing lens system is in a first optical path state according to the 3rd embodiment of the present disclosure.
Figure 14:
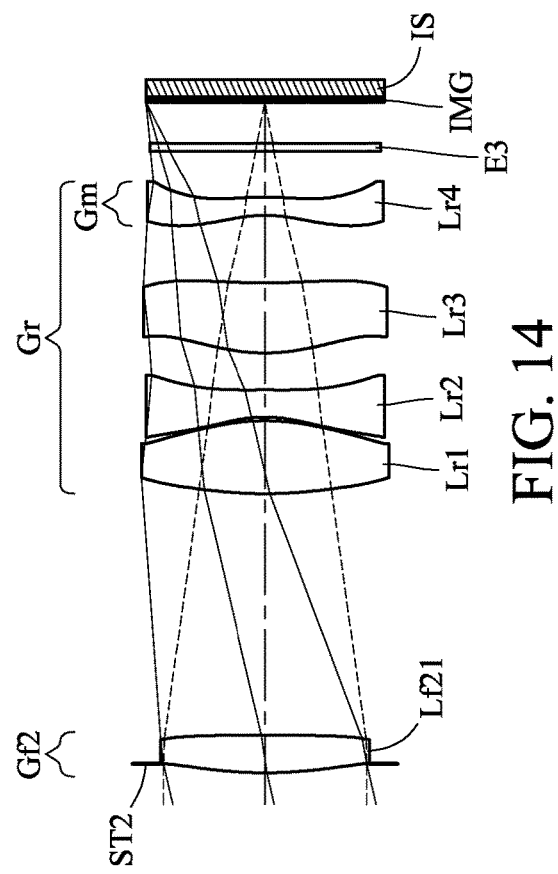
FIG. 14 is a schematic view of the image capturing unit when the photographing lens system is in a second optical path state according to the 3rd embodiment.
Figure 15:
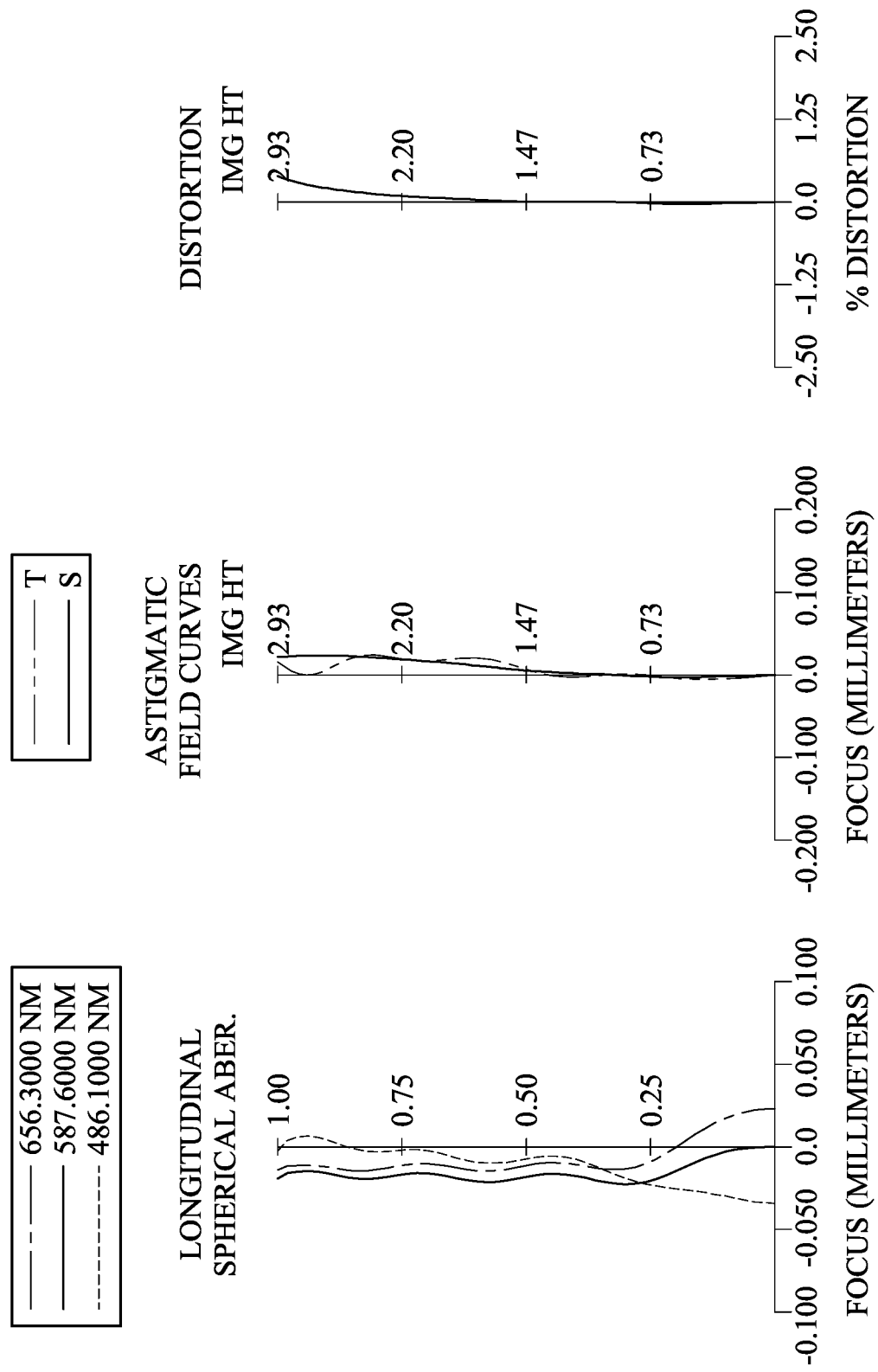
FIG. 15 shows spherical aberration curves, astigmatic field curves and a distortion curve of the image capturing unit when the photographing lens system is in the first optical path state according to the 3rd embodiment.
Figure 16:
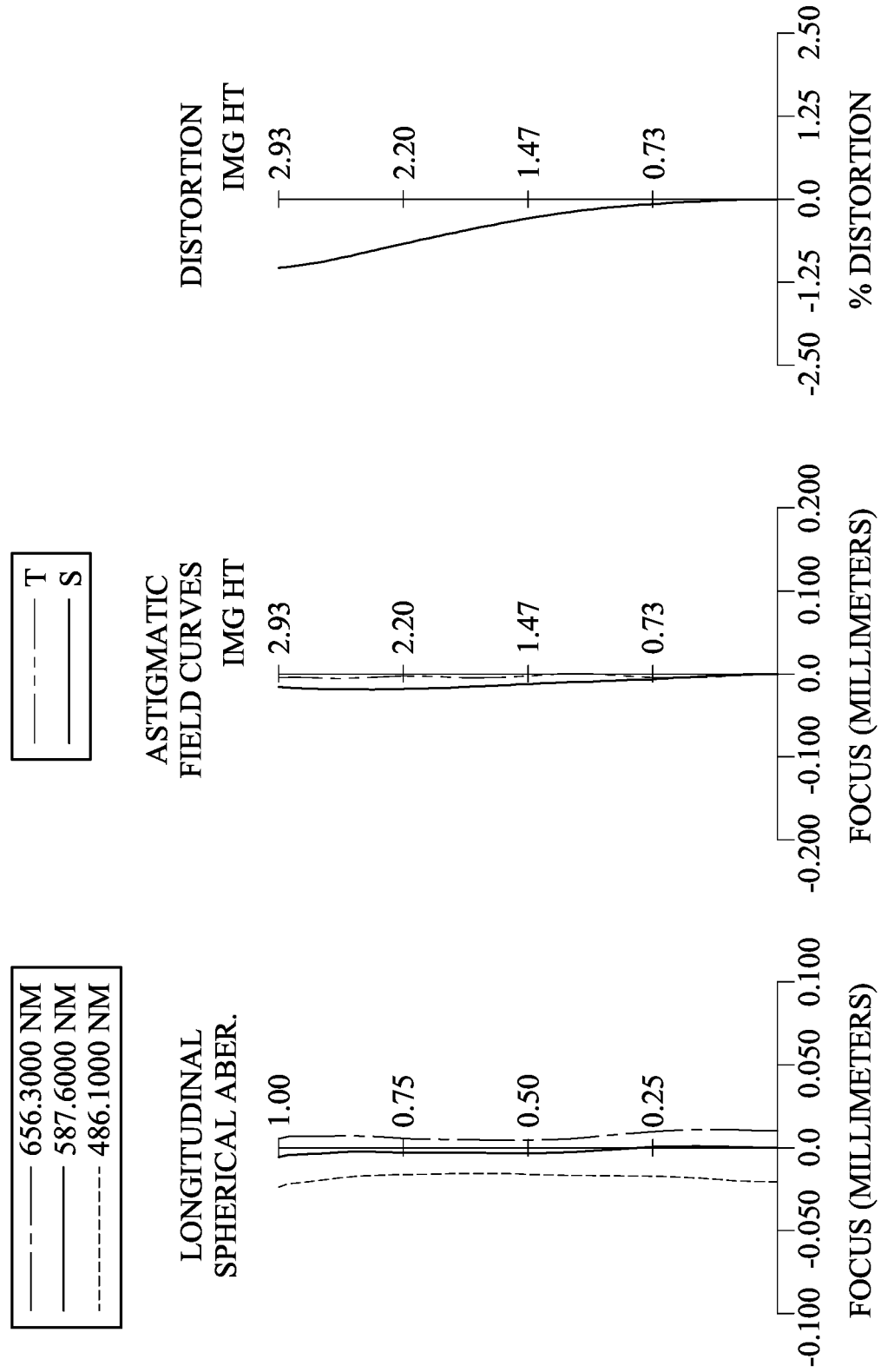
FIG. 16 shows spherical aberration curves, astigmatic field curves and a distortion curve of the image capturing unit when the photographing lens system is in the second optical path state according to the 3rd embodiment.

FIG. 13 is a schematic view of an image capturing unit when a photographing lens system is in a first optical path state according to the 3rd embodiment of the present disclosure. FIG. 14 is a schematic view of the image capturing unit when the photographing lens system is in a second optical path state according to the 3rd embodiment. FIG. 15 shows, in order from left to right, spherical aberration curves, astigmatic field curves and a distortion curve of the image capturing unit when the photographing lens system is in the first optical path state according to the 3rd embodiment. FIG. 16 shows, in order from left to right, spherical aberration curves, astigmatic field curves and a distortion curve of the image capturing unit when the photographing lens system is in the second optical path state according to the 3rd embodiment. In FIG. 13 and FIG. 14, the image capturing unit 3 includes the photographing lens system (its reference numeral is omitted) of the present disclosure and an image sensor IS. The photographing lens system includes a first front lens switching mechanism. The optical path switching mechanism is configured for the photographing lens system to be switched between a first optical path state and a second optical path state. As shown in FIG. 13, when the photographing lens system is in the first optical path state, the photographing lens system includes, in order from an object side to an image side along a first optical path, the first front lens group Gf1 and the rear lens group Gr. As shown in FIG. 14, when the photographing lens system is in the second optical path state, the photographing lens system includes, in order from the object side to the image side along a second optical path, the second front lens group Gf2 and the rear lens group Gr. The first front lens group Gf1 includes four lens elements which are, in order from the object side to the image side along the first optical path, a first front group first lens element Lf11, a first front group second lens element Lf12, a first front group third lens element Lf13 and a first front group fourth lens element Lf14, and there is no additional lens element disposed between each of the adjacent four lens elements. The second front lens group Gf2 includes one lens element which is a second front group first lens element Lf21. The rear lens group Gr includes four lens elements which are, in order from the object side to the image side along the optical path, a rear group first lens element Lr1, a rear group second lens element Lr2, a rear group third lens element Lr3 and a rear group fourth lens element Lr4, and there is no additional lens element disposed between each of the adjacent four lens elements. Moreover, the rear lens group Gr includes a movable lens subgroup Gm, and the movable lens subgroup Gm can be moved along an optical axis when the photographing lens system is switched between the first optical path state and the one lens element, which is the rear group fourth lens element Lr4, and the movable lens subgroup Gm has negative refractive power. As seen in FIG. 13 and FIG. 14, when the photographing lens system is switched from the first optical path state to the second optical path state, the movable lens subgroup Gm is moved towards the image side along the optical axis.

The photographing lens system further includes an aperture stop ST1, a prism E1, a stop S1, an aperture stop ST2, a filter E3 and an image surface IMG. As shown in FIG. 13, when the photographing lens system is in the first optical path state, the photographing lens system includes, in order from the object side to the image side along the first optical path, the aperture stop ST1, the first front group first lens element Lf11, the prism E1, the first front group second lens element Lf12, the first front group third lens element Lf13, the stop S1, the first front group fourth lens element Lf14, the rear group first lens element Lr1, the rear group second lens element Lr2, the rear group third lens element Lr3, the rear group fourth lens element Lr4, the filter E3 and the image surface IMG. As shown in FIG. 14, when the photographing lens system is in the second optical path state, the photographing lens system includes, in order from the object side to the image side along the second optical path, the aperture stop ST2, the second front group first lens element Lf21, the rear group first lens element Lr1, the rear group second lens element Lr2, the rear group third lens element Lr3, the rear group fourth lens element Lr4, the filter E3 and the image surface IMG.

The prism E1 is made of glass material and has a reflection surface, the prism E1 is disposed in the first front lens group Gf1, and the first optical path is folded by capturing unit, the optical paths respectively shown in FIG. 13 and FIG. 14 are not folded by a reflector (e.g., the prism E1). However, it can be understood that the arrangement of light-folding element(s) of the image capturing unit 3 can be similar to the configurations as shown in FIG. 5 to FIG. 8 of the 1st embodiment, and the arrangement of the optical path switching mechanism can be similar to the configurations as shown in FIG. 26 to FIG. 29, and the present disclosure is not limited thereto.

The first front group first lens element Lf11 with positive refractive power has an object-side surface being convex in a paraxial region thereof and an image-side surface being convex in a paraxial region thereof. The first front group first lens element Lf11 is made of plastic material and has the object-side surface and the image-side surface being both aspheric.

The first front group second lens element Lf12 with negative refractive power has an object-side surface being concave in a paraxial region thereof and an image-side surface being concave in a paraxial region thereof. The first front group second lens element Lf12 is made of plastic material and has the object-side surface and the image-side surface being both aspheric.

The first front group third lens element Lf13 with negative refractive power has an object-side surface being convex in a paraxial region thereof and an image-side surface being concave in a paraxial region thereof. The first front group third lens element Lf13 is made of plastic material and has the object-side surface and the image-side surface being both aspheric.

The first front group fourth lens element Lf14 with positive refractive power has surface being convex in a paraxial region thereof. The first front group fourth lens element Lf14 is made of plastic material and has the object-side surface and the image-side surface being both aspheric.

The second front group first lens element Lf21 with positive refractive power has an object-side surface being convex in a paraxial region thereof and an image-side surface being convex in a paraxial region thereof. The second front group first lens element Lf21 is made of plastic material and has the object-side surface and the image-side surface being both aspheric.

The rear group first lens element Lr1 with positive refractive power has an object-side surface being convex in a paraxial region thereof and an image-side surface being convex in a paraxial region thereof. The rear group first lens element Lr1 is made of glass material and has the object-side surface and the image-side surface being both aspheric.

The rear group second lens element Lr2 with negative refractive power has an object-side surface being concave in a paraxial region thereof and an image-side surface being convex in a paraxial region thereof. The rear group second lens element Lr2 is made of plastic material and has the object-side surface and the image-side surface being both aspheric.

The rear group third lens element Lr3 with positive refractive power has an object-side surface being convex in a paraxial region thereof and an image-side surface being concave in a paraxial region thereof. The rear group third lens element Lr3 is made of plastic material and has the object-side surface and the image-side surface being both aspheric.

The rear group fourth lens element Lr4 with negative refractive power has an object-side surface being concave in a paraxial region thereof and an image-side surface being convex in a paraxial region thereof. The rear group fourth lens element Lr4 is made of plastic material and has the object-side surface and the image-side surface being both aspheric. The object-side surface of the rear group fourth lens element Lr4 has one critical point in an off-axis region thereof.

The filter E3 is made of glass material and located between the rear group fourth lens element Lr4 and the image surface IMG, and will not affect the focal length of the photographing lens system. The image sensor IS is disposed on or near the image surface IMG of the photographing lens system.

The detailed optical data of the 3rd embodiment are shown in Table 7 and Table 8, and the aspheric surface data are shown in Table 9 below.

TABLE 7

3rd Embodiment (First optical path state)
F = 25.47 mm, Fno = 3.62, HFOV = 6.5 deg.

| Surface # | | Curvature Radius | | Thickness | Material | Index | Abbe # | Focal Length |
|---|---|---|---|---|---|---|---|---|
| O-S0 | Object | Plano | | Infinity | | | | |
| Gf1-S1 | Ape. Stop | Plano | | −0.532 | | | | |
| Gf1-S2 | Lf11 | 11.8388 | (ASP) | 1.000 | Plastic | 1.545 | 56.1 | 18.97 |
| Gf1-S3 | | −79.0049 | (ASP) | 0.800 | | | | |
| Gf1-S4 | Reflector | Plano | | 5.650 | Glass | 1.517 | 64.2 | — |
| Gf1-S5 | | Plano | | 0.485 | | | | |
| Gf1-S6 | Lf12 | −195.3911 | (ASP) | 0.657 | Plastic | 1.545 | 56.1 | −270.07 |
| Gf1-S7 | | 597.0868 | (ASP) | 0.131 | | | | |
| Gf1-S8 | Lf13 | 43.2742 | (ASP) | 0.828 | Plastic | 1.686 | 18.4 | −10.09 |
| Gf1-S9 | | 5.9208 | (ASP) | 1.064 | | | | |
| Gf1-S10 | Stop | Plano | | 0.819 | | | | |
| Gf1-S11 | Lf14 | −20.9801 | (ASP) | 1.205 | Plastic | 1.686 | 18.4 | 14.74 |
| Gf1-S12 | | −6.9823 | (ASP) | 11.461 | | | | |
| Gr-S1 | Lr1 | 10.7785 | (ASP) | 1.813 | Glass | 1.589 | 61.2 | 5.89 |
| Gr-S2 | | −4.7976 | (ASP) | 0.089 | | | | |
| Gr-S3 | Lr2 | −2.9153 | (ASP) | 0.667 | Plastic | 1.686 | 18.4 | −4.50 |
| Gr-S4 | | −57.8281 | (ASP) | 0.906 | | | | |
| Gr-S5 | Lr3 | 4.5551 | (ASP) | 1.725 | Plastic | 1.705 | 14.0 | 8.24 |
| Gr-S6 | | 17.8462 | (ASP) | 0.458 | | | | |
| Gr-S7 | Lr4 | −3.0035 | (ASP) | 0.451 | Plastic | 1.528 | 60.1 | −10.83 |
| Gr-S8 | | −6.6525 | (ASP) | 2.335 | | | | |
| O-S1 | Filter | Plano | | 0.210 | Glass | 1.517 | 64.2 | — |
| O-S2 | | Plano | | 1.000 | | | | |
| O-S3 | Image | Plano | | — | | | | |

Note:
Reference wavelength is 587.6 nm (d-line).
An effective radius of the stop S1 (Surface Gf1-S10) is 2.890 mm.
The reflector is disposed in the first front lens group Gf1.
The reflector is the prism E1 having a reflection surface.

TABLE 8

3rd Embodiment (Second optical path state)
F = 12.85 mm, Fno = 2.57, HFOV = 13.0 deg.

| Surface # | | Curvature Radius | | Thickness | Material | Index | Abbe # | Focal Length |
|---|---|---|---|---|---|---|---|---|
| O-S0 | Object | Plano | | Infinity | | | | |
| Gf2-S1 | Ape. Stop | Plano | | −0.225 | | | | |
| Gf2-S2 | Lf21 | 10.0020 | (ASP) | 0.936 | Plastic | 1.545 | 56.1 | 18.08 |
| Gf2-S3 | | −637.0754 | (ASP) | 5.947 | | | | |
| Gr-S1 | Lr1 | 10.7785 | (ASP) | 1.813 | Glass | 1.589 | 61.2 | 5.89 |
| Gr-S2 | | −4.7976 | (ASP) | 0.089 | | | | |
| Gr-S3 | Lr2 | −2.9153 | (ASP) | 0.667 | Plastic | 1.686 | 18.4 | −4.50 |
| Gr-S4 | | −57.8281 | (ASP) | 0.906 | | | | |
| Gr-S5 | Lr3 | 4.5551 | (ASP) | 1.725 | Plastic | 1.705 | 14.0 | 8.24 |
| Gr-S6 | | 17.8462 | (ASP) | 1.660 | | | | |
| Gr-S7 | Lr4 | −3.0035 | (ASP) | 0.451 | Plastic | 1.528 | 60.1 | −10.83 |
| Gr-S8 | | −6.6525 | (ASP) | 1.132 | | | | |
| O-S1 | Filter | Plano | | 0.210 | Glass | 1.517 | 64.2 | — |
| O-S2 | | Plano | | 1.000 | | | | |
| O-S3 | Image | Plano | | — | | | | |

Note:
Reference wavelength is 587.6 nm (d-line).
A reflector can be further included.
The reflector can be disposed between the second front lens group Gf2 and the rear lens group Gr.
Alternatively, the reflector can be disposed on the object side of the second front lens group Gf2.
The reflector is a prism or a flat mirror having a reflection surface.

TABLE 9

Aspheric Coefficients

| Surface # | Gf1-S2 | Gf1-S3 | Gf1-S6 | Gf1-S7 | Gf1-S8 |
|---|---|---|---|---|---|
| k= | 0.00000E+00 | 0.00000E+00 | 0.00000E+00 | 0.00000E+00 | 0.00000E+00 |
| A4= | 5.3389079E−04 | 8.0030127E−04 | 5.8916183E−03 | −2.4046157E−03 | −1.0377295E−02 |
| A6= | −4.0954127E−05 | −2.5910905E−05 | −4.7250997E−03 | 3.9998886E−04 | 1.1480996E−02 |
| A8= | 2.3249894E−06 | −2.1000721E−05 | 1.2329822E−03 | −1.2453508E−03 | −5.9847606E−03 |
| A10= | −6.3227342E−07 | 6.2267087E−06 | −6.8117173E−05 | 7.0768442E−04 | 1.8126572E−03 |
| A12= | 1.4807127E−07 | −9.6896997E−07 | −3.3046866E−05 | −1.7439824E−04 | −3.5866538E−04 |
| A14= | −1.7906081E−08 | 9.2667048E−08 | 8.2646081E−06 | 1.7700724E−05 | 4.7359682E−05 |
| A16= | 1.0214285E−09 | −5.6031382E−09 | −8.4942889E−07 | 5.3533010E−07 | −4.0912713E−06 |
| A18= | −2.3017636E−11 | 1.9881821E−10 | 4.3065754E−08 | −3.0457880E−07 | 2.1222147E−07 |
| A20= | — | −3.1972979E−12 | −8.9500301E−10 | 2.7636906E−08 | −5.0618125E−09 |
| A22= | — | — | — | −8.6808113E−10 | — |

| Surface # | Gf1-S9 | Gf1-S11 | Gf1-S12 | Gf2-S2 | Gf2-S3 |
|---|---|---|---|---|---|
| k= | 0.00000E+00 | 0.00000E+00 | 0.00000E+00 | −1.20777E+01 | 0.00000E+00 |
| A4= | −3.9694290E−03 | −3.4118563E−03 | −2.8441412E−03 | 2.6346781E−04 | −1.2304834E−03 |
| A6= | 8.5575599E−03 | 7.8080072E−04 | 2.3552385E−04 | −2.3752170E−04 | −2.7038321E−04 |
| A8= | −4.2471675E−03 | −2.7174651E−04 | −9.5837807E−05 | 3.1464474E−05 | 1.1258728E−04 |
| A10= | 9.6569441E−04 | 4.1038903E−06 | 3.4352597E−06 | −8.2068542E−06 | −4.4580103E−05 |
| A12= | −9.2636175E−05 | 1.3290517E−05 | 3.1705931E−06 | 1.0349678E−06 | 1.0418818E−05 |
| A14= | −2.2895370E−06 | −2.6580869E−06 | −6.5815731E−07 | −6.9921400E−08 | −1.4820775E−06 |
| A16= | 1.3282380E−06 | 2.3805031E−07 | 6.1736093E−08 | 1.4602987E−09 | 1.1683149E−07 |
| A18= | −1.1148468E−07 | −1.0791597E−08 | −2.9405664E−09 | — | −3.9407250E−09 |
| A20= | 3.1985770E−09 | 2.0341056E−10 | 5.7294084E−11 | — | — |

| Surface # | Gr-S1 | Gr-S2 | Gr-S3 | Gr-S4 | Gr-S5 |
|---|---|---|---|---|---|
| k= | 0.00000E+00 | −1.00000E+00 | −1.00000E+00 | 0.00000E+00 | −1.00000E+00 |
| A4= | −1.2408513E−03 | 3.5164718E−03 | 3.8246748E−02 | 2.4067954E−02 | −6.0633670E−03 |
| A6= | 3.5167972E−04 | 8.3432237E−03 | −5.5124962E−03 | −8.9632046E−03 | −1.2144073E−03 |
| A8= | −2.2392464E−04 | −5.8838311E−03 | −5.4976184E−04 | 3.1315008E−03 | 8.2579614E−04 |
| A10= | 5.8620552E−05 | 2.1123822E−03 | 6.0497489E−04 | −7.4255297E−04 | −3.3322805E−04 |
| A12= | −7.6313446E−06 | −4.7097531E−04 | −1.7537804E−04 | 1.1149539E−04 | 9.3430903E−05 |
| A14= | 5.4152246E−07 | 6.8423726E−05 | 2.8261272E−05 | −1.0509274E−05 | −1.8350257E−05 |
| A16= | −1.8883710E−08 | −6.4923882E−06 | −2.7798876E−06 | 5.9634918E−07 | 2.3929929E−06 |
| A18= | 2.2364263E−10 | 3.8874585E−07 | 1.6647846E−07 | −1.8120242E−08 | −1.9509527E−07 |
| A20= | — | −1.3333447E−08 | −5.5909163E−09 | 2.1476596E−10 | 8.9535336E−09 |
| A22= | — | 1.9927066E−10 | 8.0673007E−11 | — | −1.7549292E−10 |

| Surface # | Gr-S6 | Gr-S7 | Gr-S8 | | |
|---|---|---|---|---|---|
| k= | 0.00000E+00 | −1.00000E+00 | 0.00000E+00 | — | — |
| A4= | −1.6540209E−03 | 5.1913600E−02 | 4.4346019E−02 | — | — |
| A6= | −1.6061304E−03 | −1.4926340E−02 | −1.0620228E−02 | — | — |

TABLE 9-continued

| Aspheric Coefficients | | | | |
|---|---|---|---|---|
| A8= | 6.5710879E−04 | 4.3834643E−03 | 2.2186872E−03 | — | — |
| A10= | −1.9064480E−04 | −1.0363180E−03 | −2.2272002E−04 | — | — |
| A12= | 3.8323092E−05 | 1.7523622E−04 | −4.1692905E−05 | — | — |
| A14= | −5.4428225E−06 | −1.9687873E−05 | 2.0090785E−05 | — | — |
| A16= | 5.3802888E−07 | 1.3771720E−06 | −3.4822740E−06 | — | — |
| A18= | −3.5147022E−08 | −5.3793832E−08 | 3.2227106E−07 | — | — |
| A20= | 1.3614814E−09 | 8.8812481E−10 | −1.5729963E−08 | — | — |
| A22= | −2.3533142E−11 | — | 3.1782256E−10 | — | — |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 7, Table 8 and Table 9 as the following values and satisfy the following conditions:

| 3rd Embodiment | | | | | |
|---|---|---|---|---|---|
| | 1st optical path state | 2nd optical path state | | 1st optical path state | 2nd optical path state |
| F [mm] | 25.47 | 12.85 | EPD/Yff1f | 2.00 | 2.00 |
| FGf [mm] | 30.70 | 18.08 | Yff1f/ImgH | 1.20 | 0.85 |
| FGr [mm] | 334.88 | 83.77 | Yff1f/Yfr1r | 1.08 | 0.97 |
| Fno | 3.62 | 2.57 | Yff1f/Yrr1r | 1.22 | 0.91 |
| HFOV [deg.] | 6.5 | 13.0 | Yrf1f/Yrr1r | 1.21 | 1.10 |
| TGf [mm] | 12.639 | 0.936 | Ymax/Ymin | 1.28 | 1.22 |
| TGr [mm] | 6.109 | 7.311 | YCrr1f/Yrr1f | 0.68 | 0.73 |
| TGfGr [mm] | 11.461 | 5.947 | (Vrf1 + Vrr1)/(Vrf2 + Vrr2) | 3.74 | |
| TGf/Tff1ff2 | 1.82 | — | minVGr | 14.0 | |
| TGfGr/Tfr1 | 9.51 | 6.35 | Vrr1/Vrr2 | 4.28 | |
| TL/F | 1.33 | 1.29 | (Frf2 + Frr1)/(Frf1 + Frr2) | −1.09 | |
| Fff1/Tff1 | 18.97 | 19.32 | FGm/TGm | −24.02 | |
| Ffr1/Ffr2 | −1.46 | — | FGf1/FGf2 | 1.70 | |
| FGf/|FGr| | 0.09 | 0.22 | FS1/FS2 | 1.98 | |

4th Embodiment

Figure 17:
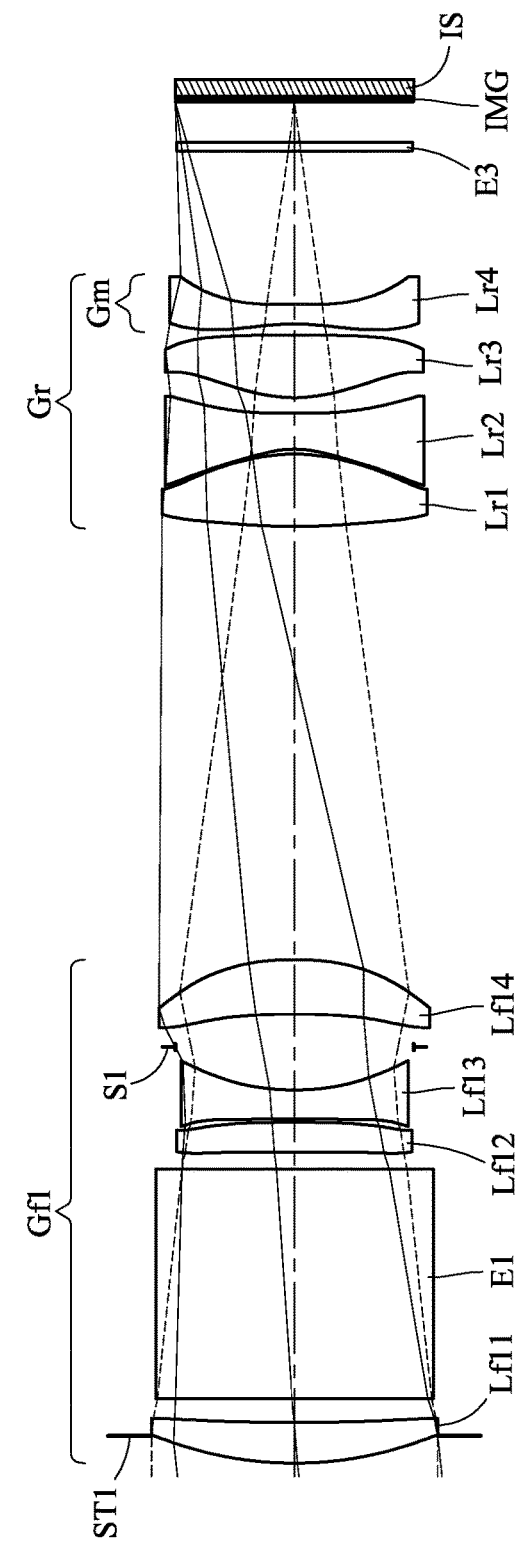
FIG. 17 is a schematic view of an image capturing unit when a photographing lens system is in a first optical path state according to the 4th embodiment of the present disclosure.
Figure 18:
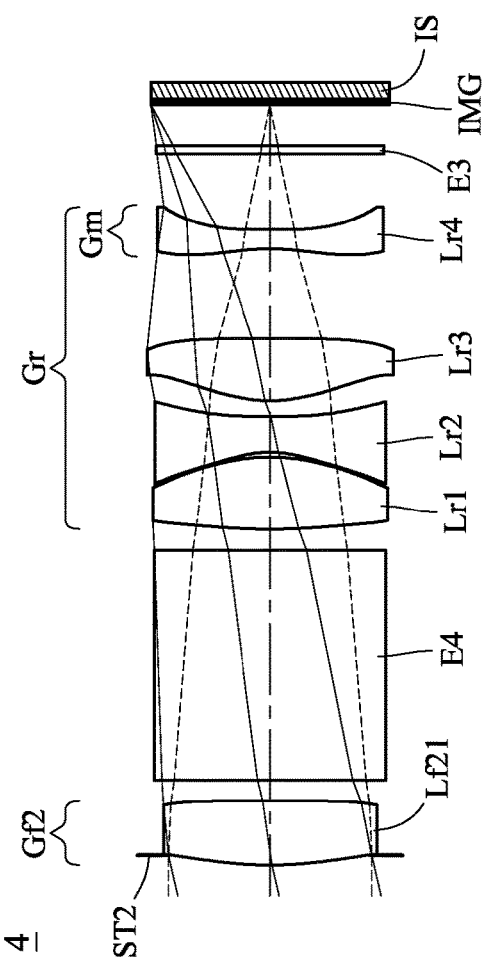
FIG. 18 is a schematic view of the image capturing unit when the photographing lens system is in a second optical path state according to the 4th embodiment.
Figure 19:
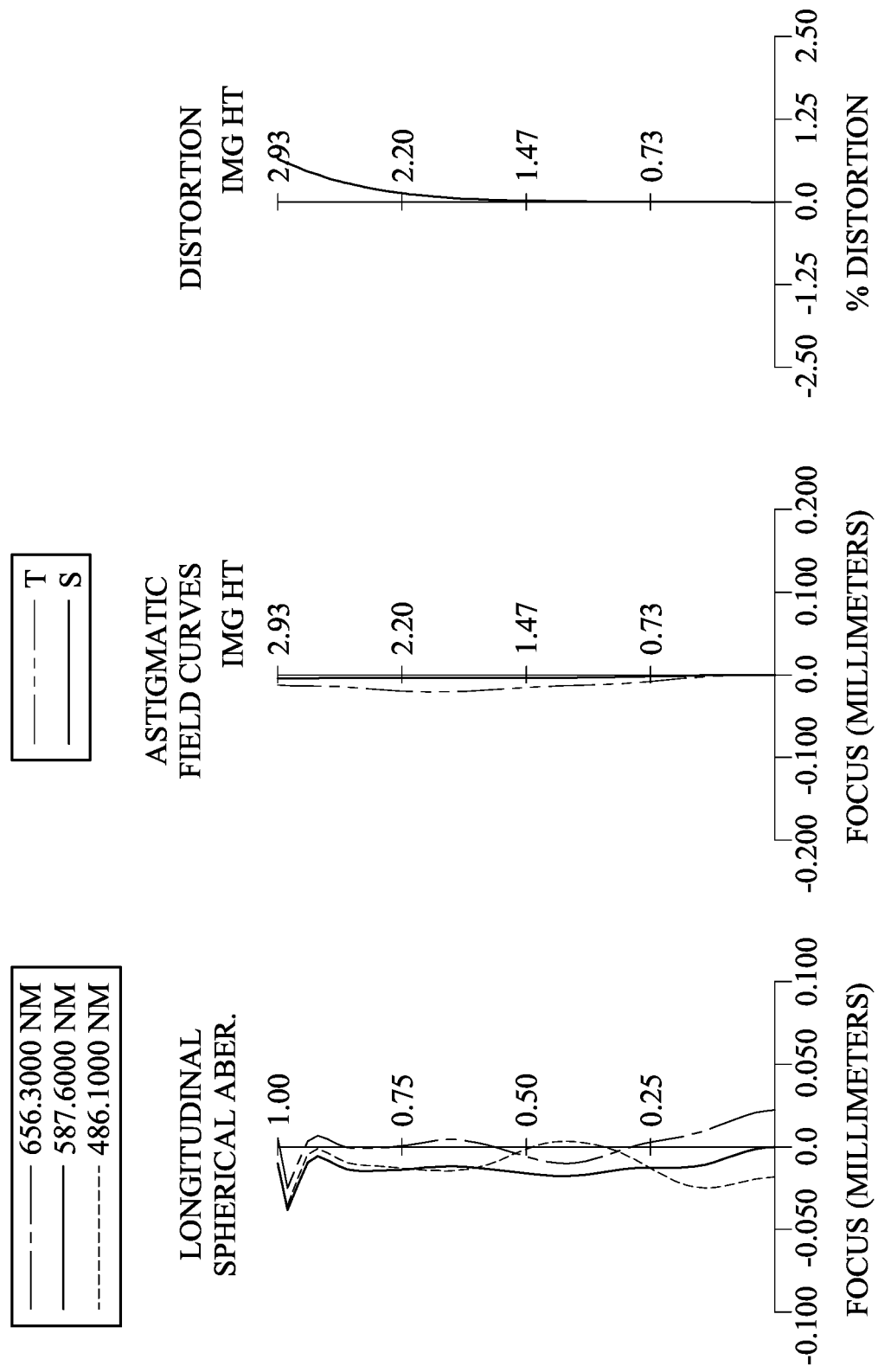
FIG. 19 shows spherical aberration curves, astigmatic field curves and a distortion curve of the image capturing unit when the photographing lens system is in the first optical path state according to the 4th embodiment.
Figure 20:
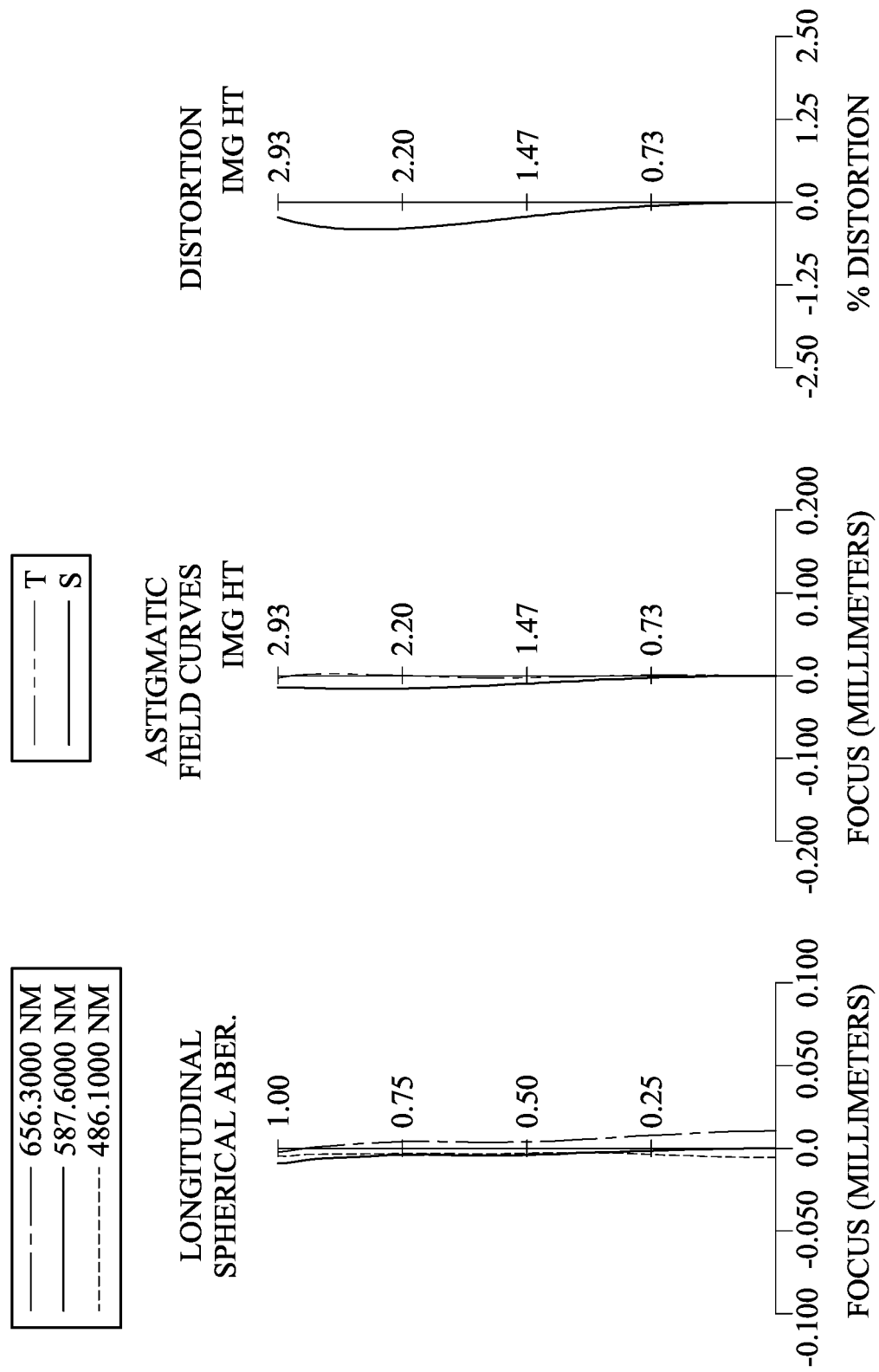
FIG. 20 shows spherical aberration curves, astigmatic field curves and a distortion curve of the image capturing unit when the photographing lens system is in the second optical path state according to the 4th embodiment.

FIG. 17 is a schematic view of an image capturing unit when a photographing lens system is in a first optical path state according to the 4th embodiment of the present disclosure. FIG. 18 is a schematic view of the image capturing unit when the photographing lens system is in a second optical path state according to the 4th embodiment. FIG. 19 shows, in order from left to right, spherical aberration curves, astigmatic field curves and a distortion curve of the image capturing unit when the photographing lens system is in the first optical path state according to the 4th embodiment. FIG. 20, in order from left to right, shows spherical aberration curves, astigmatic field curves and a distortion curve of the image capturing unit when the photographing lens system is in the second optical path state according to the 4th embodiment. In FIG. 17 and FIG. 18, the image capturing unit 4 includes the photographing lens system (its reference numeral is omitted) of the present disclosure and an image sensor IS. The photographing lens system includes a first front lens switching mechanism (not shown in the figure). The optical path switching mechanism is configured for the photographing lens system to be switched between a first optical path state and a second optical path state. As shown in FIG. 17, when the photographing lens system is in the first optical path state, the photographing lens system includes, in order from an object side to an image side along a first optical path, the first front lens group Gf1 and the rear lens group Gr. As shown in FIG. 18, when the photographing lens system is in the second optical path state, the photographing lens system includes, in order from the object side to the image side along a second optical path, the second front lens group Gf2 and the rear lens group Gr. The first front lens group Gf1 includes four lens elements which are, in order from the object side to the image side along the first optical path, a first front group first lens element Lf11, a first front group second lens element Lf12, a first front group third lens element Lf13 and a first front group fourth lens element Lf14, and there is no additional lens element disposed between each of the adjacent four lens elements. The second front lens group Gf2 includes one lens element which is a second front group first lens element Lf21. The rear lens group Gr includes four lens elements which are, in order from the object side to the image side along the optical path, a rear group first lens element Lr1, a rear group second lens element Lr2, a rear group third lens element Lr3 and a rear group fourth lens element Lr4, and there is no additional lens element disposed between each of the adjacent four lens elements. Moreover, the rear lens group Gr includes a movable lens subgroup Gm, and the movable lens subgroup Gm can be moved along an optical axis when the photographing lens system is switched between the first optical path state and the second optical path state. In this embodiment, the movable lens subgroup Gm includes one lens element, which is the rear group fourth lens element Lr4, and the movable lens subgroup Gm has negative refractive power. As seen in FIG. 17 and FIG. 18, when the photographing lens system is switched from the first optical path state to the second optical path state, the movable lens subgroup Gm is moved towards the image side along the optical axis.

The photographing lens system further includes an aperture stop ST1, a prism E1, a stop S1, an aperture stop ST2, a prism E4, a filter E3 and an image surface IMG. As shown in FIG. 17, when the photographing lens system is in the first optical path state, the photographing lens system includes, in order from the object side to the image side along the first optical path, the aperture stop ST1, the first front group first lens element Lf11, the prism E1, the first front group second lens element Lf12, the first front group third lens element Lf13, the stop S1, the first front group fourth lens element Lf14, the rear group first lens element Lr1, the rear group second lens element Lr2, the rear group third lens element Lr3, the rear group fourth lens element Lr4, the filter E3 and the image surface IMG. As shown in FIG. 18, when the photographing lens system is in the second optical path state, the photographing lens system includes, in order from the object side to the image side along the second optical path, the aperture stop ST2, the second front group first lens element Lf21, the prism E4, the rear group first lens element Lr1, the rear group second lens element Lr2, the rear group third lens element Lr3, the rear group fourth lens element Lr4, the filter E3 and the image surface IMG.

The prism E1 is made of glass material and has a reflection surface, the prism E1 is disposed in the first front lens group Gf1, and the first optical path is folded by the reflection surface of the prism E1. The prism E4 is made of glass material and has a reflection surface, the prism E4 is disposed between the second front lens group Gf2 and the rear lens group Gr, and the second optical path is folded by the reflection surface of the prism E4. For better showing the optical paths of the image capturing unit, the optical paths respectively shown in FIG. 17 and FIG. 18 are not folded by a reflector (e.g., the prism E1 and the prism E4). However, it can be understood that the arrangement of light-folding element(s) of the image capturing unit 4 can be similar to the configurations as shown in FIG. 5 to FIG. 8 of the 1st embodiment, and the arrangement of the optical path switching mechanism can be similar to the configurations as shown in FIG. 26 to FIG. 29, and the present disclosure is not limited thereto.

The first front group first lens element Lf11 with positive refractive power has an object-side surface being convex in a paraxial region thereof and an image-side surface being concave in a paraxial region thereof. The first front group first lens element Lf11 is made of plastic material and has the object-side surface and the image-side surface being both aspheric.

The first front group second lens element Lf12 with positive refractive power has an object-side surface being concave in a paraxial region thereof and an image-side surface being convex in a paraxial region thereof. The first front group second lens element Lf12 is made of plastic material and has the object-side surface and the image-side surface being both aspheric.

The first front group third lens element Lf13 with negative refractive power has surface being concave in a paraxial region thereof. The first front group third lens element Lf13 is made of plastic material and has the object-side surface and the image-side surface being both aspheric.

The first front group fourth lens element Lf14 with positive refractive power has an object-side surface being concave in a paraxial region thereof and an image-side surface being convex in a paraxial region thereof. The first front group fourth lens element Lf14 is made of plastic material and has the object-side surface and the image-side surface being both aspheric.

The second front group first lens element Lf21 with positive refractive power has an object-side surface being convex in a paraxial region thereof and an image-side surface being concave in a paraxial region thereof. The second front group first lens element Lf21 is made of plastic material and has the object-side surface and the image-side surface being both aspheric.

The rear group first lens element Lr1 with positive refractive power has an object-side surface being convex in a paraxial region thereof and an image-side surface being convex in a paraxial region thereof. The rear group first lens element Lr1 is made of plastic material and has the object-side surface and the image-side surface being both aspheric.

The rear group second lens element Lr2 with negative refractive power has an object-side surface being concave in a paraxial region thereof and an image-side surface being concave in a paraxial region thereof. The rear group second lens element Lr2 is made of plastic material and has the object-side surface and the image-side surface being both aspheric.

The rear group third lens element Lr3 with positive refractive power has an object-side surface being convex in a paraxial region thereof and an image-side surface being convex in a paraxial region thereof. The rear group third lens element Lr3 is made of plastic material and has the object-side surface and the image-side surface being both aspheric.

The rear group fourth lens element Lr4 with negative refractive power has an object-side surface being concave in a paraxial region thereof and an image-side surface being concave in a paraxial region thereof. The rear group fourth lens element Lr4 is made of plastic material and has the object-side surface and the image-side surface being both aspheric. The object-side surface of the rear group fourth lens element Lr4 has one critical point in an off-axis region thereof.

The filter E3 is made of glass material and located between the rear group fourth lens element Lr4 and the image surface IMG, and will not affect the focal length of the photographing lens system. The image sensor IS is disposed on or near the image surface IMG of the photographing lens system.

The detailed optical data of the embodiment are shown in Table 10 and Table 11, and the aspheric surface data are shown in Table 12 below.

TABLE 10

4th Embodiment (First optical path state)
F = 25.44 mm, Fno = 3.61, HFOV = 6.5 deg.

| Surface # | | Curvature Radius | | Thickness | Material | Index | Abbe # | Focal Length |
|---|---|---|---|---|---|---|---|---|
| O-S0 | Object | Plano | | Infinity | | | | |
| Gf1-S1 | Ape. Stop | Plano | | −0.674 | | | | |
| Gf1-S2 | Lf11 | 9.4064 | (ASP) | 1.000 | Plastic | 1.545 | 56.1 | 19.42 |
| Gf1-S3 | | 81.3949 | (ASP) | 0.596 | | | | |
| Gf1-S4 | Reflector | Plano | | 5.650 | Glass | 1.772 | 49.6 | — |
| Gf1-S5 | | Plano | | 0.415 | | | | |
| Gf1-S6 | Lf12 | −662.2517 | (ASP) | 0.735 | Plastic | 1.545 | 56.1 | 106.45 |
| Gf1-S7 | | −53.3576 | (ASP) | 0.079 | | | | |
| Gf1-S8 | Lf13 | −275.7999 | (ASP) | 0.734 | Plastic | 1.686 | 18.4 | −8.74 |
| Gf1-S9 | | 6.1366 | (ASP) | 1.054 | | | | |
| Gf1-S10 | Stop | Plano | | 0.810 | | | | |
| Gf1-S11 | Lf14 | −23.4152 | (ASP) | 1.344 | Plastic | 1.686 | 18.4 | 12.81 |
| Gf1-S12 | | −6.5404 | (ASP) | 10.679 | | | | |
| Gr-S1 | Lr1 | 14.5235 | (ASP) | 1.780 | Plastic | 1.545 | 56.1 | 6.41 |
| Gr-S2 | | −4.3971 | (ASP) | 0.118 | | | | |

TABLE 10-continued

4th Embodiment (First optical path state)
F = 25.44 mm, Fno = 3.61, HFOV = 6.5 deg.

| Surface # | | Curvature Radius | | Thickness | Material | Index | Abbe # | Focal Length |
|---|---|---|---|---|---|---|---|---|
| Gr-S3 | Lr2 | −2.4476 | (ASP) | 0.881 | Plastic | 1.650 | 21.8 | −3.74 |
| Gr-S4 | | 322.5806 | (ASP) | 0.384 | | | | |
| Gr-S5 | Lr3 | 3.5647 | (ASP) | 1.538 | Plastic | 1.639 | 23.5 | 5.45 |
| Gr-S6 | | −117.9326 | (ASP) | 0.281 | | | | |
| Gr-S7 | Lr4 | −4.8835 | (ASP) | 0.470 | Plastic | 1.545 | 56.1 | −8.88 |
| Gr-S8 | | 526.3158 | (ASP) | 3.792 | | | | |
| O-S1 | Filter | Plano | | 0.210 | Glass | 1.517 | 64.2 | — |
| O-S2 | | Plano | | 1.000 | | | | |
| O-S3 | Image | Plano | | — | | | | |

Note:
Reference wavelength is 587.6 nm (d-line).
An effective radius of the stop S1 (Surface Gf1-S10) is 2.937 mm.
The reflector is disposed in the first front lens group Gf1.
The reflector is the prism E1 having a reflection surface.

TABLE 11

4th Embodiment (Second optical path state)
F = 12.75 mm, Fno = 2.55, HFOV = 13.0 deg.

| Surface # | | Curvature Radius | | Thickness | Material | Index | Abbe # | Focal Length |
|---|---|---|---|---|---|---|---|---|
| O-S0 | Object | Plano | | Infinity | | | | |
| Gf2-S1 | Ape. Stop | Plano | | −0.243 | | | | |
| Gf2-S2 | Lf21 | 9.2839 | (ASP) | 1.582 | Plastic | 1.545 | 56.1 | 18.25 |
| Gf2-S3 | | 131.0556 | (ASP) | 0.523 | | | | |
| R-S1 | Reflector | Plano | | 5.650 | Glass | 1.772 | 49.6 | — |
| R-S2 | | Plano | | 0.534 | | | | |
| Gr-S1 | Lr1 | 14.5235 | (ASP) | 1.780 | Plastic | 1.545 | 56.1 | 6.41 |
| Gr-S2 | | −4.3971 | (ASP) | 0.118 | | | | |
| Gr-S3 | Lr2 | −2.4476 | (ASP) | 0.881 | Plastic | 1.650 | 21.8 | −3.74 |
| Gr-S4 | | 322.5806 | (ASP) | 0.384 | | | | |
| Gr-S5 | Lr3 | 3.5647 | (ASP) | 1.538 | Plastic | 1.639 | 23.5 | 5.45 |
| Gr-S6 | | −117.9326 | (ASP) | 2.204 | | | | |
| Gr-S7 | Lr4 | −4.8835 | (ASP) | 0.470 | Plastic | 1.545 | 56.1 | −8.88 |
| Gr-S8 | | 526.3158 | (ASP) | 1.870 | | | | |
| O-S1 | Filter | Plano | | 0.210 | Glass | 1.517 | 64.2 | — |
| O-S2 | | Plano | | 1.000 | | | | |
| O-S3 | Image | Plano | | — | | | | |

Note:
Reference wavelength is 587.6 nm (d-line).
The reflector is disposed between the second front lens group Gf2 and the rear lens group Gr.
The reflector is the prism E4 having a reflection surface.

TABLE 12

Aspheric Coefficients

| Surface # | Gf1-S2 | Gf1-S3 | Gf1-S6 | Gf1-S7 | Gf1-S8 |
|---|---|---|---|---|---|
| k= | 0.00000E+00 | 0.00000E+00 | 0.00000E+00 | 0.00000E+00 | 0.00000E+00 |
| A4= | 4.8284919E−04 | 8.4615944E−04 | 1.8100910E−03 | −5.8263550E−04 | −2.5807719E−04 |
| A6= | 4.4680460E−05 | 2.1766672E−05 | 9.1007440E−05 | −1.9482944E−03 | −5.9400087E−03 |
| A8= | −2.6896157E−05 | −3.5121373E−05 | −2.0776924E−03 | 4.9625540E−04 | 6.8577151E−03 |
| A10= | 3.7734086E−06 | 4.3895808E−06 | 9.5145128E−04 | 2.1827901E−04 | −3.3094291E−03 |
| A12= | −1.6361706E−07 | 2.6245112E−07 | −2.2176189E−04 | −2.4291368E−04 | 8.6515221E−04 |
| A14= | −1.1428824E−08 | −1.1873714E−07 | 3.1233044E−05 | 9.5292600E−05 | −1.3408730E−04 |
| A16= | 1.3405823E−09 | 1.2252886E−08 | −2.7436724E−06 | −2.0012113E−05 | 1.2346959E−05 |
| A18= | −3.7377511E−11 | −5.6863318E−10 | 1.4056082E−07 | 2.3759300E−06 | −6.2720960E−07 |
| A20= | — | 1.0231174E−11 | −3.2089244E−09 | −1.5097006E−07 | 1.3672057E−08 |
| A22= | — | — | — | 4.0190913E−09 | — |

| Surface # | Gf1-S9 | Gf1-S11 | Gf1-S12 | Gf2-S2 | Gf2-S3 |
|---|---|---|---|---|---|
| k= | 0.00000E+00 | 0.00000E+00 | 0.00000E+00 | −1.03691E+01 | 0.00000E+00 |
| A4= | 1.7502069E−03 | −2.8391298E−03 | −2.3744014E−03 | 1.1494173E−04 | −1.9310163E−03 |
| A6= | −3.7682254E−03 | −5.8822854E−04 | −2.3462900E−04 | −1.2147568E−04 | −2.0529707E−06 |
| A8= | 4.7953070E−03 | 3.1519409E−04 | 6.6460178E−05 | −8.9711123E−06 | −4.1947124E−05 |
| A10= | −2.3990337E−03 | −6.1753664E−05 | −3.4815886E−06 | 2.6666170E−06 | 1.8257158E−05 |
| A12= | 6.3455217E−04 | 2.8208923E−06 | −2.5742831E−06 | −5.7539247E−07 | −5.2907720E−06 |

TABLE 12-continued

| Aspheric Coefficients | | | | | |
|---|---|---|---|---|---|
| A14= | −9.8454284E−05 | 8.5683297E−07 | 6.8141527E−07 | 6.6335541E−08 | 9.0295615E−07 |
| A16= | 9.0729421E−06 | −1.4248849E−07 | −7.7283644E−08 | −3.2388878E−09 | −8.1838966E−08 |
| A18= | −4.6275226E−07 | 8.5450818E−09 | 4.4649773E−09 | — | 3.0193038E−09 |
| A20= | 1.0105562E−08 | −1.9085304E−10 | −1.0705473E−10 | — | — |

| Surface # | Gr-S1 | Gr-S2 | Gr-S3 | Gr-S4 | Gr-S5 |
|---|---|---|---|---|---|
| k= | 0.00000E+00 | −1.00000E+00 | −1.00000E+00 | 0.00000E+00 | −1.00000E+00 |
| A4= | −2.2915465E−03 | 7.8232212E−03 | 5.4939880E−02 | 2.7109308E−02 | −1.0996145E−02 |
| A6= | −9.5076261E−05 | 2.0152853E−03 | −1.7338461E−02 | −1.0714613E−02 | 6.7100078E−04 |
| A8= | 1.4132912E−04 | −2.9929471E−03 | 4.0126529E−03 | 3.0370448E−03 | 1.8773812E−04 |
| A10= | −5.1028871E−05 | 1.2525086E−03 | −6.9409108E−04 | −5.9596070E−04 | −1.5424592E−04 |
| A12= | 1.0343475E−05 | −2.9090905E−04 | 1.0340061E−04 | 8.2420437E−05 | 5.4182300E−05 |
| A14= | −1.1519455E−06 | 4.2220027E−05 | −1.4606403E−05 | −8.1757069E−06 | −1.1447365E−05 |
| A16= | 6.7380534E−08 | −3.9307151E−06 | 1.6892293E−06 | 5.5413163E−07 | 1.5152651E−06 |
| A18= | −1.6347073E−09 | 2.2942402E−07 | −1.2993701E−07 | −2.2226280E−08 | −1.2453295E−07 |
| A20= | — | −7.6659120E−09 | 5.6282224E−09 | 3.8253869E−10 | 5.8335309E−09 |
| A22= | — | 1.1178558E−10 | −1.0320706E−10 | — | −1.1845058E−10 |

| Surface # | Gr-S6 | Gr-S7 | Gr-S8 | — | — |
|---|---|---|---|---|---|
| k= | 0.00000E+00 | −1.00000E+00 | 0.00000E+00 | — | — |
| A4= | −1.9458204E−03 | 3.1923722E−02 | 2.8615137E−02 | — | — |
| A6= | 8.3247271E−05 | −8.2607618E−03 | −6.6715251E−03 | — | — |
| A8= | −3.8653817E−05 | 2.1299202E−03 | 1.2404879E−03 | — | — |
| A10= | −1.0205725E−05 | −4.5342394E−04 | −6.1134451E−05 | — | — |
| A12= | 6.4073045E−06 | 7.4254162E−05 | −5.0669295E−05 | — | — |
| A14= | −1.2219883E−06 | −8.6576363E−06 | 1.8914525E−05 | — | — |
| A16= | 1.0243154E−07 | 6.6165046E−07 | −3.3931265E−06 | — | — |
| A18= | −2.6479740E−09 | −2.9256722E−08 | 3.4646558E−07 | — | — |
| A20= | −1.2762894E−10 | 5.6018499E−10 | −1.9128790E−08 | — | — |
| A22= | 7.0664593E−12 | — | 4.4070630E−10 | — | — |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 10, Table 11 and Table 12 as the following values and satisfy the following conditions:

| 4th Embodiment | | | | | |
|---|---|---|---|---|---|
| | 1st optical path state | 2nd optical path state | | 1st optical path state | 2nd optical path state |
| F [mm] | 25.44 | 12.75 | EPD/Yff1f | 2.00 | 2.00 |
| FGf [mm] | 26.39 | 18.25 | Yff1f/ImgH | 1.20 | 0.85 |
| FGr [mm] | −106.58 | 91.66 | Yff1f/Yfr1r | 1.06 | 0.95 |
| Fno | 3.61 | 2.55 | Yff1f/Yrr1r | 1.26 | 0.96 |
| HFOV [deg.] | 6.5 | 13.0 | Yrf1f/Yrr1r | 1.16 | 1.10 |
| TGf [mm] | 12.417 | 1.582 | Ymax/Ymin | 1.26 | 1.21 |
| TGr [mm] | 5.452 | 7.375 | YCrr1f/Yrr1f | 0.65 | 0.72 |
| TGfGr [mm] | 10.679 | 6.707 | (Vrf1 + Vrr1)/(Vrf2 + Vrr2) | 2.48 | |
| TGf/Tff1ff2 | 1.86 | — | minVGr | 21.8 | |
| TGfGr/Tfr1 | 7.95 | 4.24 | Vrr1/Vrr2 | 2.39 | |
| TL/F | 1.32 | 1.47 | (Frf2 + Frr1)/(Frf1 + Frr2) | −1.06 | |
| Fff1/Tff1 | 19.42 | 11.54 | FGm/TGm | −18.89 | |
| Ffr1/Ffr2 | −1.47 | — | FGf1/FGf2 | 1.45 | |
| FGf/|FGr| | 0.25 | 0.20 | FS1/FS2 | 2.00 | |

5th Embodiment

Figure 21:
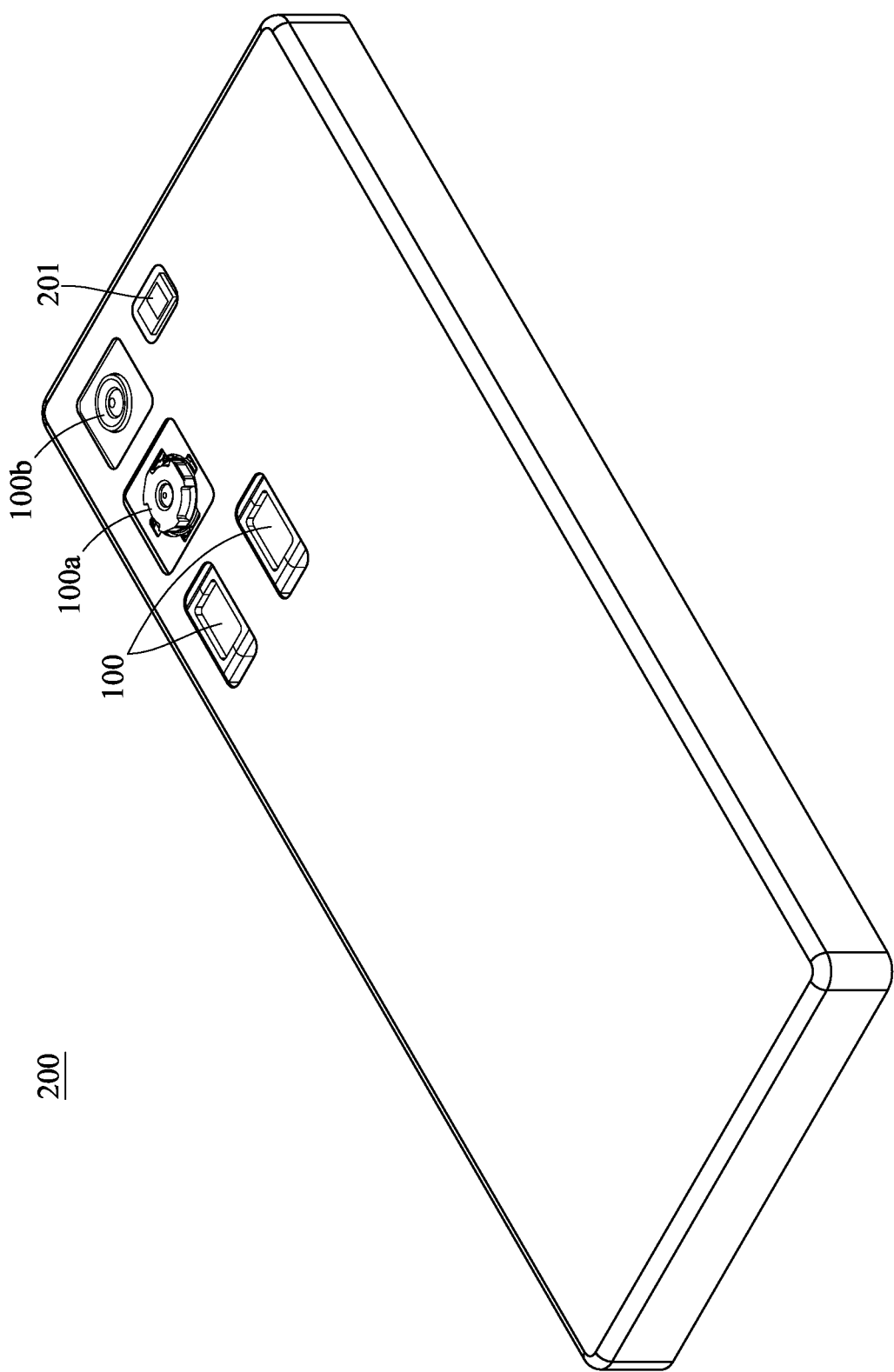
FIG. 21 is one perspective view of an electronic device according to the 5th embodiment of the present disclosure.
Figure 22:
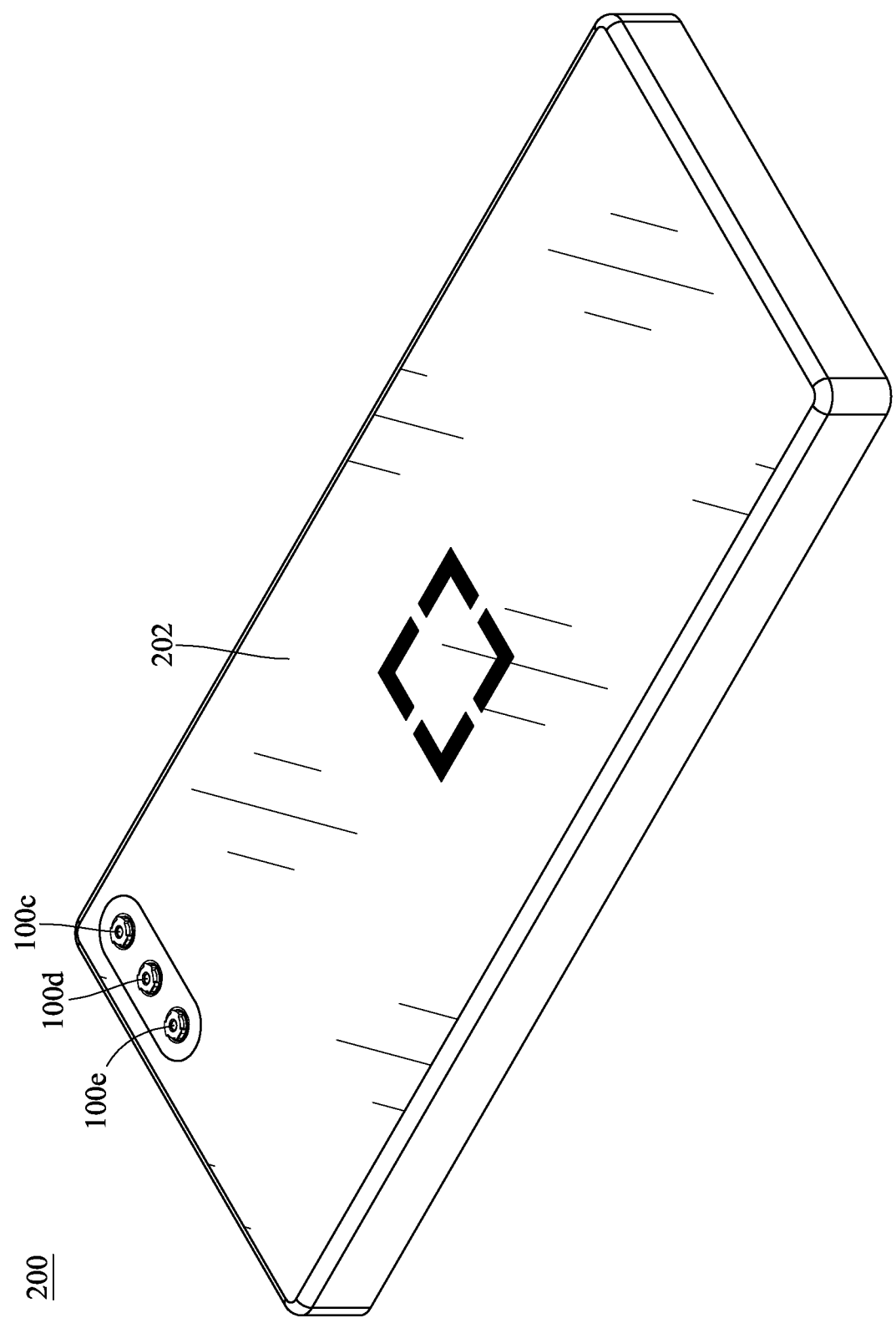
FIG. 22 is another perspective view of the electronic device in FIG. 21.

FIG. 21 is one perspective view of an electronic device according to the 5th embodiment of the present disclosure. FIG. 22 is another perspective view of the electronic device in FIG. 21.

In this embodiment, an electronic device 200 is a smartphone including an image capturing unit 100, an image capturing unit 100a, an image capturing unit 100b, an image capturing unit 100c, an image capturing unit 100d, an image capturing unit 100e, a flash module 201, a display unit 202, a focus assist module, an image signal processor and an image software processor. In addition, the image capturing unit 100, the image capturing unit 100a, and the image capturing unit 100b are disposed on the same side of the electronic device 200, and the image capturing unit 100c, the image capturing unit 100d, the image capturing unit 100e, and the display unit 202 are disposed on the opposite side of the electronic device 200.

The image capturing unit 100 is a camera module with dual optical paths, and the image capturing unit 100 includes a lens unit, a driving device, an image sensor and an image stabilizer. The lens unit includes the photographing lens system of the present disclosure, a barrel and a holder member. Moreover, the photographing lens system includes two front lens groups, a rear lens group and an optical path switching mechanism, and the image capturing unit 100 can switch optical paths through the optical path switching mechanism for optical zoom. In specific, the two front lens groups are respectively a first front lens group and a second front lens group, and the optical path switching mechanism is configured for the photographing lens system to be switched between a first optical path state and a second optical path state. As such, when the photographing lens system is in the first optical path state, imaging light passes through the first front lens group and the rear lens group in sequence. Further, when the photographing lens system is in the second optical path state, imaging the passes through the second front lens group and the rear lens group in sequence. In addition, the image capturing unit 100 is a telephoto image capturing unit having a light-folding element configuration, and a reflector of the image capturing unit 100 can change the traveling direction of imaging light (e.g., folding the optical path), such that the total track length of the image capturing unit 100 and the thickness of the electronic device 200 are not restricted by each other. Furthermore, the arrangement of light-folding element(s) of the image capturing unit 100 can be similar to, for example, the configurations of the above described embodiments, and the arrangement of the optical path switching mechanism can be similar to the configurations as shown in FIG. 26 to FIG. 29, so an explanation in this regard will not be provided again. For instance, the lens unit may be provided with the photographing lens system as disclosed in one of the above described embodiments, and the present disclosure is not limited thereto. The imaging light converges in the lens unit of the image capturing unit 100 to generate an image with the driving device utilized for image zooming or focusing on the image sensor, and the generated image is then digitally transmitted to other electronic component for further processing.

The driving device can have zooming functionality or auto focusing functionality, and different driving configurations can be obtained through the usages of screws, voice coil motors (VCM) such as spring type or ball type, micro electro-mechanical systems (MEMS), piezoelectric systems, or shape memory alloy materials. The driving device is favorable for obtaining a better imaging position of the lens unit, so that a clear image of the imaged object can be captured by the lens unit with different object distances. The image sensor (for example, CCD or CMOS), which can feature high photosensitivity and low noise, is disposed on the image surface of the photographing lens system to provide higher image quality.

The image stabilizer, such as an accelerometer, a gyro sensor and a Hall Effect sensor, is configured to work with the driving device to provide optical image stabilization (OIS). The driving device working with the image stabilizer is favorable for compensating for pan and tilt of the lens unit to reduce blurring associated with motion during exposure. In some cases, the compensation can be provided by electronic image stabilization (EIS) with image processing software, thereby improving image quality while in motion or low-light conditions.

The image capturing unit 100 is a telephoto image capturing unit configured with a light-folding element (e.g., a reflector), the image capturing unit 100a is a wide angle image capturing unit, and the image capturing unit 100b is an ultra-wide angle image capturing unit. The image capturing units 100, 100a, 100b have different fields of view, such that the electronic device 200 can have a larger zoom ratio for more applications. The abovementioned electronic device 200 has the three image capturing units 100, 100a, and 100b on the same side, but the present disclosure is not limited thereto. In other configurations, the electronic device may have at least two image capturing units disposed on the same side or have at least three image capturing units disposed on the same side.

The image capturing unit 100c is a wide angle image capturing unit, the image capturing unit 100d is an ultra-wide angle image capturing unit, and the image capturing unit 100e is a ToF (time of flight) image capturing unit. The image capturing unit 100e can determine depth information of the imaged object. The image capturing units 100c, 100d, 100e and the display unit 202 are disposed on the same side of the electronic device 200, such that the image capturing units 100c, 100d, 100e can be front-facing cameras of the electronic device 200 for taking selfies, but the present disclosure is not limited thereto.

When a user captures images of an object, the light rays converge in the image capturing units 100, 100a or 100b to generate an image(s), and the flash module 201 is activated for light supplement. The focus assist module detects the object distance of the imaged object to achieve fast auto focusing. The image signal processor is configured to optimize the captured image to improve image quality. The light beam emitted from the focus assist module can be either conventional infrared or laser. In addition, the light rays may converge in the image capturing units 100c, 100d or 100e to generate an image(s). The display unit 202 can be a touch screen, and the user is able to interact with the display unit 202 and the image software processor having multiple functions to capture images and complete image processing. Alternatively, the user may capture images via a physical button. The image processed by the image software processor can be displayed on the display unit 202.

The electronic device 200 includes multiple image capturing units 100, 100a, 100b, 100c, 100d, 100e, but the present disclosure is not limited to the number and arrangement of image capturing units.

6th Embodiment

Figure 23:
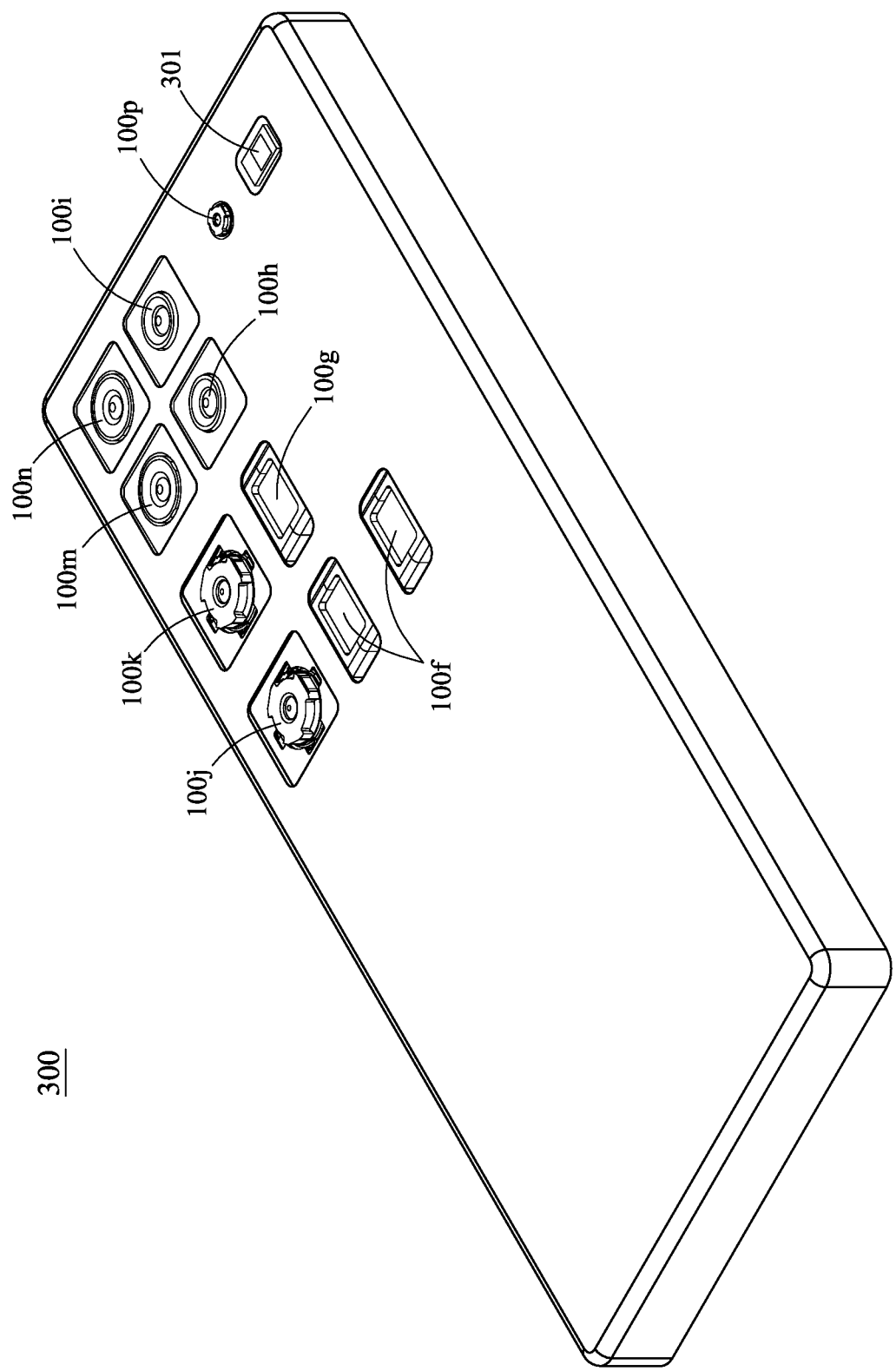
FIG. 23 is one perspective view of an electronic device according to the 6th embodiment of the present disclosure.

FIG. 23 is one perspective view of an electronic device according to the 6th embodiment of the present disclosure.

In this embodiment, an electronic device 300 is a smartphone including an image capturing unit 100f, an image capturing unit 100g, an image capturing unit 100h, an image capturing unit 100i, an image capturing unit 100j, an image capturing unit 100k, an image capturing unit 100m, an image capturing unit 100n, an image capturing unit 100p, a flash module 301, a focus assist module, an image signal processor, a display unit and an image software processor (not shown). The image capturing units 100f, 100g, 100h, 100i, 100j, 100k, 100m, 100n, 100p are disposed on the same side of the electronic device 300, and the display unit is disposed on the opposite side of the electronic device 300. The image capturing unit 100f is a camera module with dual optical paths, and the image capturing unit 100f includes a lens unit, a driving device, an image sensor and an image stabilizer. The lens unit includes the photographing lens system of the present disclosure, a barrel and a holder member. Moreover, the photographing lens system includes two front lens groups, a rear lens group and an optical path switching mechanism, and the image capturing unit 100f can switch optical paths through the optical path switching mechanism for optical zoom. In specific, the two front lens groups are respectively a first front lens group and a second front lens group, and the optical path switching mechanism is configured for the photographing lens system to be switched between a first optical path state and a second optical path state. As such, when the photographing lens system is in the first optical path state, imaging light passes through the first front lens group and the rear lens group in sequence. Further, when the photographing lens system is in the second optical path state, imaging the passes through the second front lens group and the rear lens group in sequence.

The image capturing units 100f and 100g are telephoto image capturing units configured with light-folding element(s) (e.g., reflector(s)), the image capturing units 100h and 100i are telephoto image capturing units, the image capturing units 100j and 100k are wide angle image capturing units, the image capturing units 100m and 100n are ultra-wide-angle image capturing units, and the image capturing unit 100p is a ToF image capturing unit. Furthermore, the arrangement of light-folding element(s) of the image capturing unit 100f can be similar to, for example, the configurations of the above described embodiments, and the arrangement of the optical path switching mechanism can be similar to the configurations as shown in FIG. 26 to FIG. 29. The image capturing unit 100g with light-folding element(s) may have a configuration, for example, similar to that as shown in FIG. 30, FIG. 31 or FIG. 32, and a description in this regard will not be provided again. In this embodiment, the image capturing units 100f, 100g, 100h, 100i, 100j, 100k, 100m, 100n, 100p have different fields of view, such that the electronic device 300 has various magnification ratios so as to meet the requirement of optical zoom functionality. The electronic device 300 includes multiple image capturing units 100f, 100g, 100h, 100i, 100j, 100k, 100m, 100n, 100p, but the present disclosure is not limited to the number and arrangement of image capturing units.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the photographing lens system of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-12 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing lens system comprising a first front lens group, a second front lens group, a rear lens group and an optical path switching mechanism, and the optical path switching mechanism configured for the photographing lens system to be switched between a first optical path state and a second optical path state;

wherein when the photographing lens system is in the first optical path state, the photographing lens system comprises, in order from an object side to an image side along a first optical path, the first front lens group and the rear lens group; when the photographing lens system is in the second optical path state, the photographing lens system comprises, in order from the object side to the image side along a second optical path, the second front lens group and the rear lens group;

wherein the first front lens group comprises at least three lens elements, the second front lens group comprises at least one lens element, the rear lens group comprises at least two lens elements, each of the at least three lens elements of the first front lens group, the at least one lens element of the second front lens group and the at least two lens elements of the rear lens group has an object-side surface facing toward the object side and an image-side surface facing toward the image side, and at least one of the object-side surface and the image-side surface of at least one lens element in the rear lens group is aspheric;

wherein a focal length of the photographing lens system in the first optical path state is FS1, a focal length of the photographing lens system in the second optical path state is FS2, a minimum value among Abbe numbers of all lens elements in the rear lens group is minVGr, half of a maximum field of view of the photographing lens system is HFOV, and the following conditions are satisfied:

1.2<*FS*1/*FS*2;

8.0<minVGr<26.5; and 3.0 degrees<HFOV<18.0 degrees.

2. The photographing lens system of claim 1, wherein the focal length of the photographing lens system in the first optical path state is FS1, the focal length of the photographing lens system in the second optical path state is FS2, the minimum value among Abbe numbers of all lens elements in the rear lens group is minVGr, and the following conditions are satisfied:

1.4<*FS*1/*FS*2<5.5; and 10.0<minVGr<23.0.

3. The photographing lens system of claim 1, wherein a focal length of the first front lens group is FGf1, a focal length of the second front lens group is FGf2, and the following condition is satisfied:

1.2<*FGf*1/*FGf*2<2.0.

4. The photographing lens system of claim 1, wherein the optical path switching mechanism comprises at least one reflector, and the at least one reflector is movable or rotatable relative to the first front lens group, the second front lens group or the rear lens group.

5. The photographing lens system of claim 1, further comprising a first reflector, wherein the first reflector is disposed in the first front lens group;

wherein the photographing lens system further comprises a second reflector; when the photographing lens system is in the second optical path state, the second reflector is located between the second front lens group and the rear lens group in the second optical path.

6. The photographing lens system of claim 1, wherein the first front lens group comprises four lens elements, the second front lens group comprises one lens element, and the rear lens group comprises four lens elements.

7. The photographing lens system of claim 1, wherein the rear lens group comprises a movable lens subgroup, the movable lens subgroup comprises at least one lens element, and the movable lens subgroup is moved along an optical axis when the photographing lens system is switched between the first optical path state and the second optical path state.

8. The photographing lens system of claim 7, wherein the movable lens subgroup has negative refractive power;
  wherein a focal length of the movable lens subgroup is FGm, a central thickness of the movable lens subgroup is TGm, and the following condition is satisfied:

$-50.0 < FGm/TGm < -10.0.$

9. An image capturing unit comprising:
  the photographing lens system of claim 1; and
  an image sensor disposed on an image surface of the photographing lens system.

10. An electronic device comprising:
  the image capturing unit of claim 9.

* * * * *